US011264047B2

(12) United States Patent
Roy et al.

(10) Patent No.: US 11,264,047 B2
(45) Date of Patent: Mar. 1, 2022

(54) CAUSING A VOICE ENABLED DEVICE TO DEFEND AGAINST INAUDIBLE SIGNAL ATTACKS

(71) Applicant: Board of Trustees of the University of Illinois, Urbana, IL (US)

(72) Inventors: Nirupam Roy, Champaign, IL (US); Romit Roy Choudhury, Champaign, IL (US); Haitham Al Hassanieh, Champaign, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 16/858,200

(22) Filed: Apr. 24, 2020

(65) Prior Publication Data

US 2020/0251125 A1     Aug. 6, 2020

Related U.S. Application Data

(63) Continuation of application No. 16/163,172, filed on Oct. 17, 2018, now Pat. No. 10,672,416.

(Continued)

(51) Int. Cl.
    *G10L 21/06*          (2013.01)
    *G10K 11/178*     (2006.01)
    (Continued)

(52) U.S. Cl.
    CPC ............ *G10L 21/06* (2013.01); *B06B 1/0292* (2013.01); *G10K 9/122* (2013.01); *G10K 11/178* (2013.01);
    (Continued)

(58) Field of Classification Search
None
See application file for complete search history.

(56) References Cited

U.S. PATENT DOCUMENTS

| 1,616,639 A | 2/1927 | Sprague |
| 3,398,810 A | 8/1968 | Clark, III |

(Continued)

FOREIGN PATENT DOCUMENTS

| WO | 9838833 A1 | 9/1998 |
| WO | 2016001716 A1 | 1/2016 |
| WO | WO2019119687 A1 * | 6/2019 |

OTHER PUBLICATIONS

Gong, Yuan, and Christian Poellabauer. "An Overview of Vulnerabilities of Voice Controlled Systems." Mar. 24, 2018. (Year: 2018).*

(Continued)

*Primary Examiner* — James K Mooney
(74) *Attorney, Agent, or Firm* — Lowenstein Sandler LLP

(57) ABSTRACT

A voice enabled device includes a transducer to capture multiple inaudible signals received from multiple ultrasonic speakers and audio recording electronics to process the multiple inaudible signals to generate digital output samples, which are recorded sound data comprising non-linearities from frequency-shifted versions of the multiple inaudible signals to within an audible frequency range. A processing device is to detect, within the recorded sound data, at least a portion of the non-linearities, e.g., via: comparison of the recorded sound data with expected patterns from an audible audio signal generated by human voice; and detection of non-linear variations within the recorded sound data as compared to the expected patterns. In response to the detection, the processing device is further to suppress an action programmed for response to a voice command corresponding to the recorded sound data.

17 Claims, 26 Drawing Sheets

Related U.S. Application Data

(60) Provisional application No. 62/575,077, filed on Oct. 20, 2017.

(51) Int. Cl.

| | | |
|---|---|---|
| *B06B 1/02* | (2006.01) | |
| *H04B 1/04* | (2006.01) | |
| *H04R 1/32* | (2006.01) | |
| *H04R 1/40* | (2006.01) | |
| *H04B 1/20* | (2006.01) | |
| *G10K 9/122* | (2006.01) | |
| *G10K 15/02* | (2006.01) | |
| *H04R 27/00* | (2006.01) | |

(52) U.S. Cl.
CPC .............. *G10K 15/02* (2013.01); *H04B 1/04* (2013.01); *H04B 1/20* (2013.01); *H04R 1/323* (2013.01); *H04R 1/40* (2013.01); *H04R 27/00* (2013.01); *H04R 2217/03* (2013.01); *H04R 2227/003* (2013.01); *H04R 2227/005* (2013.01)

(56) References Cited

U.S. PATENT DOCUMENTS

| | | | |
|---|---|---|---|
| 4,195,202 | A | 3/1980 | McCalmont |
| 4,593,160 | A | 6/1986 | Nakamura |
| 8,718,297 | B1 | 5/2014 | Norris |
| 8,854,985 | B2 | 10/2014 | Tsfaty |
| 2001/0007591 | A1 | 7/2001 | Pompei |
| 2003/0103632 | A1 | 6/2003 | Goubran et al. |
| 2007/0121968 | A1 | 5/2007 | Na |
| 2016/0255441 | A1 | 9/2016 | Hecht et al. |
| 2019/0115046 | A1* | 4/2019 | Lesso .................. G10L 25/93 |
| 2020/0251117 | A1* | 8/2020 | Xu ...................... G10L 15/26 |

OTHER PUBLICATIONS

Roy, Nirupam, et al. "Inaudible Voice Commands: The Long-Range Attack and Defense." 15th USENIX Symposium on Networked Systems Design and Implementation, Apr. 9, 2018, pp. 547-560. (Year: 2018).*

Zhang, B., et al., "PriWhisper: Enabling Keyless Secure Acoustic Communication for Smartphones," IEEE Internet of Things Journal vol. 1, No. 1, pp. 33-45, Feb. 2014.

Zhang, G., Yan, C., Ji, X., Zhang, T, Zhang, T, and Xu, W., "DolphinAttack: Inaudible Voice Commands," In Proceedings of the ACM Conference on Computer and Communication Security (CCS), ACM, 15 pages, Oct. 30-Nov. 3, 2017.

Zhang, L., Bo, C.C Hou, J., Li, X.-Y., Wang, Y., Liu, K., Liu, Y., "Kaleido: You Can Watch it but Cannot Record IT," Proceedings of the 21st Annual International Conference on Mobile Computing and Networking, ACM, pp. 372-385, Sep. 7-11, 2015.

Zoosh Technology, Start-up Naratte Launches Novel Ultrasonic Near-Field Communications Solutions, posted in Audio, Communications, Software Development, http://www.bdti.com/insidedsp/2011/07/28/naratte, 4 pages, Jul. 28, 2011.

"Audio Jammer Theory, Application & Circuit Design Help", edaboar.com, Jul. 9, 2013, www.edaboard.com/showthread.php?293887-Audio-Jammer-theroy-application-amp-circuit-design-help (Year: 2013).

Trippel, Timothy, et al. "WALNUT: Waging Doubt on the Integrity of MEMS Accelerometers with Acoustic Injection Attacks", 2017 IEEE European Symposium on Security and Privacy, 16 pages, Apr. 2017.

Son et al., "Rocking Drones with International Sound Noise on Gyroscopic Sensors," 24th USENIX Secuirty Symposium, 17 pages, Aug. 2015.

Aumi, M. T. I., Gupta, S., Goel, M., Larson E., and Patel, S., "Doplink: Using the Doppler Effect for Multi-Device Interaction," In Proceedings of the 2013 ACM International Joint Conference on Pervasive and Ubiquitous Computing (2013), ACM pp. 583-586, Sep. 8-12, 2013.

Bjørnø, L., "Parametric Acoustic Arrays," In Aspects of Signal Processing, Part 1, Series C: Mathematical and Physical Sciences, vol. 33, D. Reidel Publishing Company, Dordrecht-Holland/Bost— U.S.A., pp. 33-59, Aug. 30-Sep. 11, 1976.

Carlini, N., Mishra, P, Vaidya, T., Zhang, Y., Sherr, M., Shields, C., Wagner, D., and Zhou, W., "Hidden Voice Commands," In 25th USENIX Security Symposium (2016) Austin, Texas, pp. 513-530, Aug. 10-12, 2016.

Constandache, I., Agarwal, S., Tashev, I., and Choudhury, R.R., "Daredevil: Indoor Location Using Sound," ACM SIG-MOBILE Mobile Computing and Communications Review vol. 18,No. 2, pp. 9-19, Apr. 2014.

Deatherage, B.H., Jeffress, L.A., Blodgett, H.C., "A Note on the Audibility of Intense Ultrasonic Sound," the Journal of Aoustical Society of America 26, 4, p. 582, 1954.

Diao, W., Liu, X., Zhou, Z., and Zhang, K., "Your Voice Assistant is Mine: How to Abuse Speakers to Steal Information and Control your Phone," In Proceedings of the 4th ACM Workshop on Security and Privacy in Smartphones & Mobile Devices, (2014), ACM, pp. 63-74, 2014.

Dobie, R.A., Wiederhold, M.L., "Ultrasonic Hearing," Science 255, 5051, pp. 1584-1585, Mar. 20, 1992.

Dobrucki, A., "Nonlinear Distortions in Electroacoustic Devices," Archives of Acoustics 36, 2, 437-460, 2011.

Fox, C., Akervold, O., "Parametric Acoustic Arrays," the Journal of the Acoustical Society of America 53, 1, p. 382, 1973.

Gao, F. X., and Snelgrove, W.M., Adaptive Linearization of a Loudspeaker, In Acoustics, Speech, and Signal Processing 1991, ICASSP-91, IEEE, pp. 3589-3592, 1991.

Gonzalez, G. G. G., and Nassi, I. M. S. V., "Measurements for Modelling of Wideband Nonlinear Power Amplifiers for Wire-Less Communications," Department of Electrical and Communications Engineering, Helsinki University of Technology, 175 pages, 2004.

Gruhl, D., Lu, A., and Bender, W., "Echo Hiding," In the International Workshop on Information Hiding, Springer, pp. 295-315, 1996.

Gupta, S., Morris, D., Patel S., and Tan, D., "Soundwave: Using the Doppler Effect to Sense Gestures," In the Proceedings of the SIGCHI Conference on Human Factors in Computing Systems (2012), Austin, Texas, ACM. pp. 1911-1914, May 5-10, 2012.

Hamby, W., "Ultimate Sound Pressure level Decibel Table," www.makeitlouder.com/Decibel%20Level%20Chart.txt, 9 pages, copywrite 2004.

Hawksford, M. J., "Distortion Correction in Audio Power Amplifiers," Journal of the Audio Engineering Society 29, 1/2, pp. 27-30, 1981.

Heffner, H. E., Heffner, R. S., "Hearing Ranges of Laboratory Animals," Journal of the American Association for Laboratory Animal Science, Vo.. 46, No. 1, pp. 20-22, Jan. 2007.

Huggins-Daines, D., Kumar, M., Chan, A., Black, A. W., Ravishankar, M., Rudnicky, A. I., "Pocketsphinx: A Free-Real-time continuos Speech Recognition System for Hand-Held Devices," In proceedings of ICASSP, pp. I-185-I188, 2006.

Iannucci, P. A., Netravali, R., Goyal, A. K., Balakrishnan, H., "Room-Area Networks", Proceeding of the 14th ACM Workshop on Hot Topics in Networks, ACM, 7 pages, 2015.

Jakobsson, D., and Larsson, M., "Modelling and Compensation of Nonlinear Loudspeaker," Department of Singals and Systems, Chalmers University of Technology, Goteborg, Sweden, Master's Thesis, 51 pages, 2010.

Jayaram, P., Ranganatha, H., and Anupama, H., "Information Hiding Using Audio Steganography—a Survey," The International Journal of Multimedia & Its Applications (IJMA) vol. 3, No. 3, pp. 86-96, Aug. 2011.

Kim, S., Hwang, J., Kang, T., Kang, S. Sohn, S., "Generation of Audible Sound with Ultrasonic Signals Through the Human Body," Consumer Electronic (ISCE), IEEE, pp. 1-3, 2012.

Klippel, W. J., "Active Reduction of Nonlinear Loudspeaker Distortion," In INTER-NOISE and NOISE-CON Congress and Conference Proceeding, vol. 1999, Institute of Noise Control Engineering, pp. 1135-1146, 1999.

(56) References Cited

OTHER PUBLICATIONS

Kumar, S., Furuhashi, H., "Long-Range Measurement System Using Ultrasonic Range Sensor with High-Power Transmitter Array in Air," Ultrasonics 74, pp. 186-195, available online Oct. 26, 2016.

Kune, D. F., Backes, J., Clark, S. S., Kramer, D., Reynolds, M., Fu, K., Kim, Y., Xu, W., "Ghost Talk: Mitigating EMI Signal Injection Attacks Against Analog Sensors," Security and Privacy (SP), 2013 IEEE Symposium on IEEE, pp. 145-159, 2013.

Lazik, P., and Rowe, A., "Indoor Pseudo-Ranging of Mobile Devices Using Ultrasonic Chirps," In Proceedings of the 10th ACM Conference on Embedded Network Sensor Systems, ACM, pp. 99-112, Nov. 6-9, 2012.

Lee, K.-L., and Mayer, R., "Low-Distortion Switched-Capacitor Filter Design Techniques," IEEE Journal of Solid-State Circuits 20, 6, pp. 1103-1113, Dec. 1985.

Lenhardt, M.L., Skellett, R., Wang, P., Clarke, A. M., "Human Ultrasonic speech perception," Science vol. 253, 5015 pp. 82-85, Jul. 5, 1991.

Lin, Q., Yang, L., and Liu, Y., "Tagscreen: Synchronizing Social Televisions Through Hidden Sound Markers," In IN-FOCOM 2017-IEEE Conference on Computer Communications, IEEE, pp. 1-9, 2017.

Mercy, D., "A Review of Automatic Gain Control Theory," Radio and Electronic Engineer, vol. 51, No. 11/12, pp. 579-590, Nov./Dec. 1981.

Nakagawa, S., Okamoto, Y., Fujisaka, Y. I., "Development of a Bone-Conducted Ultrasonic Hearing Aid for the Profoundly Sensorineural Deaf," Transactions of Japanese Society for Medical and Biological Engineering, 44, 1, pp. 184-189, 2006.

Nandakumar, R., Chintalapudi, K.K., Padmanabhan, V., Venkatesan, R., "Dhwani: Secure Peer-to-Peer Acoustic NFC," ACM SIGCOMM Computer Communication Review vol. 43, ACM, pp. 63-74, Aug. 12-16, 2013.

Nandakumar, R., Gollakota, S., and Watson, N., "Contactless Sleep Apnea Detection on Smartphones," In Proceedings of the 13th Annual International Conference on Mobile Systems, Applications, and Services, ACM, pp. 45-57, 2015.

Nandakumar, R., Takakuwa, A., Kohno, T., and Gollakota, S., "Covertband: Activity Information Leakage Using Music," Proceedings of the ACM on Interactive, Mobile, Wearable and Ubiquitous Technologies, vol. 1, No. 3, Article 87, p. 87:1-87:24, publication date Sep. 2017.

Nation, P., Waring R., "Vocabulary Size, Text Coverage and Word Lists," Vocabulary: Description, Acquistion and Pedagogy, 14, https://www.lextutor.ca/research/nation_waring_97.html, pp. 6-19, Sep. 1997.

Okamoto, Y., Nakagawa, S., Fujimoto, K., Tonoike, M., "Intelligibility of Bone-Conducted Ultrasonic Speech," Hearing Research 208, 1, pp. 107-113, 2005.

Pompei, F.J., "Sound from Ultrasound: The Parametric Array as an Audible Sound Source," PhD Thesis, Massachusetts Institute of Technology, 132 pages, Jun. 2002.

Song, L., and Mittal, P., "Inaudible Voice Commands," Department of Electrical Engineering, Princeton University, 3 pages, Aug. 24, 2017.

Soundlazer Kickstarter, https://www.kickstarter.com/projects/richardhaberkern/soundlazer, last accessed Feb. 26, 2019.

Soundlazer webpage, http://www.soundlazer.com, last accessed Feb. 26, 2019.

Sun, Z., Purohit, A., Bose, R., and Zhang, P., "Spartacus: Spatially-Aware Interaction for Mobile Devices Through Energy-Efficient Audio Sensing," In Proceeding of the 11th Annual International Conference on Mobile Systems, Applications, and Services, ACM, pp. 263-276, Jun. 25-28, 2013.

Titze, I. R., and Martin D.W., "Principles of Voice Production," The Journal of the Acoustical Society of America 104, 3, pp. 1148, Sep. 1998.

Vaidya, T., Zhang, Y., Sherr, M., and Shields, C., "Cocaine Noodles: Exploiting the Gap Between, Human and Machine Speech Recognition," In 9th USENIX Workshop on Offensive Technologies, (WOOT 15) (Washington, D.C., 2015), USENIX Association, 25 pages, Aug. 10-11, 2015.

Wang, Q., Ren, K., Zhou, M., Lei, T., Koutsonikolas, D., Su, L., "Message Behind the Sound: Real-Time Hidden Acoustic Signal Capture with Smartphones," Proceedings of the 22nd Annual International Conference on Mobile Computing and Networking, ACM, pp. 29-41, Oct. 3-7, 2016.

Westervelt, P. J. "The Theory of Steady Forces Caused by Sound Waves," The Journal of the Acoustical Society of America vol. 23, No. 4, pp. 312-315, May 1951.

Westervelt, P. J., "Scattering of Sound by Sound," the Journal of the Acoustical Society of America vol. 29, No. 2, pp. 199-203, Feb. 1957.

Whitlow, D., "Design and Operation of Automatic Gain Control Loops for Receivers in Modern Communications Systems," Microwave Journal 46, 5, pp. 254-269, May 2003.

Yang, J., Tan, J.-S., Gan, W.-S., Er, M.-H., Yan, Y.-H., "Beamwidth Control in Parametric Acoustic Array," Japanese Journal of Applied Physics vol. 44, No. 9A, pp. 6817-6819, 2005.

Ye, H., and Young, S., "High Quality Voice Morphing," In Acoustics, Speech, and Signal Processing, 2004, Proceeding (ICASSP'04), pp. 1-9, 2004.

Yoneyama, M., Fujimoto, J.I., Kawamo, Y., Sasabe, S., "The Audio Spotlight: An Application of Nonlinear Interaction of Sound Waves to a New Type of Loudspeaker Design," The Journal of the Acoustical Society of America 73, 5, pp. 1532-1536, May 1983.

Yu, M., et al., "A Novel ICA-Based Frequency Hopping Receiver with Correlated Jamming Suppression," Proceeding of the International Conference on Wireless Communications & Signal Processing (WCSP), Huangshan, China, 5 pages, Oct. 25-27, 2012.

\* cited by examiner

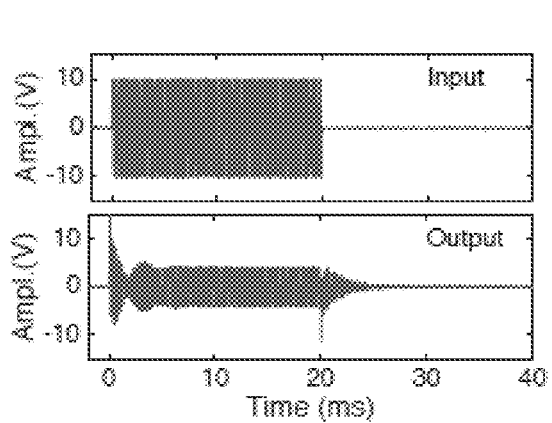
FIG. 9A
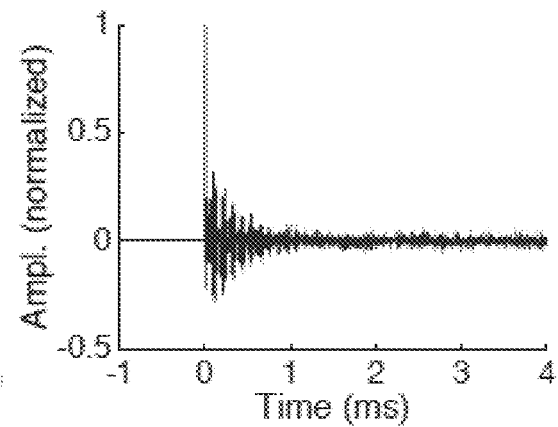
FIG. 9B
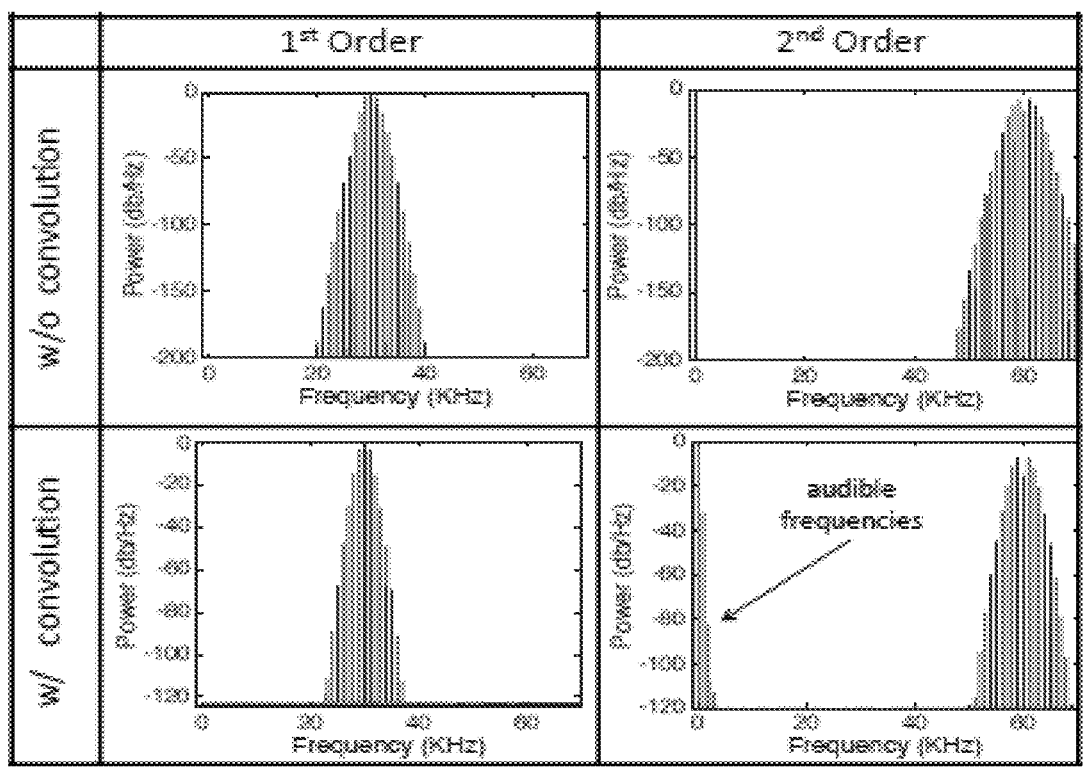
FIG. 10A  FIG. 10B
FIG. 10C  FIG. 10D

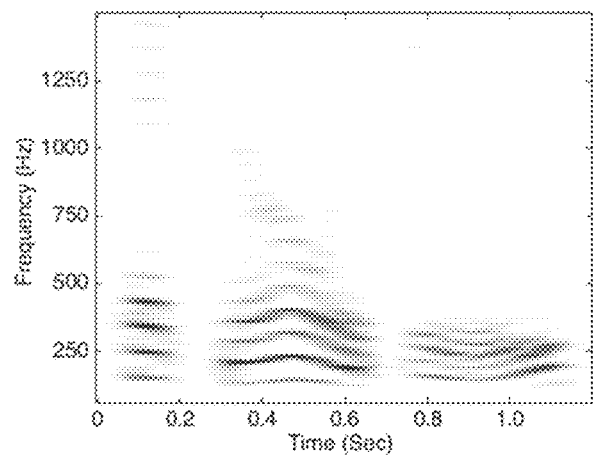 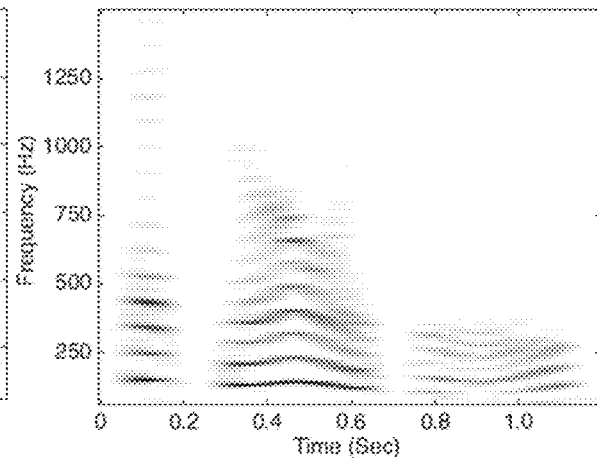
FIG. 26A  FIG. 26B
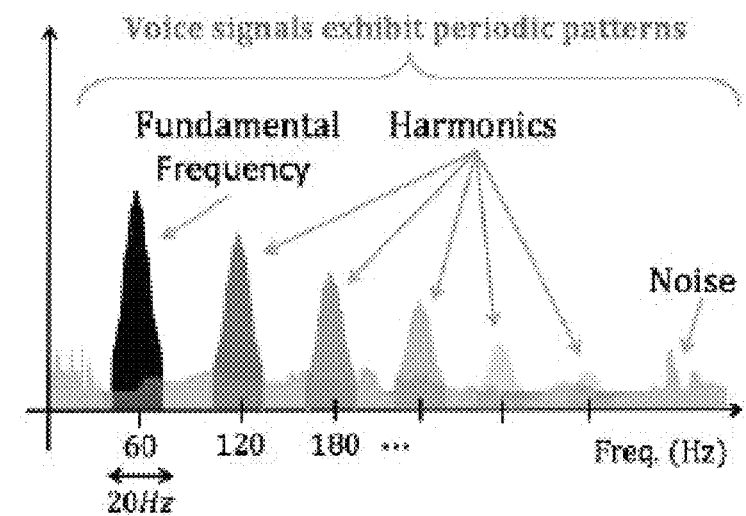
FIG. 27A
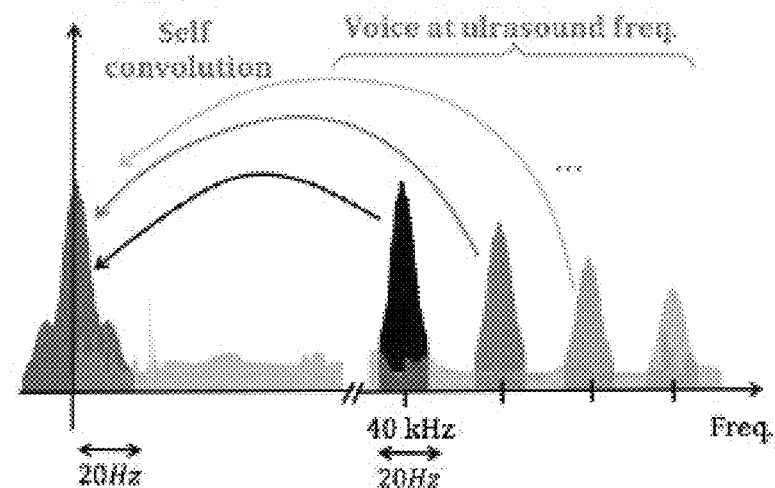
FIG. 27B

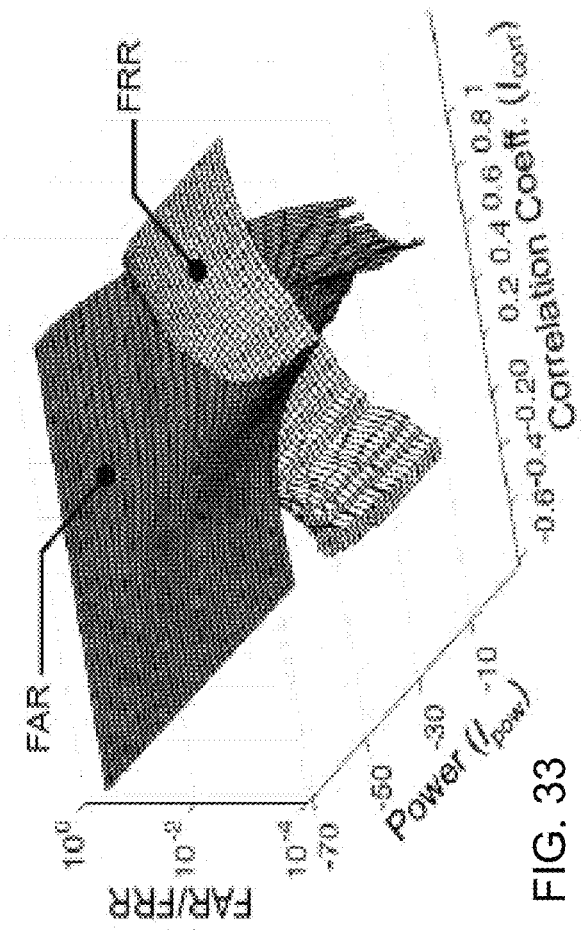
FIG. 31
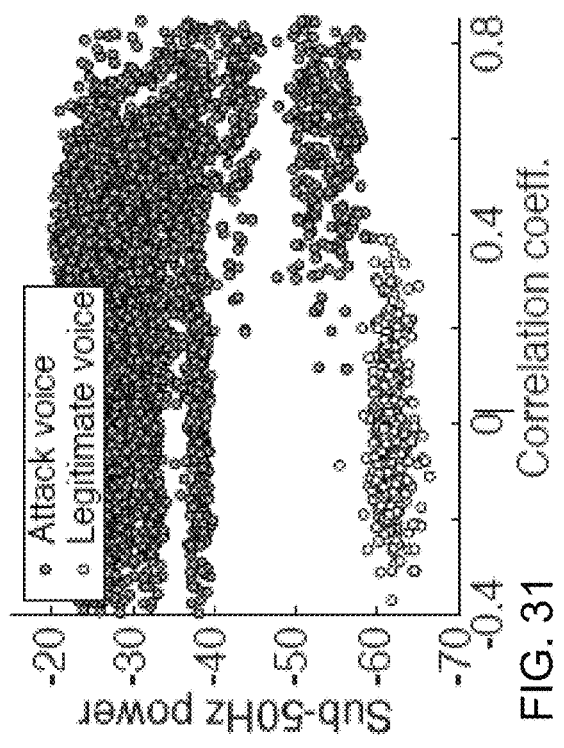
FIG. 32A
FIG. 32B
FIG. 32C
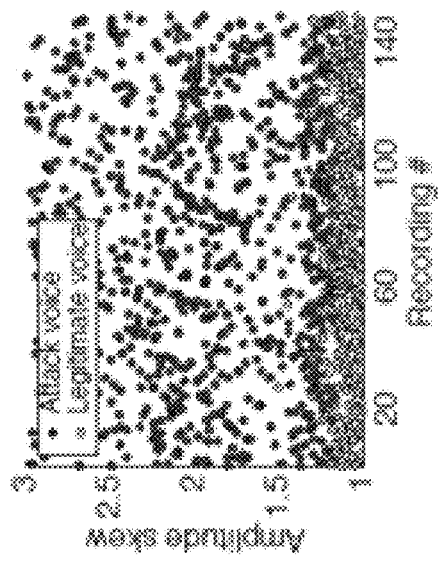
FIG. 33

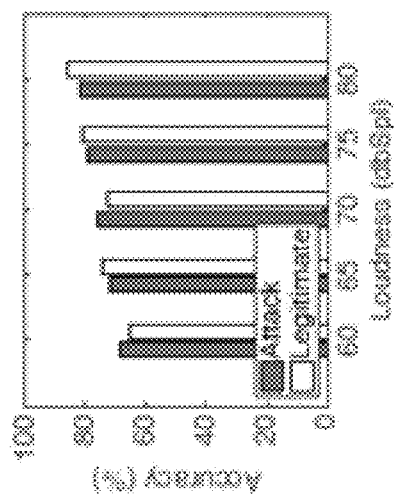
FIG. 36C
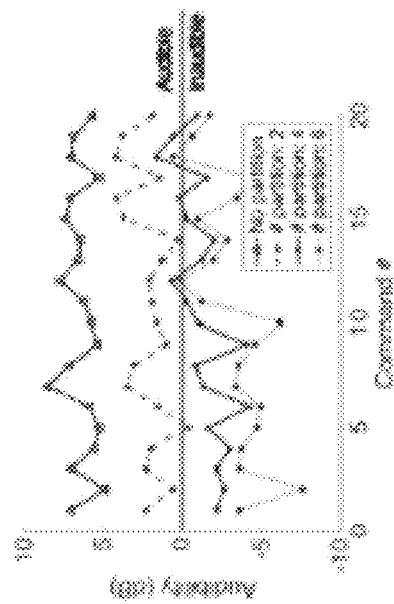
FIG. 36B
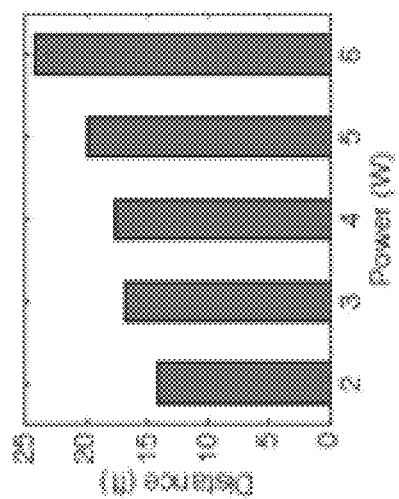
FIG. 36A
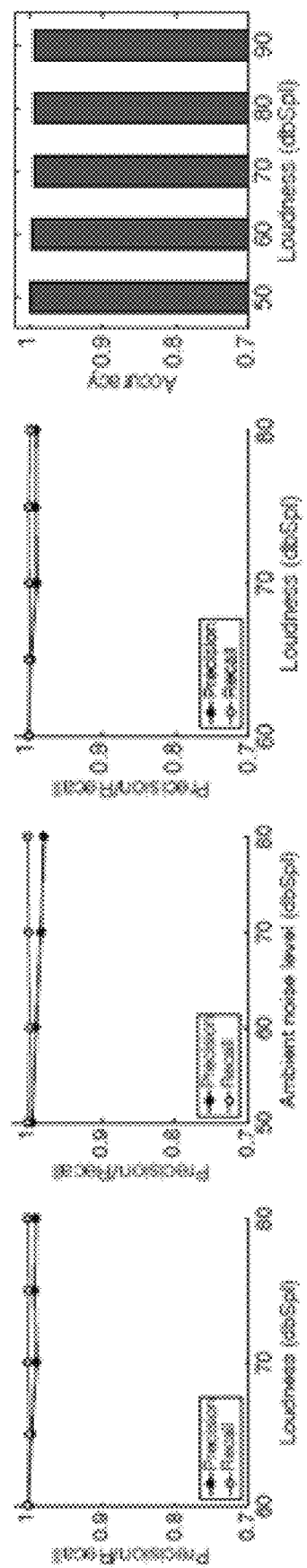
FIG. 37D
FIG. 37C
FIG. 37B
FIG. 37A

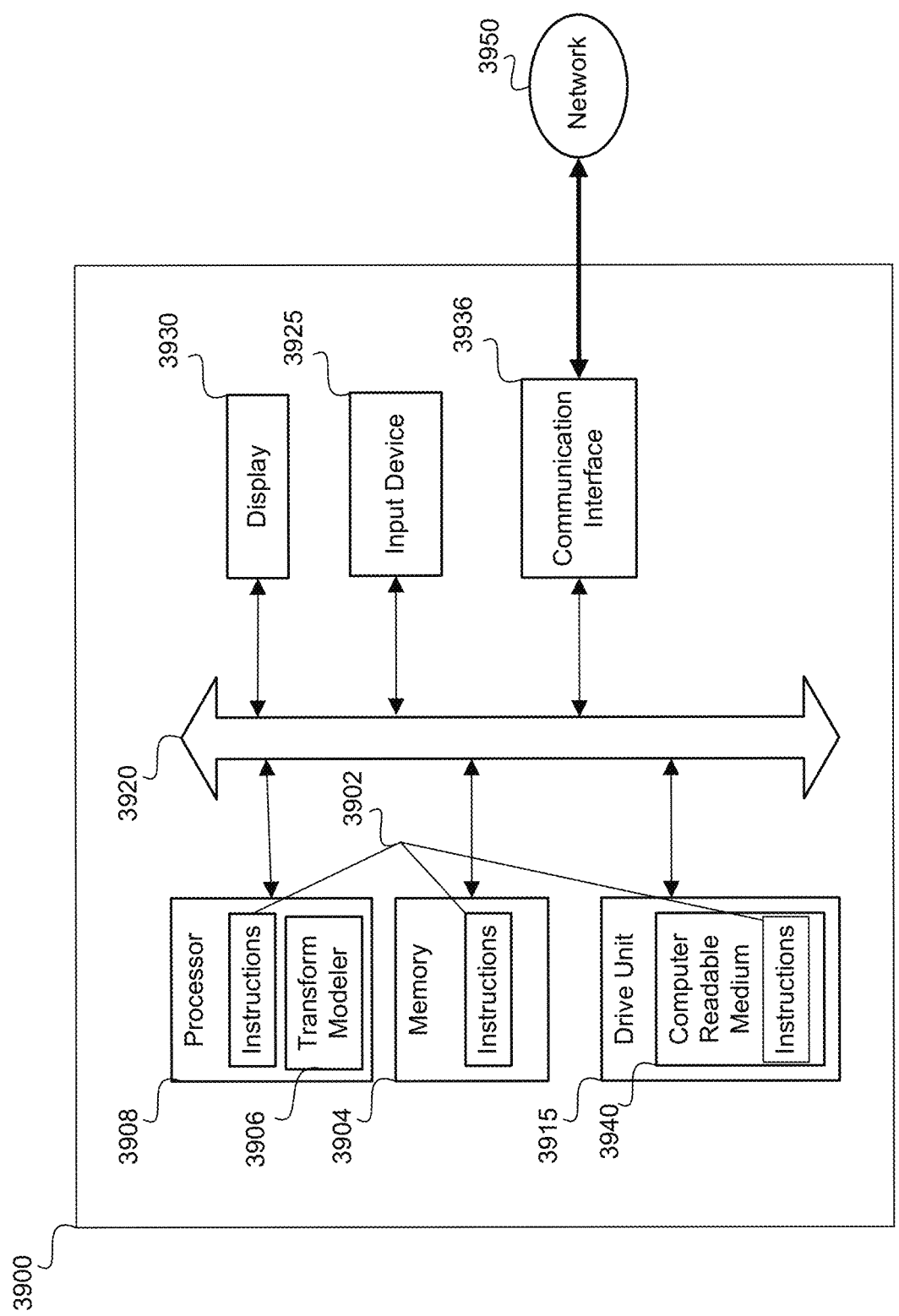

CAUSING A VOICE ENABLED DEVICE TO DEFEND AGAINST INAUDIBLE SIGNAL ATTACKS

REFERENCE TO EARLIER FILED APPLICATION

This application is continuation of Ser. No. 16/163,172, filed Oct. 17, 2018, which claims the benefit under 35 U.S.C. § 119(e) of U.S. Provisional Patent Application No. 62/575,077, filed Oct. 20, 2017, both of which are incorporated herein by this reference in their entireties.

FEDERALLY SPONSORED RESEARCH OR DEVELOPMENT

This invention was made with government support of contract 1619313 awarded by the National Science Foundation. The government has certain rights in the invention.

BACKGROUND

FIG. 1 is a flow diagram of a sound recording flow of a conventional sound recording system 100, also referred to as a microphone system, according to an embodiment. The sound recording system 100 may include two main modules: a transducer 110 (located in a microphone) and an analog-to-digital converter (ADC) 150. The transducer 110 contains a diaphragm 120. The diaphragm 120 vibrates due to sound pressure, producing a proportional change in voltage. The ADC 150 measures this voltage variation (at a fixed sampling frequency) and stores the resultant digital samples in memory. The digital samples represent the recorded sound in the digital domain.

To function in practice, the sound recording system 100 may further include a pre-amplifier 130 and a low-pass filter (LPF) 140 situated in the signal path between the diaphragm 120 and the ADC 150. The pre-amplifier 130 may amplify the output of the transducer 110 by a gain of around ten times so that the ADC 150 can measure the signal effectively using its predefined quantization levels. Without this amplification, the signal may be too weak (around tens of millivolts). The LPF 140 may eliminate high-frequency or other extraneous noise.

As per Nyquist's law, if the ADC's sampling frequency is $f_s$ hertz (Hz), the sound is band-limited to $(f_s/2)$ Hz to avoid aliasing and distortions. Since natural sound can spread over a wide band of frequencies, the sound may be low pass filtered (e.g., frequencies greater than $f(f_s/2)$ Hz are removed) before the analog-to-digital conversion. As ADCs in today's microphones operate at 48 kHz, the low pass filters are designed to cut off signals at 24 kHz.

FIG. 2 is a block diagram illustrating creation of the digital spectrum by the sound recording system 100 of FIG. 1, with and without the (anti-aliasing) low-pass filter 140, according to an embodiment. Note the aliasing noise present in the spectrum output of the case without the LPF 140 and the absence of that aliasing noise in the case with the LPR.

Sound playback is simply the reverse of recording. Given a digital signal as input, a digital-to-analog converter (DAC) produces the corresponding analog signal and feeds it to a speaker. The speaker's diaphragm oscillates to the applied voltage producing varying sound pressures in the medium, which is then audible to humans.

Modules inside a microphone are mostly linear systems, meaning that the output signals are linear combinations of the input. In the case of the pre-amplifier 130, if the input sound is S, then the output may be represented by $S_{out}=A_1 S$. Here, $A_1$ is a complex gain that can change the phase and/or amplitude of the input frequencies, but does not generate spurious new frequencies. This behavior makes it possible to record an exact (but higher-power) replica of the input sound and playback without distortion.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 9A is a plot of a prolonged oscillation in an ultrasonic transmitter following a 40 kHz sine burst input according to an embodiment.

FIG. 9B is a plot of an impulse response of the ultrasonic transmitter of FIG. 9A according to an embodiment.

FIGS. 10A, 10B, 10C, and 10D are plots illustrating a spectrogram of $S_{out}$ and $S_{out}^2$, with and without convolution, where the shadow signal appears due to second-order non-linear effects on the convolved signal, according to an embodiment.

FIG. 26A is a plot of a spectrogram of a legitimate human voice command stating "Alex, Mute Yourself," according to an embodiment.

FIG. 26B is a plot of a spectrogram of an attacker playing the command issued in FIG. 26A over an ultrasonic audio system, according to an embodiment.

FIG. 27A is a plot illustrating a simplified abstraction of a legitimate voice spectrum, with a narrow fundamental frequency band around $f_j$ and harmonics at integer multiples $nf_j$, according to an embodiment.

FIG. 27B is a plot illustrating the appearance of copies of the inaudible tones within the voice spectrum due to non-linearity of microphone hardware according to an embodiment.

FIG. 31 is a plot illustrating the zero sum game between correlation and power at sub-50 Hz bands, for both the legitimate voice and the attacker signal, according to an embodiment.

FIG. 32A is a plot illustrating a sound signal in the time domain from the legitimate audible voice according to an embodiment.

FIG. 32B is a plot illustrating the recorded attacker signal and demonstrative of amplitude skew according to an embodiment.

FIG. 32C is a plot illustrating amplitude skew for various attack and legitimate voice commands, according to embodiments.

FIG. 33 is a plot of a false acceptance rate (FAR) plane (dark color) and a false rejection rate (FRR) plane (light color) for different sub-50 Hz power and correlation values, according to an embodiment.

FIG. 36A is a graph illustrating a maximum activation distance for different input power levels according to various embodiments.

FIG. 36B is a plot illustrating a worst case audibility of the leakage sound after optimal spectrum partitioning according to various embodiments.

FIG. 36C is a graph illustrating word recognition accuracy by VEDs, using automatic speech recognition software, with equal accuracy as legitimate words according to an embodiment.

FIG. 37A is a plot illustrating precision and recall of defense performance according to basic performance without external interference according to an embodiment.

FIG. 37B is a plot illustrating precision and recall of defense performance under ambient noise according to an embodiment.

FIG. 37C is a plot illustrating precision and recall of defense performance under injected noise according to an embodiment.

FIG. 37D is a graph illustrating overall accuracy of sound detection as various loudness levels across all experiments according to various embodiments.

FIG. 39 is a computing system that may be used for or in conjunction with any of the disclosed audio transmitters according to the embodiments disclosed herein.

DETAILED DESCRIPTION

This disclosure shows the possibility of creating sounds that humans cannot hear but microphones can record. This is not because the sound is too soft or just at the periphery of human's frequency range. The sounds created are actually 40 kHz and above, and are thus outside range of operation of both human auditory system and a microphone or microphone recording system intended to detect and record human speech. Given microphones possess inherent non-linearities in their diaphragms and power amplifiers, it is possible to design sounds that exploit the non-linearities. One may shape the frequency and phase of sound signals and play them through ultrasonic speakers. When these sounds pass through the non-linear amplifier at the receiver, the high frequency sounds create a low-frequency "shadow," e.g., a frequency-down-shifted copy of at least one of the ultrasonic sounds. The shadow is within the filtering range of the microphone and thereby gets recorded as normal sounds, e.g., human audible speech.

Figure 3:
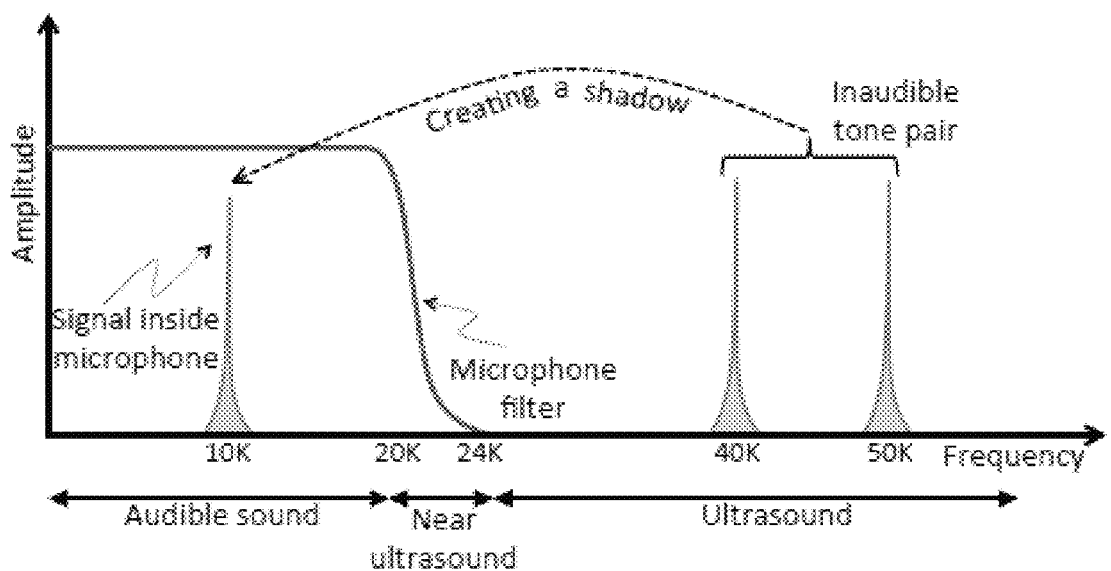
FIG. 3 is a plot illustrating the principle of the creation of a shadow within hardware of a microphone in response to an inaudible tone pair according to an embodiment.

FIG. 3 is a plot illustrating the principle of the creation of a shadow within hardware of a microphone in response to an inaudible tone pair according to an embodiment. In the disclosed embodiments, the microphone does not require any modification, enabling billions of phones, laptops, and Internet-of-things (IoT) devices to leverage the capability. This disclosure presents a system (e.g., an audio transmitter) (termed as "BackDoor") that develops the technical building blocks for harnessing this opportunity of causing microphones to detect inaudible tones, which leads to new applications in security and communications.

For example, in security, given that microphones may record these inaudible sounds, the disclosed audible transmitter may silently jam spy microphones from recording. Military and government officials can secure private and confidential meetings from electronic eavesdropping; cinemas and concerts can prevent unauthorized recording of movies and live performances. The disclosed audible transmitter may also carry possible security threats. Denial-of-service (DoS) attacks on sound devices are typically considered difficult as the jammer can be easily detected. However, the disclosed audible transmitter illustrates that inaudible jammers can disable hearing aids and cellphones without getting detected. For example, during a robbery, the perpetrators can prevent people from making 911 calls by silently jamming all phones' microphones.

The disclosed audible transmitter also has implications in communication systems. Ultrasound systems today may aim to achieve inaudible data transmissions to the microphone. However, these suffer from limited bandwidth, around 3 kHz, since they must remain above human hearing range (20 kHz) and below the microphone's cutoff frequency (24 kHz). Moreover, the Federal Communication Commission (FCC) imposes strict power restrictions on these bands since they are partly audible to infants and pets. The disclosed audible transmitter is free of these limitations. Using an ultrasound-based transmitter, the disclosed audible transmitter may utilize the entire microphone spectrum for communication. Thus, IoT devices may find an alternative channel for communication, reducing the growing load on Bluetooth® by the Bluetooth Special Interest Group (SIG) and other personal area network (PAN) technologies. Museums and shopping malls may use acoustic beacons to broadcast information about nearby art pieces or products. Various ultrasound ranging schemes, that compute time of sight of signals, could benefit from the substantially higher bandwidth in viable ultrasonic communication.

In one embodiment, an ultrasonic transmitter includes a first ultrasonic speaker associated with a first channel, a second ultrasonic speaker co-located with the first ultrasonic speaker and associated with a second channel, and a waveform generator (or the hardware equivalent of the waveform generator) coupled to the first ultrasonic speaker and to the second ultrasonic speaker. The waveform generator may frequency modulate a first inaudible signal at a first ultrasonic frequency, to generate a modulated inaudible signal. The waveform generator may drive, over the first channel, the first ultrasonic speaker with the modulated inaudible signal. The waveform generator may further drive, over the second channel, the second ultrasonic speaker with a second inaudible signal at a second ultrasonic frequency so that a combination of the modulated inaudible signal and the second inaudible signal arrive together at a microphone or recording system. The second ultrasonic frequency may be formed so as to frequency shift the modulated inaudible signal, upon demodulation by hardware of a microphone system, e.g., by causing non-linearities of the hardware to translate the first ultrasonic frequency of the modulated inaudible signal to below a low-pass filter (LPF) cutoff frequency that is recordable by the microphone system. In one embodiment, the frequency after the frequency shift is at about the mid-point of the LPF cutoff frequency.

In one embodiment, the disclosed audio transmitter may play two tones at say 40 kHz and 50 kHz. When these tones arrive together at the microphone's power amplifier, these tones are amplified as expected, but also multiplied due to fundamental non-linearities in the sound recording system. Multiplication of frequencies $f_1$ and $f_2$ result in frequency components at $(f_1-f_2)$ and $(f_1+f_2)$. Given that $(f_1-f_2)$ is 10 kHz in this case, well within the microphone's range, the signal passes unaltered through the LPF. Human ears do not exhibit such non-linearities and filter out the 40 kHz and 50 kHz sounds, which remain inaudible even after being combined in the air.

While the above is a trivial case of sending a tone, the disclosed audio transmitter may load data on the transmitted carrier signals that is to be demodulated by the microphone. This entails various challenges. First, the non-linearities to be exploited are not unique to the microphone; they are also present in speakers that transmit the sounds. As a result, the speaker also produces a shadow within the audible range, making its output audible to humans. We address this by using multiple speakers and isolating the signals in frequency across the ultrasonic speakers. We show, both analytically and empirically, that none of these isolated sounds create a shadow as they pass through the diaphragm of the ultrasonic speakers and amplifier. However, once these sounds arrive and combine non-linearly inside the microphone, the shadow emerges within the audible range.

Second, for communication applications, standard modulation and coding schemes are not to be used directly. The system design discussion below illustrates how appropriate frequency-modulation, combined with inverse filtering, resonance alignment, and ringing mitigation are employed in an ultrasonic transmitter to boost achievable data rates.

Finally, for security applications, jamming includes transmitting noisy signals that cover the entire audible frequency range. With audible jammers, this means speakers are to operate at very high volumes. Later system design disclosure explains how to achieve equally effective jamming, but in complete silence. The disclosed design leverages the adaptive gain control (AGC) in microphones, in conjunction with selective frequency distortion, to improve jamming at modest power levels.

A disclosed transmitter prototype may be built on customized ultrasonic speakers and evaluated for both communication and security applications across different types of mobile devices. Our results reveal that 100 different sounds played to seven individuals confirmed that the disclosed ultrasonic transmitter was inaudible. The ultrasonic transmitter attained data rates of 4 kbps at a distance of 1 meter, and 2 kbps at 1.5 meters, which is two times higher in throughput and five times higher in distance than systems that use the near-ultrasonic band. The ultrasonic transmitter is able to jam and prevent the recording of any conversation within a radius of 3.5 meters (and potentially room-level coverage with higher power). When 2000 English words were played back to seven humans and speech recognition software, less than 15% of the words were decoded correctly. Audible jammers, aiming at comparable performance, would need to play white noise at a loudness of 97 decibel of sound pressure level (dBSPL), considered seriously harmful to human ears.

In practice, common acoustic recording systems maintain strong linearity in the audible frequency range; outside this range, the response exhibits non-linearity. Thus, for frequencies greater than 25 kHz, the net recorded sound ($S_{out}$) may be expressed in terms of the input sound (S) as follows:

$$S_{out}|_{f>25} = \sum_{i=1}^{\infty} A_i S^i = A_1 S + A_2 S^2 + A_3 S^3 + \ldots$$

While in theory the non-linear output is an infinite power series, the third and higher order terms are extremely weak and can be ignored. The disclosed ultrasonic transmitter finds opportunities to exploit the second order term, which can be manipulated by designing the input signal, S.

As mentioned, the disclosed ultrasonic transmitter may operate the microphone at high (inaudible) frequencies, thereby invoking the non-linear behavior in the diaphragm 120 and the pre-amplifier 130. This is counter-intuitive because most researchers and engineers strive to avoid non-linearity. In the disclosed design, however, we create an inlet into the audible frequency range and non-linearity as a "backdoor" to access the audible range but with inaudible (ultrasonic) frequencies.

To operate the microphone in its non-linear range, we use ultrasonic speakers to play a sound S, composed of two inaudible tones $S_1$=40 kHz and $S_2$=50 kHz. Mathematically, $S=\mathrm{Sin}(2\pi 40 t)+\mathrm{Sin}(2\pi 50 t)$. After passing through the diaphragm and pre-amplifier of the microphone, the output $S_{out}$ can be modeled as:

$$S_{out} = A_1(S_1 + S_2) + A_2(S_1 + S_2)^2 =$$
$$A_1\{\mathrm{Sin}(\omega_1 t) + \mathrm{Sin}(\omega_2 t)\} + A_2\{\mathrm{Sin}^2(\omega_1 t) + \mathrm{Sin}^2(\omega_2 t) + 2\mathrm{Sin}(\omega_1 t)\mathrm{Sin}(\omega_2 t)\}$$

where $\omega_1=2\pi 40$ and $\omega_2=2\pi 50$.

Now, the first order terms produce frequencies $\omega_1$ and $\omega_2$ that lie outside the microphone's cutoff frequency. The second order terms, however, are a multiplication of signals, resulting in various frequency components, namely, $2\omega_1$, $2\omega_2$, $(\omega_1-\omega_2)$, and $(\omega_1+\omega_2)$. Mathematically, $$A_2(S_1+S_2)^2 = 1 - \tfrac{1}{2}\mathrm{Cos}(2\omega_1 t) - \tfrac{1}{2}\mathrm{Cos}(2\omega_2 t) + \mathrm{Cos}((\omega_1-\omega_2)t) - \mathrm{Cos}((\omega_1+\omega_2)t)$$

With the microphone's cutoff frequency at 24 kHz, the higher frequencies in $S_{out}$ get filtered out by the LPF, except $\mathrm{Cos}((\omega_1-\omega_2)t)$, which is essentially a 10 kHz tone in the present example (in the middle of human audible frequency range). The ADC is oblivious of how this 10 kHz signal was generated and records it like any other sound signal. We call this the shadow signal. The net effect is that an inaudible frequency has been recorded by unmodified off-the-shelf microphones.

For the above to work with unmodified, off-the-shelf microphones, two assumptions need validation. First, the diaphragm 120 of the microphone should exhibit some sensitivity at the high-end frequencies (greater than 30 kHz). If the diaphragm does not vibrate at such frequencies, there is no opportunity for non-linear mixing of signals. Second, the second order coefficient, $A_2$, needs to be adequately high to achieve a meaningful signal-to-noise ratio (SNR) for the shadow signal, while the third and fourth order coefficients ($A_3$, $A_4$) should be negligibly weak. These are verified next.

Figure 4A:
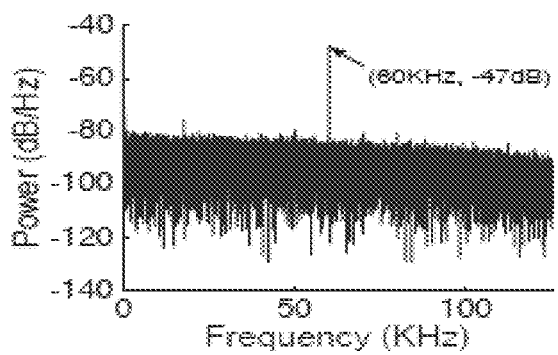
FIG. 4A is a graph illustrating microphone signals measured before being low-pass filtered by a sound recording system, illustrating the diaphragm and pre-amplifier's sensitivity of ultrasonic frequencies according to an embodiment.
Figure 4B:
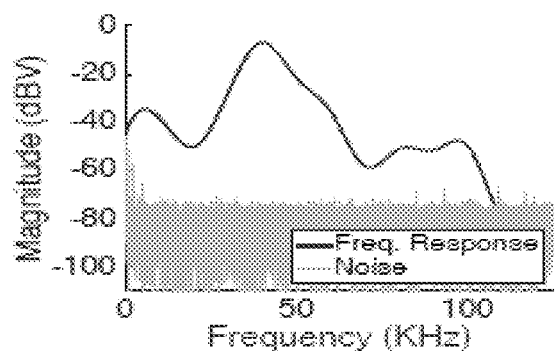
FIG. 4B is a graph illustrating a full frequency response output of an amplifier of the sound recording system of FIG. 4A, according to an embodiment.

FIG. 4A is a graph illustrating microphone signals measured before being low-pass filtered by a sound recording system, illustrating the diaphragm and pre-amplifier's sensitivity of ultrasonic frequencies according to an embodiment. FIGS. 4A and 4B report the results when a 60 kHz sound was played through an ultrasonic speaker and recorded with a programmable microphone circuit. To verify the presence of a response at this high frequency, we hacked the circuit using an FPGA kit, and tapped into the signal before it entered the LPF. FIG. 4A illustrates the clear detection of the 60 kHz tone, confirming that the diaphragm indeed vibrates to ultrasounds.

FIG. 4B is a graph illustrating a full frequency response output of an amplifier of the sound recording system of FIG. 4A, according to an embodiment. We also measured the channel frequency response at the output of the preamplifier (before the LPF), and the results are illustrated in FIG. 4B. Accordingly, the analog components indeed operate at a much wider bandwidth; it is the digital domain that restricts the operating range.

Figure 5A:
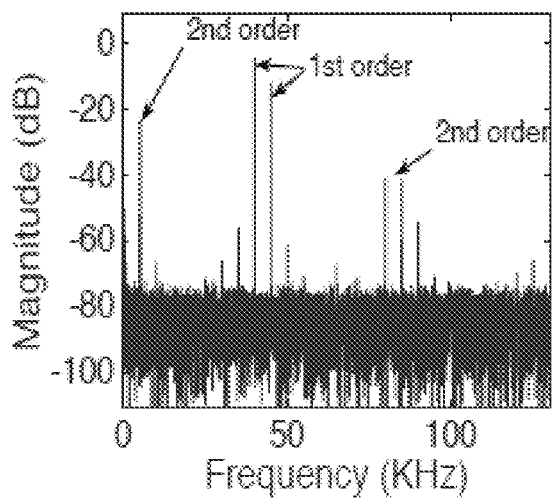
FIG. 5A is a graph illustrating an entire spectrum after non-linear mixing has occurred, but before application of a low-pass filter according to an embodiment.
Figure 5B:
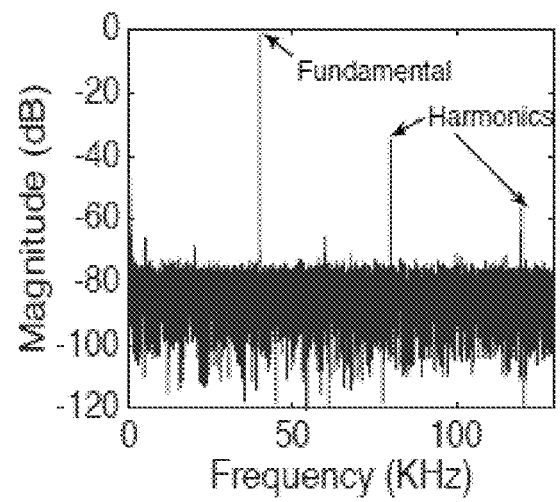
FIG. 5B is a graph illustrating harmonic distortion on a single frequency generated from non-linearities of microphone hardware according to an embodiment.

FIG. 5A is a graph illustrating an entire spectrum after non-linear mixing has occurred, but before application of a low-pass filter according to an embodiment. Except for the shadow at $(\omega_1-\omega_2)$, we observe that all other frequency spikes are above the LPF's 24 kHz cutoff frequency. FIG. 5B is a graph illustrating harmonic distortion on a single frequency generated from non-linearities of microphone hardware according to an embodiment. The nonlinear effect on a single frequency produces integer multiples of the original frequency, e.g., $\omega$, $2\omega$, $3\omega$, and so on. These two types of nonlinear distortions are called intermodulation and harmonic distortions, respectively. The shadow signal may still be conspicuously above the noise floor, while the third order distortion is marginally above noise. This confirms the core opportunity to leverage the shadow.

Figure 6:
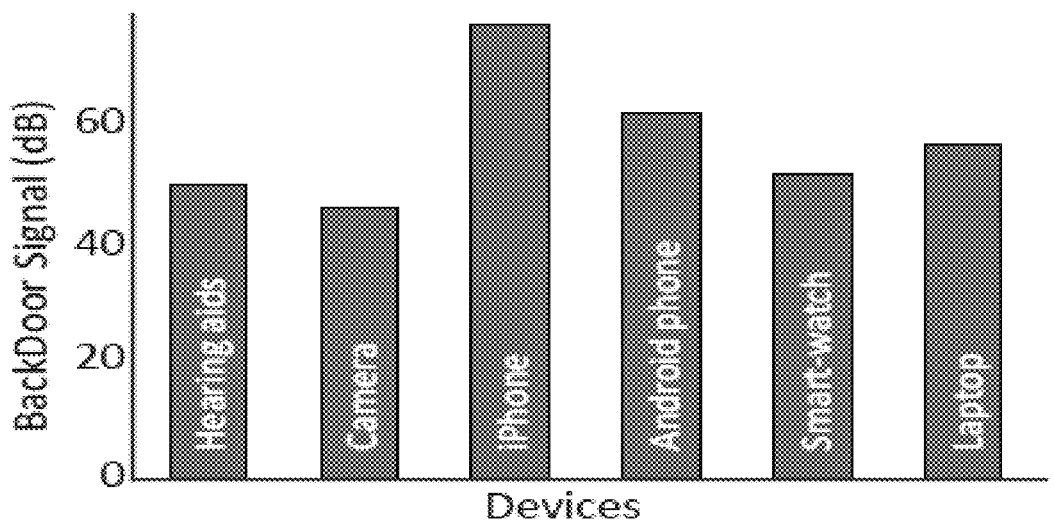
FIG. 6 is a bar graph illustrating a consistent shadow at 5 KHz in response to a pair of ultrasonic tones of 45 kHz and 50 kHz, respectively, confirming non-linearity across various microphone platforms according to various embodiments.

FIG. 6 is a bar graph illustrating a consistent shadow at 5 KHz in response to a pair of ultrasonic tones of 45 kHz and 50 kHz, respectively, confirming non-linearity across various microphone platforms according to various embodiments. Measurements obtained confirm that non-linearities are present in different kinds of hardware (not just a specific make or model). To this end, we played high frequency sounds and recorded them across a variety of devices, including smartphones (iPhone 5S, Samsung Galaxy S6), smartwatch (Samsung Gear2), video camera (Canon PowerShot ELPH 300HS), hearing aids (Kirkland Signature 5.0), laptop (MacBook Pro), and the like. FIG. 6 summarizes the SNR for the shadow signals for each of these devices. The SNR is uniformly conspicuous across all the devices, suggesting potential for widespread applicability.

Thus far, the shadow signal is a trivial tone carrying one-bit of information (presence or absence). While this was useful for explanation, the actual goal is to modulate the high frequency signals at the speaker so that the shadow is demodulated at the microphone to achieve meaningful data rates. We discuss the challenges and opportunities in developing this communication system.

We first set out to modulate a single ultrasonic tone, a data carrier, with a message signal, m(t). Assuming amplitude modulation, this results in $m(t)Sin(\omega_c t)$, where $\omega_c$ is a high frequency, ultrasonic carrier. Now, if $m(t)=a\, Sin((\omega_m t)$, then the speaker should produce this signal:

$$S_{AM}=a\, Sin(\omega_m t)Sin(\omega_c t)$$

Now, when this signal arrives at the microphone and passes through the non-linearities, the squared components of the amplifier's output will be:

$$\begin{aligned}S^2_{out,AM} &= A_2\{aSin(\omega_m t)\cdot Sin(\omega_c t)\}^2 \\ &= -A_2\frac{a^2}{4}\{Cos(\omega_c t-\omega_m t)-Cos(\omega_c t+\omega_m t)\}^2 \\ &= -A_2\frac{a^2}{4}Cos(2\omega_m t) + \text{(terms with frequencies above }\omega_c\text{ and DC)}\end{aligned}$$

The result is a signal that contains a $Cos(2\omega_m t)$ component. So long as $\omega_m$, the frequency of the data signal, is less than 10 kHz, the corresponding shadow at $2\omega_m=20$ kHz is within the LPF cutoff. Thus, the received sound data can be band-pass filtered in software, and the data signal correctly demodulated.

The above phenomenon is reminiscent of coherent demodulation in radios, where the receiver would have multiplied the modulated signal (a $Sin(\omega_m t)Sin(\omega_c t)$) with the frequency and a phase-synchronized carrier signal, Sin $(\omega_c t)$. The result would be the m(t) signal in baseband, e.g., the carrier frequency $\omega_c$ is eliminated. Our case is somewhat similar: the carrier also gets eliminated, and the message signal appears at $2\omega_m$ (instead of $\omega_m$). This is hardly a problem since the signal can be extracted via band-pass filtering. Thus, the net benefit is that the microphone's non-linearity naturally demodulates the signal and translates it to within the LPF cutoff, requiring no changes to the microphone. Put differently, non-linearity in off-the-shelf microphones may be a natural form of self-demodulation and frequency translation, the root of our opportunity.

Figure 7:
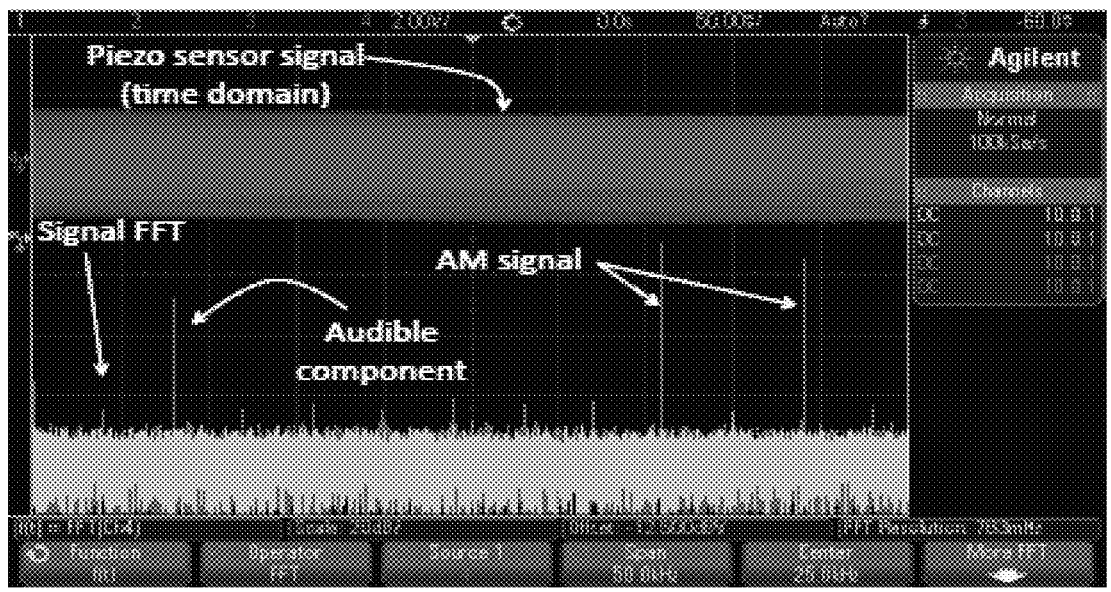
FIG. 7 is an oscilloscope screen shot illustrating that an amplitude-modulated (AM) signal produces an audible frequency due to self-demodulation according to an embodiment.

In some embodiments, however, part of the ultrasonic transmitter—a speaker with a diaphragm—also exhibits non-linearity. The above property of self-demodulation triggers in the transmitter side as well, resulting in m(t) becoming audible. FIG. 7 is an oscilloscope screen shot illustrating that an amplitude-modulated (AM) signal produces an audible frequency due to self-demodulation according to an embodiment. FIG. 7 shows the output of the speaker as visualized by the oscilloscope; a distinct audible component appears due to amplitude modulation. In fact, any modulation that generates waveforms with non-constant envelopes is likely to suffer this problem. This is unacceptable and brings forth a first design hurdle of how to cope with transmitter-side non-linearity.

The design goal at this point is to modulate the carrier signal with data without affecting the envelope of the transmitted signal. This raises the possibility of angle modulation (e.g., modulating the phase or frequency but leaving amplitude untouched). However, we recognized that phase modulation (PM) is also unsuitable in this application because of unpredictable noise from phone movements. In particular, the smaller wavelength of ultrasonic signals is easily affected by phase noise and involves complicated receiver-side schemes during demodulation. Therefore, we choose the other alternative of angle modulation: frequency modulation (FM). Of course, FM modulation is not without tradeoffs; we discuss them and address the design questions step by step.

Frequency-modulated (FM) signals, unlike AM, do not get naturally demodulated or frequency-translated when pass through the non-linear transmitter. Assuming $Cos(\omega_m t)$ as the message signal, we have the input to the speaker as:

$$S_{fm}=Sin(\omega_c t+\beta\, Sin(\omega_m t))$$

The phase of the FM carrier signal may be the integral of the message signal, hence it is $Sin(\omega_m t)$. Now when $S_{fm}$ gets squared due to non-linearity, the result is of the form $(1+Cos(2\omega_c t+\text{otherTerms}))$, e.g., a DC component and another component at $2\omega_c$. Hence, along with the original $\omega_c$ carrier frequency, the audio transmitter output contains frequency at $2\omega_c$, both above the audible cutoff frequency. Thus, nothing gets recorded by the microphone. The advantage, however, is that the output of the speaker is no longer audible. Moreover, as the speaker has a low response at high frequencies near $2\omega_c$, the output signal is dominated by the data signal at $\omega_c$ as in original $S_{fm}$.

To get the message signal recorded, we need to frequency-shift the signal at $\omega_c$ to the microphone's audible range, without affecting the signal transmitted from the speaker. To achieve this, the ultrasonic transmitter introduces a second ultra-sonic signal transmitted from a second speaker collocated with the first speaker. Let us assume this second signal is called the secondary carrier, $\omega_s$. Since $\omega_s$ does not mix with $\omega_c$ at the transmitter, the signal that arrives at the microphone diaphragm is of the form:

$$S_{fm}^{Rr} = (A_1 \sin(\omega_c t + \beta \sin \omega_m t) + A_1 \sin(\omega_s t))$$

In various embodiments, the first term is from the FM modulated $\omega_c$ signal, and the second term is from the secondary carrier, $\omega_s$. Now, upon arriving on the receiver, the microphone's non-linearity essentially squares this whole signal as $(S_{fm}^{Rx})^2$. Expanding this mathematically results in a set of frequencies centered at $(\omega_c - \omega s)$, and the others at $(\omega_c + \omega_s)$, $2\omega_c$, and $2\omega_s$. If we design $\omega_c$ and $\omega_s$ to have a difference less than the LPF cutoff, the microphone can record the signal.

Upon consideration of the parameters of the system, the choice of $\omega_c$ and $\omega_s$ became clear. First, note that the FM-modulated signal has a bandwidth of, say 2 W, ranging from $(\omega_c - W)$ to $(\omega_c + W)$. Thus, assuming that the microphone's LPF cutoff frequency is 20 kHz, the audio transmitter should translate the center frequency to 10 kHz; this maximizes W that can be recorded by the microphone. Accordingly, we know that $(\omega_c - \omega_s) = 10$ kHz.

Figure 8:
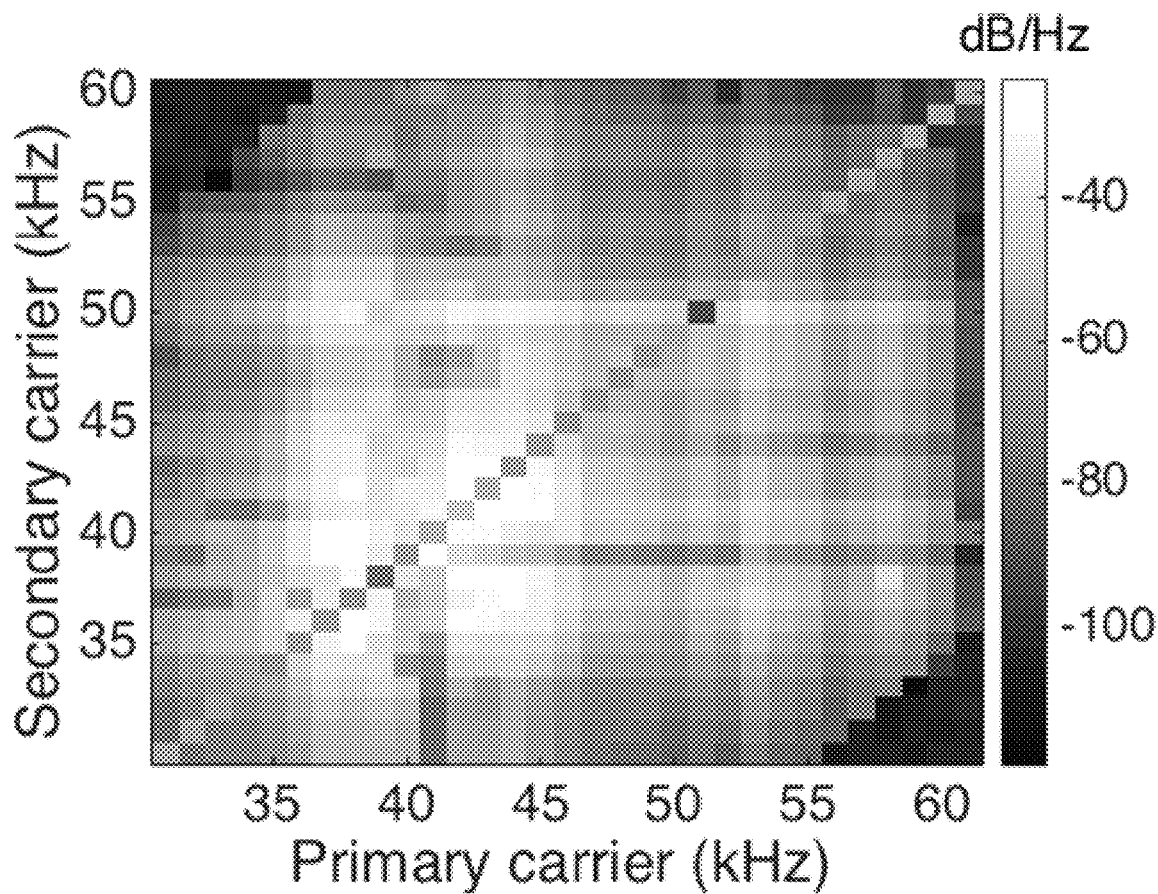
FIG. 8 is a plot illustrating normalized power of a translated signal for different values of a carrier signal ($\omega_c$) and a second carrier signal ($\omega s$), according to an embodiment.

Second, the microphone's diaphragm exhibits resonance at certain frequencies; $\omega_c$ and $\omega_s$ should leverage this to improve the strength of the recorded signal. FIG. 8 is a plot illustrating normalized power of a translated signal for different values of the carrier signal ($\omega_c$) and a second carrier signal ($\omega_s$), according to an embodiment. Given $(\omega_c - \omega_s) = 10$ kHz, the resonance effects demonstrate the maximum response when $\omega_c$ is 40 kHz, and $\omega_s$ is 50 kHz.

The piezo-electric material in the speaker, that actually vibrates to create the sound, behaves as an oscillatory inductive-capacitive circuit. This loosely means that the actual vibration is a weighted sum of input sound samples (from the recent past), and hence, the piezo-electric material has a heavy-tailed impulse response, as illustrated in FIGS. 9A and 9B. FIG. 9A is a plot of a prolonged oscillation in an ultrasonic transmitter following a 40 kHz sine burst input according to an embodiment. FIG. 9B is a plot of an impulse response of the ultrasonic transmitter of FIG. 9A according to an embodiment. Mathematically, the output of the speaker can be computed as a convolution between this impulse response and the input signal. Unfortunately, the non-linearity of the speaker impacts this convolution process as well, and generates low frequency components similar to the natural demodulation effect discussed earlier. The result is a ringing effect, e.g., the transmitted sound becomes slightly audible even with FM modulation.

To explain the self-demodulation effect, we assume a simplified impulse response, h:

$$h = \sum_{i=0}^{\infty} k_i \delta(t-i) \approx k_0 \delta(t) + k_1 \delta(t-1)$$

When an angle modulated (FM/PM) signal, S, is convolved with h, the output $S_{out}$ is:

$$S_{out} = S * h$$
$$= \sin(\omega_c t + \beta \sin(\omega_m t)) * (k_0 \delta(t) + k_1 \delta(t-1))$$

-continued
$$= k_0 \sin(\omega_c t + \beta \sin(\omega_m t)) + k_1 \sin(\omega_c (t-1) + \beta \sin(\omega_m (t-1)))$$

While $S_{out}$ contains only high frequency components (since convolution is linear), the non-linear counterpart $S_2$ out mixes the frequencies in a way that has lower frequency components (or shadows):

$$S_{out}^2 = k_0 k_1 \cos\left(\omega_c + 2\beta \sin\left(\frac{\omega_m}{2}\right)\sin\left(\omega_m t - \frac{\omega_m}{2}\right)\right) +$$

(terms with frequencies over $2\omega_c$ and DC)

FIGS. 10A, 10B, 10C, and 10D are plots illustrating a spectrogram of $S_{out}$ and $S_{out}^2$ with and without convolution, where the shadow signal appears due to second-order non-linear effects on the convolved signal, according to an embodiment. Observe the low frequency shadow that appears due to the second order term for the convolved signal: this shadow causes the ringing and is noticeable to humans.

In most speakers, this shadow signal is weak; some expensive speakers even design their piezo-electric materials to be linear in a wider operating region precluding this possibility. However, we intend to be functional across all speaker platforms (even the cheapest ones) and aim to be free of any ringing. Hence, we adopt an inverse filtering approach to remove ringing.

Figure 11A:
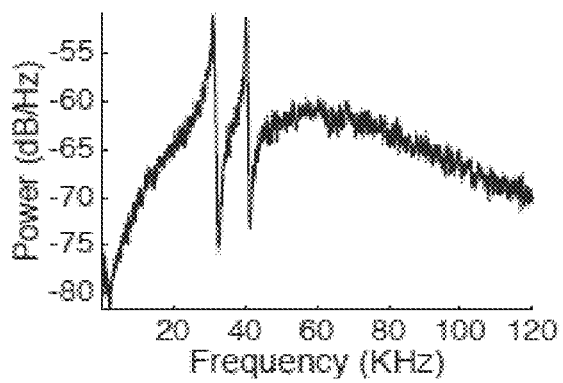
FIG. 11A is a plot illustrating a frequency response of an ultrasonic speaker according to an embodiment.
Figure 11B:
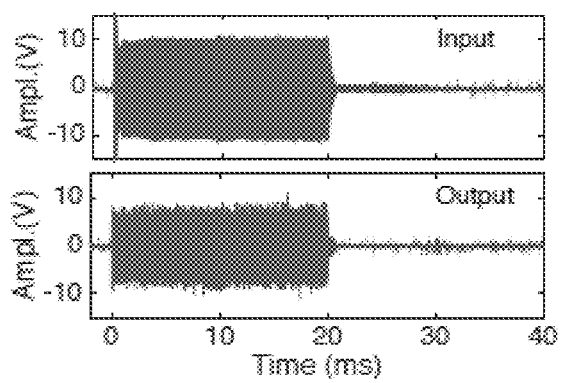
FIG. 11B is a plot illustrating an inverse filtering method that nearly eliminates the ringing effect present in FIGS. 9A and 9B according to an embodiment.

We learn from pre-coding in wireless communication by modifying the input signal $S_{fm}$ so that it remains the same after convolution. In other words, if the modified signal $S_{mod} = h-1 * S_{fm}$, then the impact of convolution on $S_{mod}$ results in $h*h-1*S_{fm}$, which is $S_{fm}$ itself. With $S_{fm}$ as the output of the speaker, we do not experience ringing. We may compute h-1 to learn the coefficients of the impulse response. For this, we monitor the current passing through the ultrasonic transmitter at different frequencies and calculate the ($k_0$, $k_1$, $k_2$, . . . ). Fortunately, unlike wireless channels, the response of the transmitter does not vary over time and hence the coefficients of the inverse filter can be pre-calculated. FIG. 11A illustrates the frequency response of one of our ultrasonic speakers, while FIG. 11B illustrates how our inverse filtering scheme nearly eliminates the ringing effect.

This completes the transmitter design and the receiver is now an unmodified microphone (from off-the-shelf phones, cameras, laptops, etc.). Of course, to extract the data bits, we need to receive the output signal from the microphone and decode them in software. For example, in smartphones, we have used the native recording app, and operated on the stored signal output. The decoding steps are as follows.

In embodiments, we begin by band pass filtering the signal as per the modulating bandwidth. Then, we convert this signal to its baseband version and calculate the instantaneous frequency to recover the modulating signal, m(t). This signal contains the negative-side frequencies that overlap with the spectrum-of-interest during the baseband conversion. To remove the negative frequencies, we Hilbert Transform the signal, producing a complex signal. Now, for baseband conversion, we multiply this complex signal with another complex signal, $e^{-j2\pi(\omega_s - \omega_c)t}$. Here $(\omega_s - \omega_c)$ is 10 kHz, e.g., the shifted carrier frequency. This operation brings the modulated spectrum to baseband, centered around DC. The differentiation of its phase gives the instantaneous frequency, which is then simply mapped to data bits.

Imagine military applications in which a private conversation needs to be held in an untrusted environment, potentially bugged with spy microphones. We envision turning on one or a few ultrasonic transmitters in that room. The ultrasonic transmitters will broadcast appropriately designed ultrasonic signals that will not interfere with human conversation, but will jam microphones in the vicinity. This section targets two jamming techniques towards this goal: (1) passive gain suppression, and (2) active frequency distortion. Together, the techniques mitigate electronic eavesdropping.

In various embodiments, we leverage the automatic gain control (AGC) circuit in the microphone to suppress voice conversations. By transmitting, in the disclosed ultrasonic transmitters, a narrowband ultrasonic frequency at high amplitude, we expect to force the microphone to alter its dynamic range, thereby weakening the SNR of the voice signal.

Our acoustic environment has large variations in volume levels ranging from soft whispers to loud bangs. While human ears seamlessly handle this dynamic range, it poses one of the major difficulties in microphones. Specifically, when a microphone is configured at a fixed gain level, the microphone fails to record a soft signal below the minimum quantization limit, while a loud sound above the upper range is clipped, causing severe distortions. To cope, microphones use an Automatic Gain Control (AGC) (as a part of its pre-amplifier circuit) that adjusts the signal amplitude to fit well within the ADC's lower and upper bounds. As a result, the signal covers the entire range of the ADC, offering the best possible signal resolution.

Figure 12A:
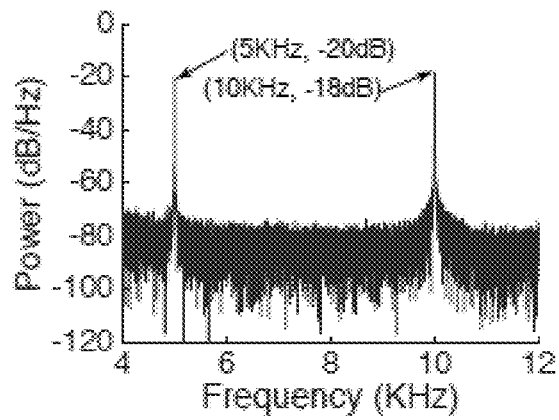
FIG. 12A is a plot illustrating the functioning of automatic gain control (AGC) on a pair of tones of 5 kHz and 10 kHz, respectively, according to an embodiment.
Figure 12B:
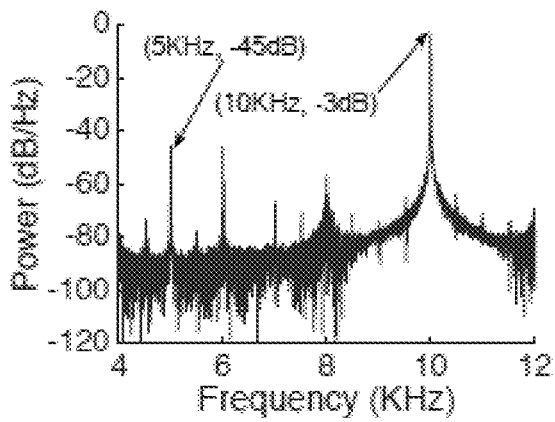
FIG. 12B is a plot illustrating that the 5 kHz tone reduces to −45 dB when the amplitude of the 10 kHz tone is made to exceed the AGC threshold according to an embodiment.

FIGS. 12A and 12B demonstrate the AGC operation in a common micro-electro-mechanical system (MEMS) microphone (ADMP401) connected to the line-in port of a Linux laptop running the ALSA sound driver. We simultaneously play 5 kHz and 10 kHz tones through two different, but collocated, speakers and display the power spectrum of the received sound. FIG. 12A reports both the signals at around −20 dB. However, when we increase the power of the 10 kHz signal to reach its AGC threshold (while keeping the 5 kHz signal unaltered), FIG. 12B illustrates how the microphone reduces the overall gain to accommodate the loud 10 kHz signal. This results in a 25 dB reduction of the unaltered 5 kHz signal, to about −45 dB, as illustrated in FIG. 12B.

Figure 13:
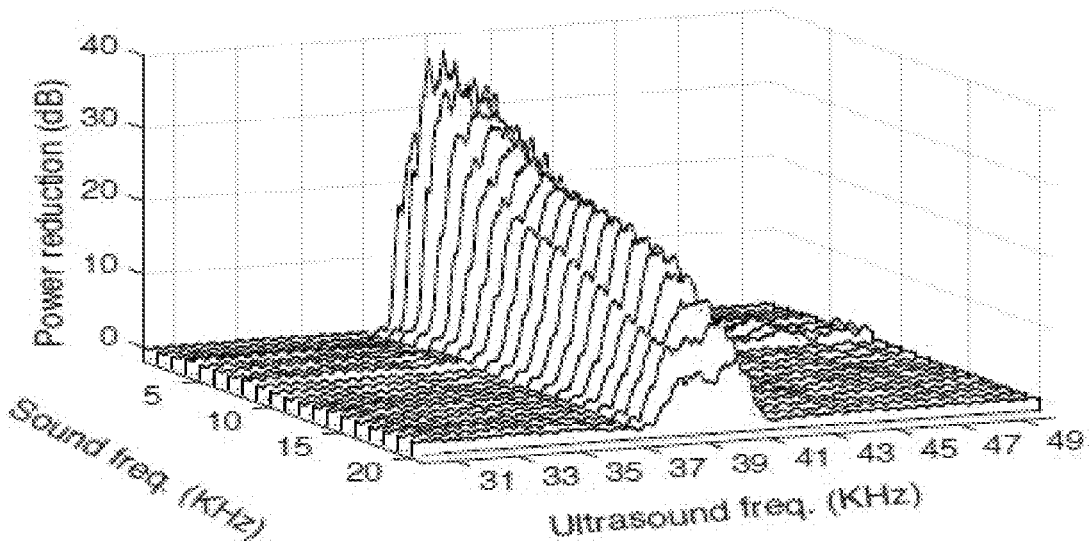
FIG. 13 is a plot illustrating the reduction in sound power due to voice suppression via AGC according to various embodiments.

Furthermore, when our ultrasonic signal at co, passes through the AGC (i.e., before this frequency is removed by the low pass filter), the microphone hardware alters the AGC gain configuration and significantly suppresses the voice signals in the audible frequency. FIG. 13 illustrates the reduction in the received sound power in a Samsung Galaxy S-6 smartphone when ultrasonic tones are played at different frequencies from a piezo-electric speaker. Evident from the plot of FIG. 13, the maximum reduction is due to the signal at 40 kHz: this is because 40 kHz is the resonance frequency of the piezoelectric transducer, and thereby delivers the highest power. In that sense, using the resonance frequency offers double gains, one towards increasing the SNR of our communication signal, and the other for jamming.

This reduction in signal amplitude results in low resolution when sampled with discrete quantization levels at the ADC. Indeed, an adequately loud ultrasonic tone can prevent the microphone from recording any meaningful voice signal by reducing its amplitude below the minimum quantization level. However, as the electrical noise level is usually higher than the minimum quantization level of the ADC, it is sufficient to reduce the signal power below that noise floor.

Figure 14:
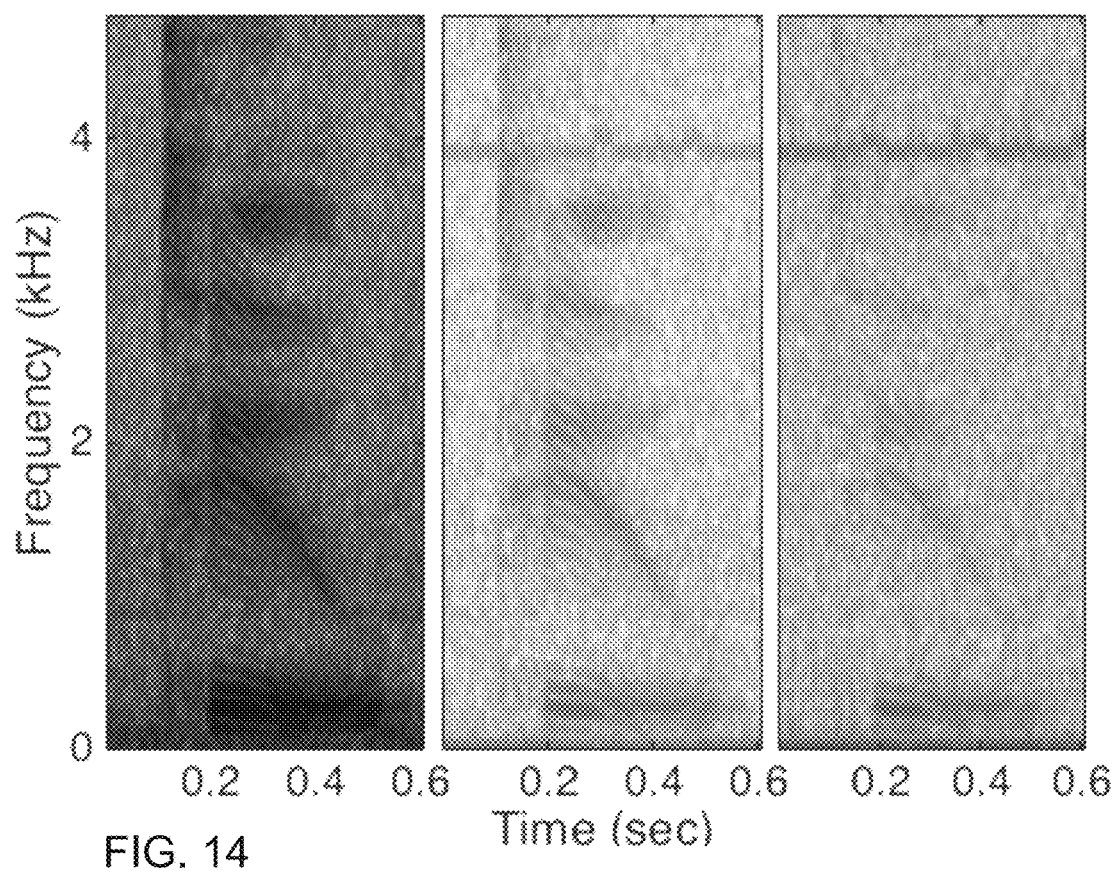
FIG. 14 is a series of three plots illustrating a progressive reduction in signal power (from left to right) of recorded voice segment for three power levels according to an embodiment.

FIG. 14 is a series of three plots illustrating a progressive reduction in signal power (from left to right) of recorded voice segment for three power levels of the 40 KHz tone according to an embodiment. In practice, an absolute amplitude reduction is difficult unless the speaker uses high power. High power speakers are possible with the disclosed ultrasonic transmission system because the jamming signal is inaudible. Regular white noise audio jammers operate below strict power levels to not interfere with human conversation/tolerance. This is an advantage of jamming with the disclosed ultrasonic transmission system. Nonetheless, we still attempt to lower the power requirement by injecting additional frequency distortions at the eavesdropper's microphone.

One jamming technique is to add strong white noise to reduce the SNR of the target signal. We first implement a similar technique—injecting frequency distortion—but with inaudible band-limited Gaussian noise. Specifically, the disclosed ultrasonic transmission system is to modulate the co, carrier with white noise, band-pass filtered to allow frequencies between 40 kHz to 52 kHz. The 52 kHz $\omega_s$ carrier shifts this noise to from 0 kHz to 12 kHz, which is sufficient to affect the voice signal.

To improve on the injection of frequency distortion, the disclosed ultrasonic transmission system may then shape the white noise signal to boost power in frequencies that are known to be targeted for voice applications. Note that these distortions are designed in the ultrasonic bands (to maintain inaudibility), and hence they are played through the ultrasonic speakers. We will later report results on word legibility as a function of the separation between the jammer and the spy microphone.

Figure 15A:
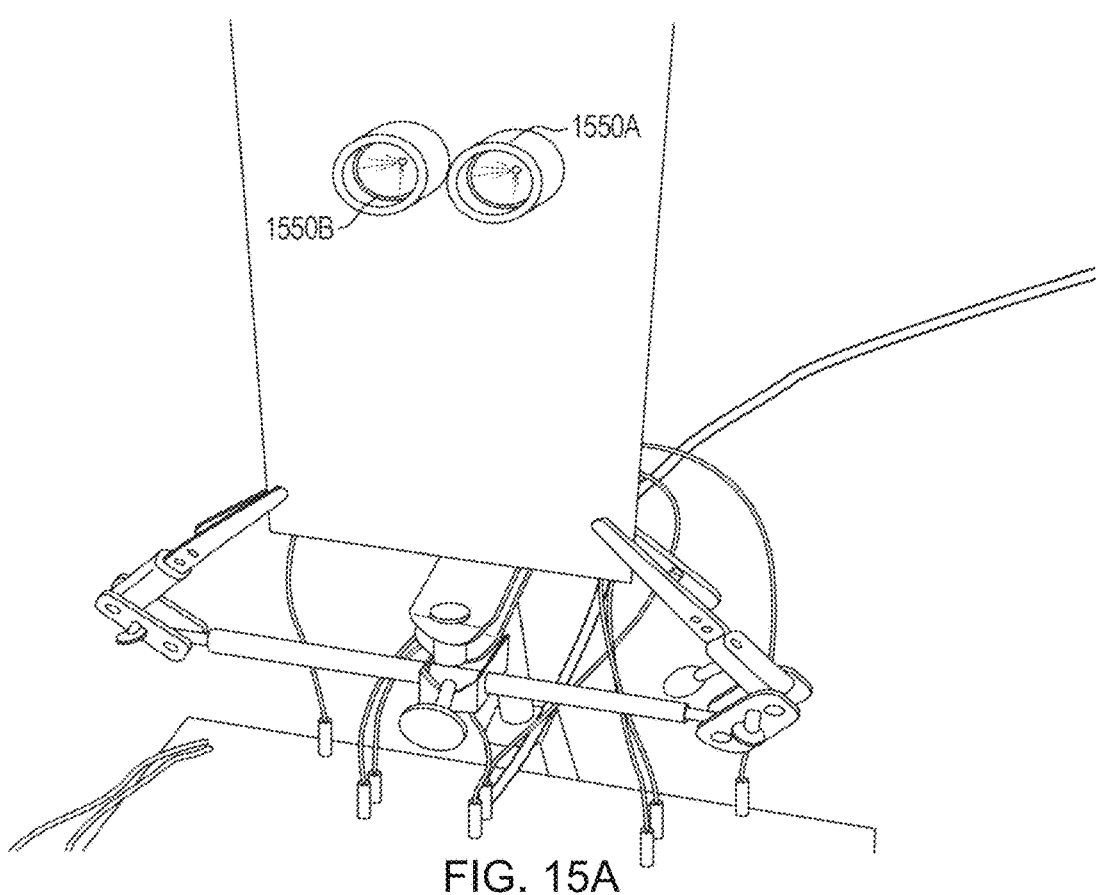
FIG. 15A is an image of a pair of ultrasonic speakers mounted on a circuit board for data communication, according to an embodiment.

FIG. 15A is an image of a first ultrasonic speaker 1550A and a second ultrasonic speaker 1550B, both mounted on a circuit board for data communication, according to an embodiment. The ultrasonic speakers 1550A and 1550B so mounted may be co-located so as to transmit together, from the same signal generator, to cause their joint inaudible signals to be combined with the hardware of a microphone system. In one embodiment, the ultrasonic speakers 1550A and 1550B are ultrasonic piezoelectric speakers where each transmits a separate frequency as discussed earlier.

Figure 15B:
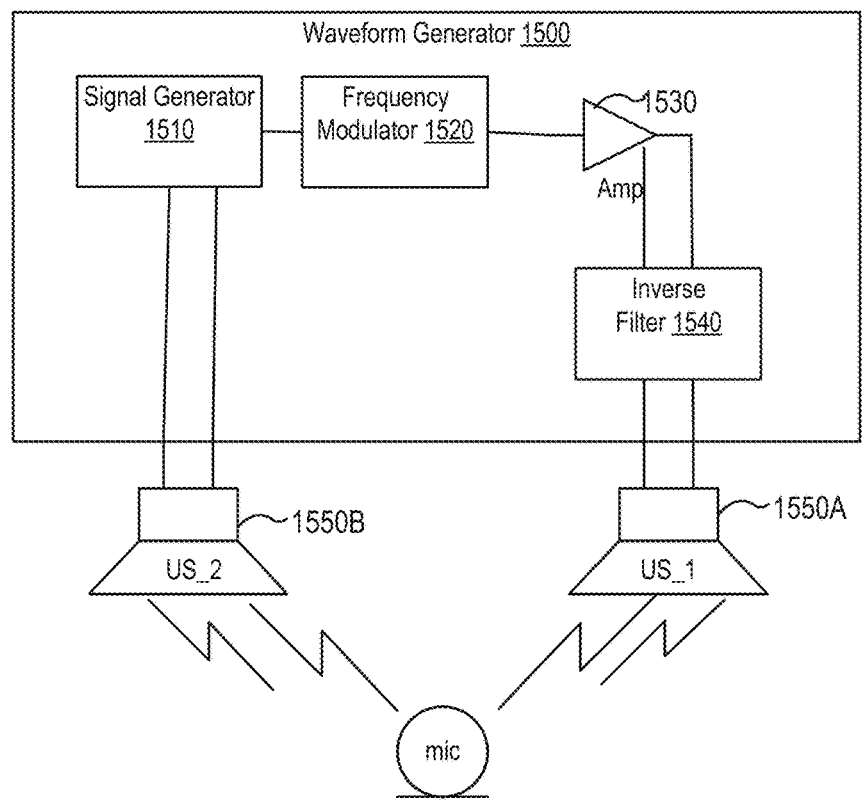
FIG. 15B is a block diagram of a waveform generator for driving the pair of ultrasonic speakers of FIG. 15A, according to an embodiment.

FIG. 15B is a block diagram of a waveform generator 1500 for driving the ultrasonic speakers 1550A and 1550B of FIG. 15A, according to an embodiment. The waveform generator may include, for example, a signal generator 1510, a frequency modulator 1520, an amplifier 1530, and an inverse filter 1540. In one embodiment, the signal generator 1510 may generate a first inaudible signal, at a first ultrasonic frequency, over a first channel and a second inaudible signal, at a second ultrasonic frequency, over a second channel of the waveform generator 1500. The signal generator 1510 may, in an alternative embodiment, generate the same, second inaudible signal and allow the frequency modulator 1520 to frequency modulate the second inaudible signal to the first ultrasonic frequency. In one embodiment, as used for purposes of experimentation, the waveform generator 1500 is a programmable Keysight 33500b series by Keysight Technologies, the amplifier 1530 is a NE5535AP op-amp-based, non-inverting amplifier, permitting signals up to 150 kHz.

In various embodiments, the frequency modulator 1520 may frequency modulate the first inaudible signal at the first ultrasonic frequency, to generate a modulated ultrasonic signal. The amplifier 1530 may further amplify the modulated ultrasonic signal generated by the signal generator 1510 before driving the first ultrasonic speaker 1550A with the modulated ultrasonic signal. The waveform generator 1500 may further include, to eliminate ringing (as previously discussed), the inverse filter 1540 coupled between the signal generator and the first ultrasonic speaker. The inverse filter 1540 may modify the modulated inaudible signal to generate a modified signal that remains substantially identical after convolution of the modified signal caused by a piezoelectric material of the first ultrasonic speaker 1550A. In various embodiments, the modulated ultrasonic signal and the second inaudible signal remain inaudible when combined in the air, which may be at least in part due to the eliminating of ringing via the inverse filtering.

With continued reference to FIG. 15B, the waveform generator 1500 may drive, over the first channel, the first ultrasonic speaker 1550A with the modulated inaudible signal (with or without the inverse filter 1540 having been applied). The waveform generator 1500 may further drive, over the second channel, the second ultrasonic speaker 1550B with the second inaudible signal at the second ultrasonic frequency. The second inaudible signal is to frequency shift the modulated inaudible signal, upon demodulation by hardware of a microphone system, including causing non-linearities of the hardware to translate the first ultrasonic frequency of the modulated inaudible signal to below a low-pass filter (LPF) cutoff frequency that is recordable by the microphone system.

In embodiments, a combination of the modulated inaudible signal and the second inaudible signal, as demodulated by the microphones system, is a received signal having a third frequency equal to a difference between the second ultrasonic frequency and the first ultrasonic frequency. Furthermore, the first and second ultrasonic frequencies may be set so that the received signal maximizes resonance of a diaphragm of the microphone system.

Figure 15C:
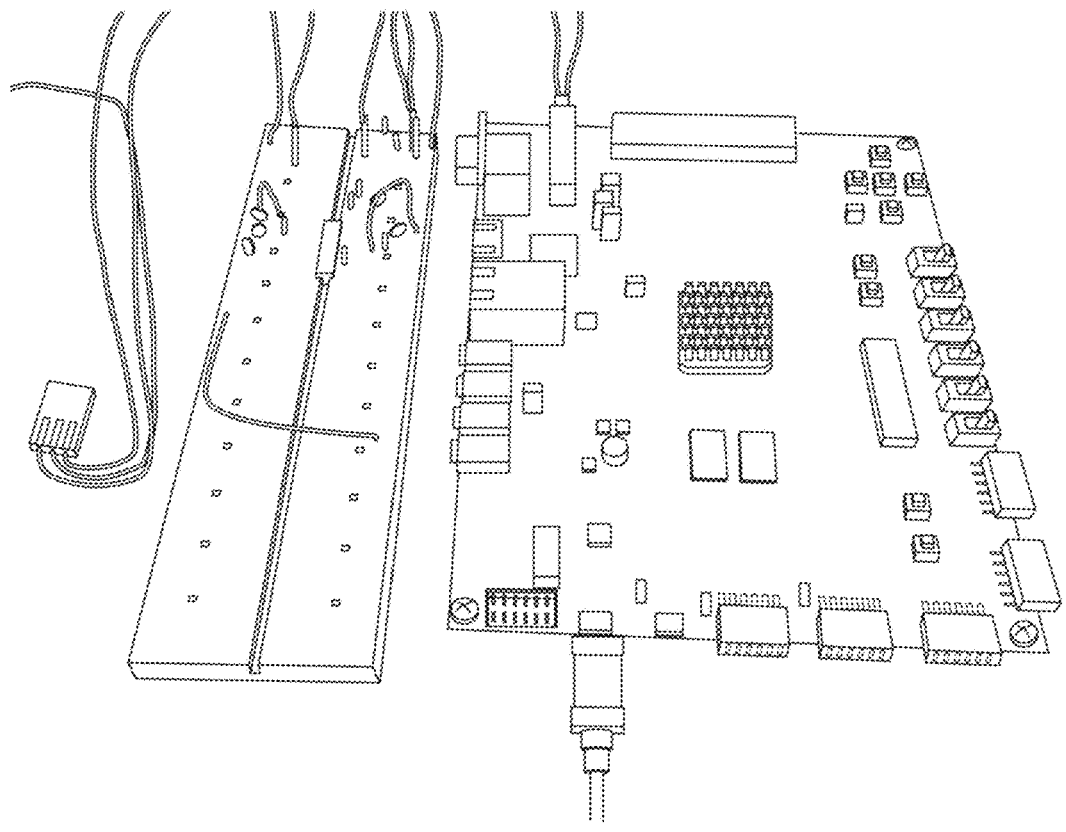
FIG. 15C is an image of a field programmable gate array (FPGA)-based set up for probing individual components of a sound recording system according to an embodiment.

We performed experiments using two types of receivers. The first was an off-the-shelf Samsung Galaxy S6 smartphone (released in August, 2015) running Android OS 5.1.1. Signals were recorded through a custom Android application using standard application programming interfaces (APIs). The second receiver is illustrated in FIG. 15C, which is an image of a field programmable gate array (FPGA)-based set up for probing individual components of a sound recording system according to an embodiment. The FPGA-based experimental setup was more involved and mainly used for micro-benchmarks reported earlier herein. This allowed us to tap into different components of the microphone pipeline, and analyze signals in isolation. The system runs on a high bandwidth data acquisition ZedBoard, a Xilinx Zynq-7000 SoC based FPGA platform, which offers a high-rate internal ADC (up to 1 Msample/sec). A MEMS microphone (ADMP 401) is externally connected to this ADC, offering undistorted insights into higher frequency bands of the spectrum. As discussed, however, other microphone and recording systems may be employed with similar results.

Figure 16A:
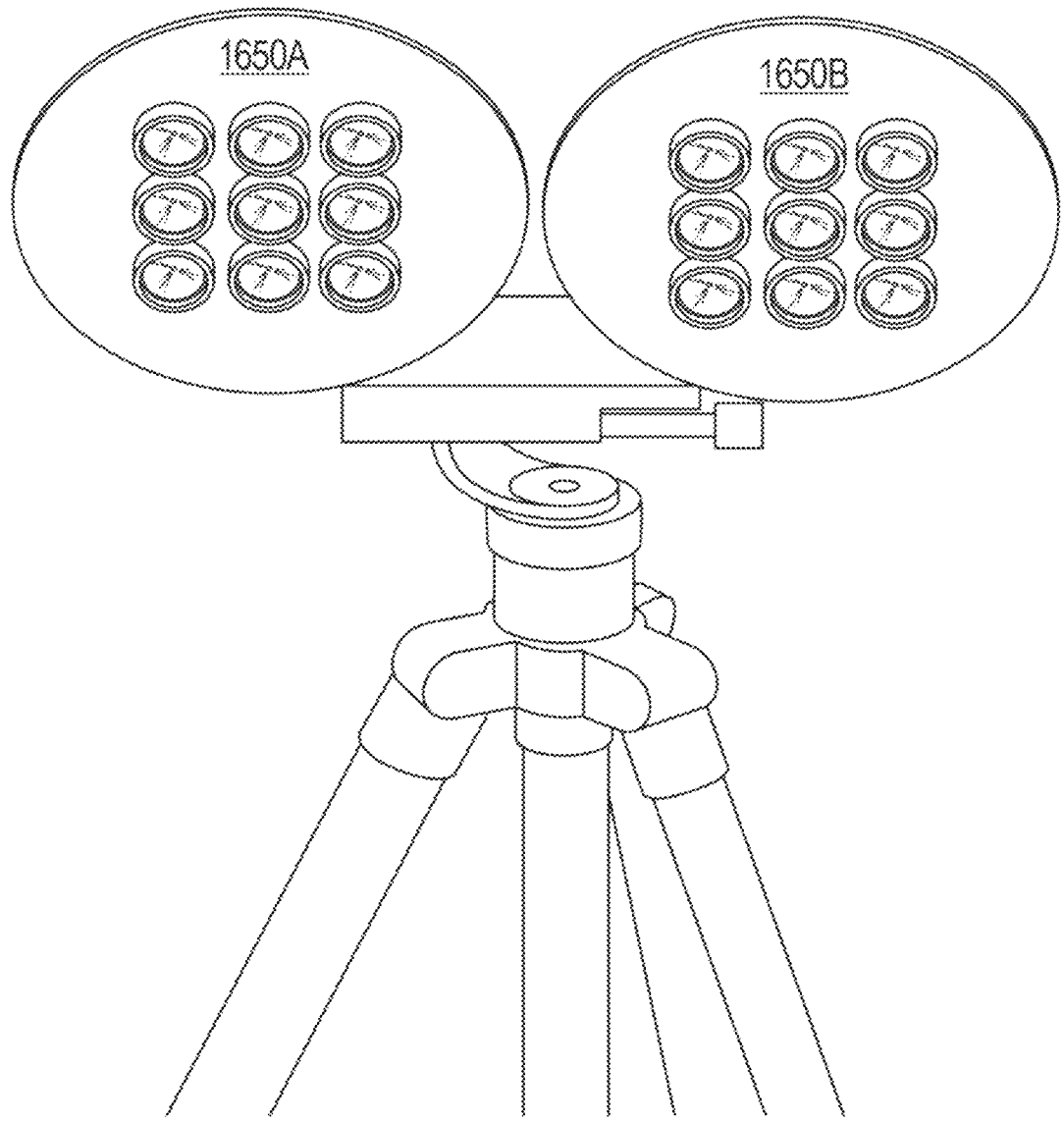
FIG. 16A is an image of a pair of ultrasonic speaker arrays useable in a system for jamming sound recording systems according to an embodiment.

FIG. 16A is an image of a first ultrasonic speaker array 1650A and a second ultrasonic speaker array 1650B useable in a system for jamming sound recording systems according to an embodiment. Each ultrasonic speaker array 1650A and 1650B may be made up of nine piezoelectric speakers connected in parallel to generate a two ("2") watt jamming signal, although other numbers and combinations of ultrasonic speakers is envisioned.

Figure 16B:
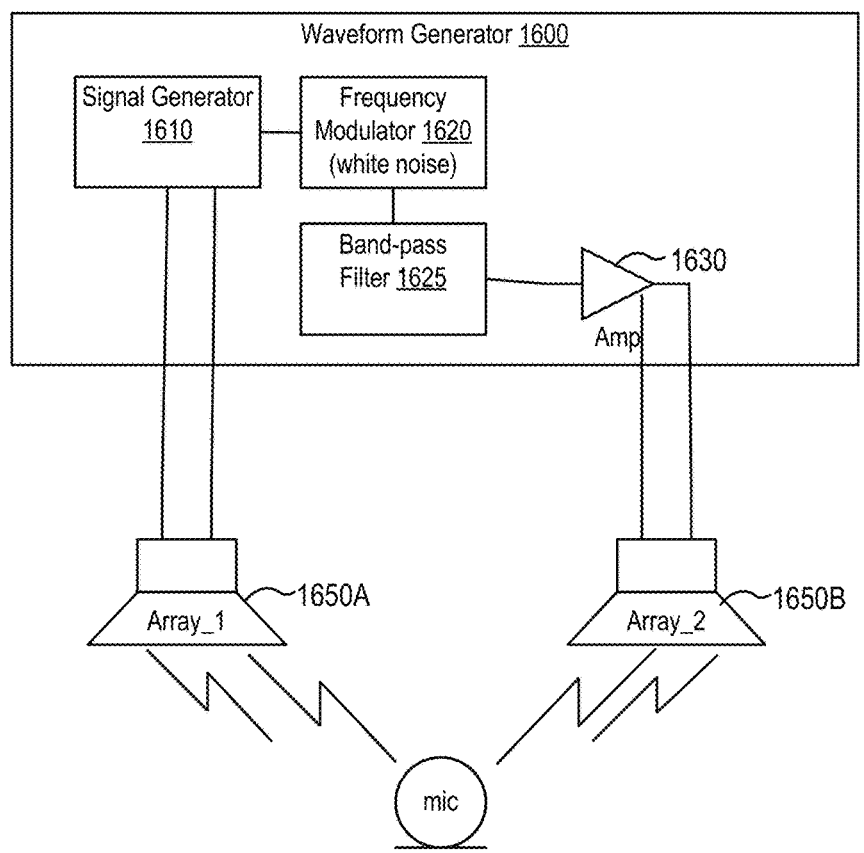
FIG. 16B is a block diagram of a waveform generator for driving the pair of ultrasonic speaker arrays of FIG. 16A.

FIG. 16B is a block diagram of a waveform generator 1600 for driving the ultrasonic speaker arrays 1650A and 1650B of FIG. 16A. In various embodiments, the waveform generator 1600 may include a signal generator 1610, a frequency modulator 1620 (e.g., that includes white noise), a band-pass filter 1625, and an amplifier 1630.

Figure 16C:
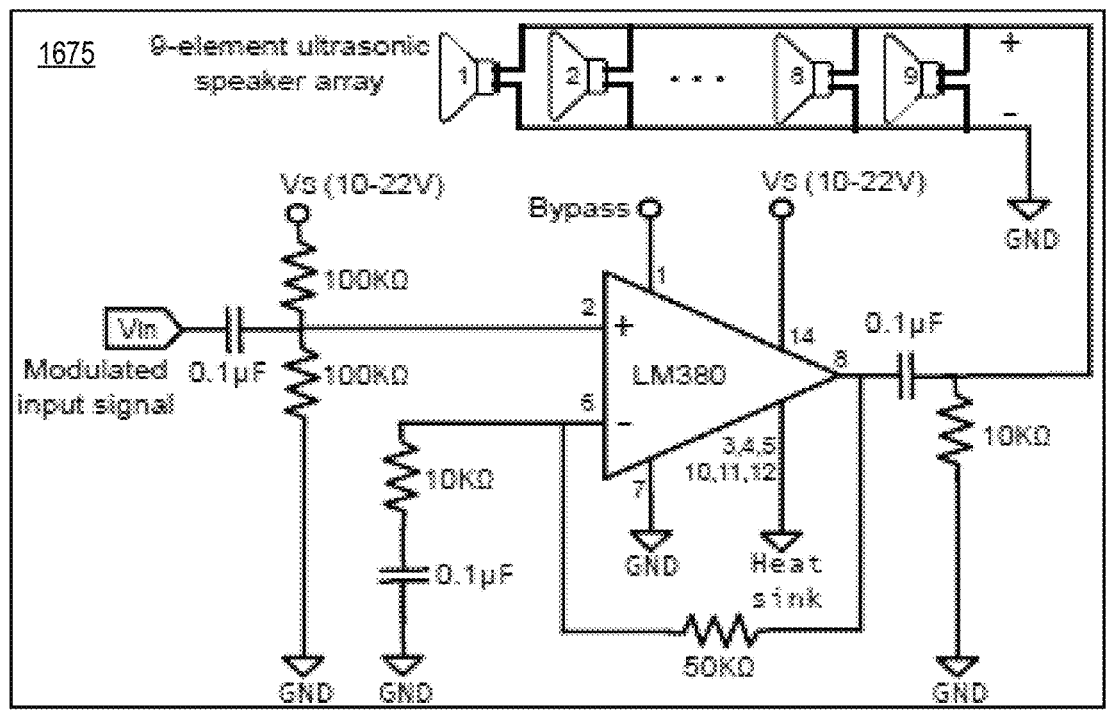
FIG. 16C is a circuit diagram of an ultrasonic jamming transmitter according to an embodiment.

FIG. 16C is a circuit diagram of an ultrasonic jamming transmitter 1675 according to an embodiment. The ultrasonic jamming transmitter 1675 may include an LM380 op-amp-based power amplifier separately powered from a constant DC-voltage source. In one embodiment, the LM380 op-amp power amplifier is the amplifier 1630 in waveform generator 1600 of FIG. 16B. In one embodiment, the signal generator 1610 may generate a first inaudible signal, at a first ultrasonic frequency, over a first channel and a second inaudible signal, at a second ultrasonic frequency, over a second channel of the waveform generator 1600. In one example, the first ultrasonic frequency is a 40 kHz tone and the second ultrasonic frequency is a band of jamming frequencies between 40 kHz and 48 kHz. The signal generator 1610 may, in an alternative embodiment, generate the same, second inaudible signal and allow the frequency modulator 1620 to frequency modulate the second inaudible signal to the first ultrasonic frequency.

Figure 1:
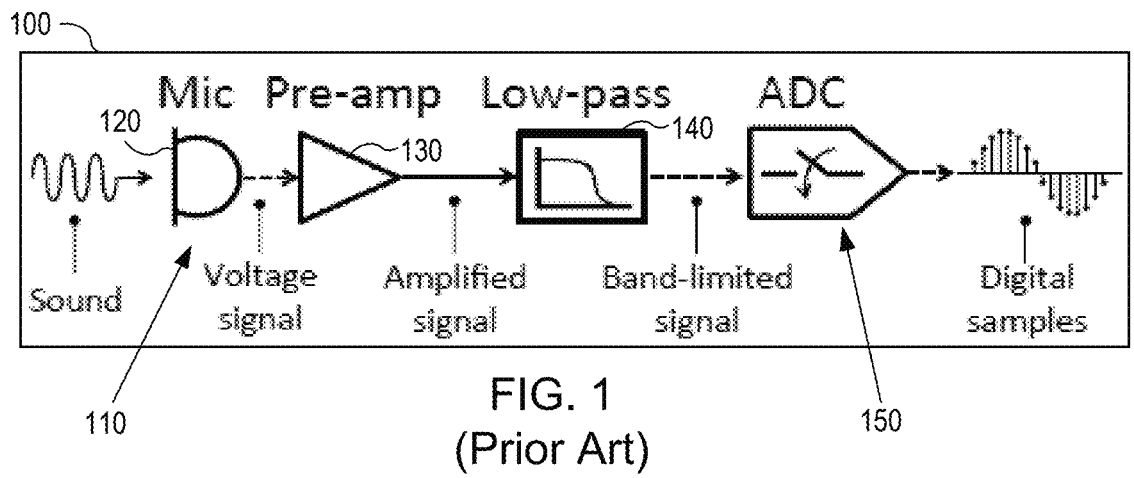
FIG. 1 is a flow diagram of a sound recording flow of a conventional sound recording system according to an embodiment.
Figure 2:
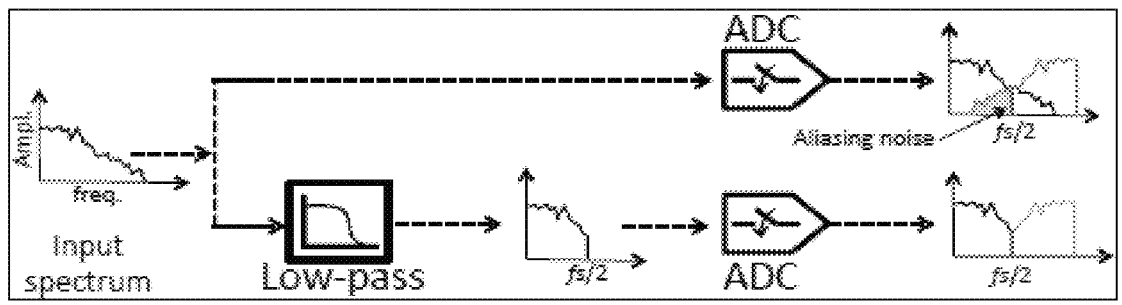
FIG. 2 is a block diagram illustrating creation of the digital spectrum by the sound recording system of FIG. 1, with and without the (anti-aliasing) low-pass filter, according to an embodiment.

With reference to FIGS. 16B and 16C, the waveform generator 1600 (e.g., the signal generator 1610) may generate the first inaudible signal at a first ultrasonic frequency with a power output that is approximately equal (or identical) to an automatic gain control (AGC) threshold for a microphone of a microphone system, e.g., the sound recording system 100 of FIG. 1. This first ultrasonic frequency may be a field tone. The waveform generator 1600 may further drive, over the first channel, the first array of ultrasonic speakers 1650A with the first inaudible signal to reduce a power of recordable audible signals detected by the microphone. In embodiments, the waveform generator sets the first ultrasonic frequency as a resonant frequency of a piezoelectric transducer of the first array of ultrasonic speakers 1650A, to maximize the power output.

In various embodiments, the frequency modulator 1620 is to frequency modulate the second inaudible signal with white noise (e.g., inaudible band-limited Gaussian noise) to generate a noise-modulated signal. In one embodiment, the second inaudible signal includes time-varying jamming signals. The band-pass filter 1625 may band-pass filter the noise-modulated signal to within a range of inaudible frequencies that includes the first ultrasonic frequency, to generate a distorted inaudible signal. In some embodiments, the amplifier 1630 may also amplify the distorted inaudible signal. The waveform generator 1600 may then drive, over the second channel, the second ultrasonic speaker array 1650B with the distorted inaudible signal. The first inaudible signal is to frequency shift the distorted inaudible signal to within an audible frequency range recordable by the microphone system. In one embodiment, the first ultrasonic frequency is 40 kHz and the range of inaudible frequencies is between approximately 40 kHz and 52 kHz, which inaudible frequencies are translated to between zero ("0") and 12 kHz within hardware of the microphone, as previously discussed.

The disclosed ultrasonic transmission system was evaluated on 3 main metrics: (1) human audibility; (2) throughput, e.g., packet error rates (PER) and bit error rates (BER) for data communication, and (3) the efficacy of jamming. We played inaudible signals from the disclosed ultrasonic transmission system to a group of 7 users (ages between 27 and 38) seated around a table one to three meters away from the speakers. Each user reported the perceived loudness of the sound on a scale of 0-10, with 0 being perceived silence. As a baseline, we also played audible sounds and asked the users to report the loudness levels. A reference microphone was placed at one meter from the speaker to record and compute the SNR (Signal to Noise Ratio) of all the tested sounds. We varied the SNR and equalized them at the microphone for fair comparison between audible and inaudible sounds.

Four types of signals were played, as follows:

(1) Single Tone Unmodulated Signals: In the simplest form, the system transmitted multiple pairs of ultrasonic tones (less than 40, greater than 42 and less than 40, and greater than 45) that generate a single audible frequency tone in the microphone. As baseline, the system separately played a 2 kHz and 5 kHz audible tone.

(2) Frequency Modulated Signals: the system modulated the frequency of a 40 kHz primary carrier with a 3 kHz signal. The system also transmitted a 45 kHz secondary carrier on the second speaker, producing a 3 kHz FM signal centered at 5 kHz in the microphone. As a baseline, the system played the equivalent audible FM signal on the same ultrasonic speakers.

(3) Amplitude Modulated Signals: Similar to FM signals, the system created these AM signals by modulating the amplitude of 40 kHz signal with a 3 kHz tone.

(4) White Noise Signals: The system generated, out of the second ultrasonic speaker array 1650B, white Gaussian noise with zero mean and variance proportional to the transmitted power, at a bandwidth of 8 kHz, band-limited to from 40 kHz to 48 kHz. The system also transmitted a 40 kHz tone out of the first ultrasonic speaker array 1550A to frequency shift the white noise to the audible range of the speaker arrays. As baseline, the system created audible white noise with the same properties band-limited to between zero kHz and 8 kHz and played it on the speakers.

Table 1 summarizes the average of perceived loudness that users reported for both inaudible and audible signals as a function of the SNR measured at the reference microphone, and for the noted frequencies. For all types of signals except amplitude modulation (AM), the disclosed ultrasonic transmission system is 100% inaudible to the users. Amplitude-modulated (AM) signals are audible due to speaker non-linearity, as described earlier. However, the perceived loudness of our inaudible signals is significantly lower than that of audible signals. Thus, so long we avoid AM, our inaudible signals remain inaudible to humans but produce audible signals inside microphones with the same SNR as loud audible signals.

impact of acoustic interference. The results illustrate throughput of 4 kbps at one ("1") meter away which is two to four times higher than today's mobile ultrasound communication systems.

Figure 17A:
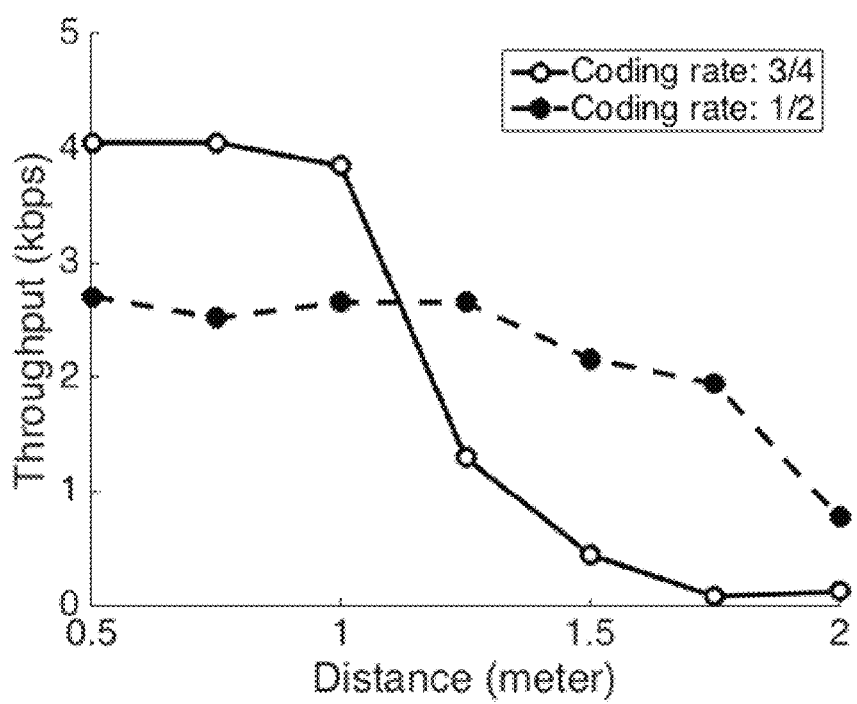
FIG. 17A is a graph illustrating the net end-to-end communication throughput according to separation between transmitter and receiver according to an embodiment.
Figure 17B:
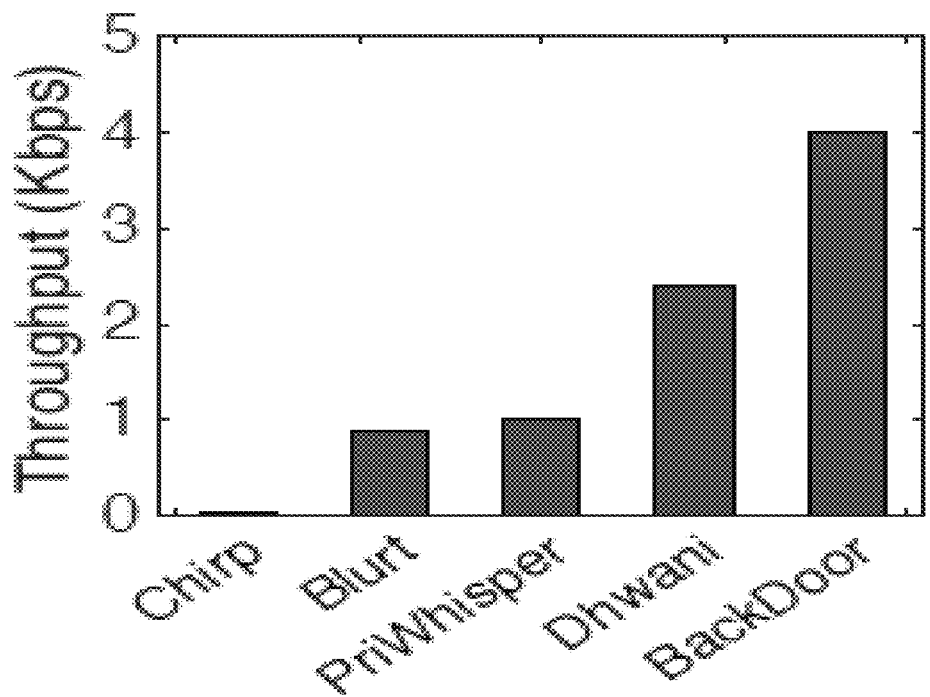
FIG. 17B is a graph illustrating a comparison of the disclosed ultrasonic transmitter (BackDoor) compared to other related peer-to-peer communication schemes according to various embodiments.

FIG. 17A is a graph illustrating the net end-to-end communication throughput for increasing separation between transmitter and receiver according to an embodiment. The disclosed ultrasonic transmitter may achieve a throughput of 4 kbps at 1 meter, 2 kbps at 1.5 meters and 1 kbps at 2 meters. FIG. 17B is a graph illustrating a comparison of the disclosed ultrasonic transmitter (BackDoor) compared to other related peer-to-peer communication schemes according to various embodiments. FIG. 17B compares the ultrasonic transmitter's performance in terms of throughput and range with state-of-the-art mobile acoustic communication systems (in both commercial products and research, such as Chirp, Blurt, PriWhisper, Dhwani). The figure shows that BackDoor achieves 2 times to 80 times higher throughput. This because these systems are constrained to a very narrow communication band whereas BackDoor is able to utilize the entire audible bandwidth.

Figure 17C:
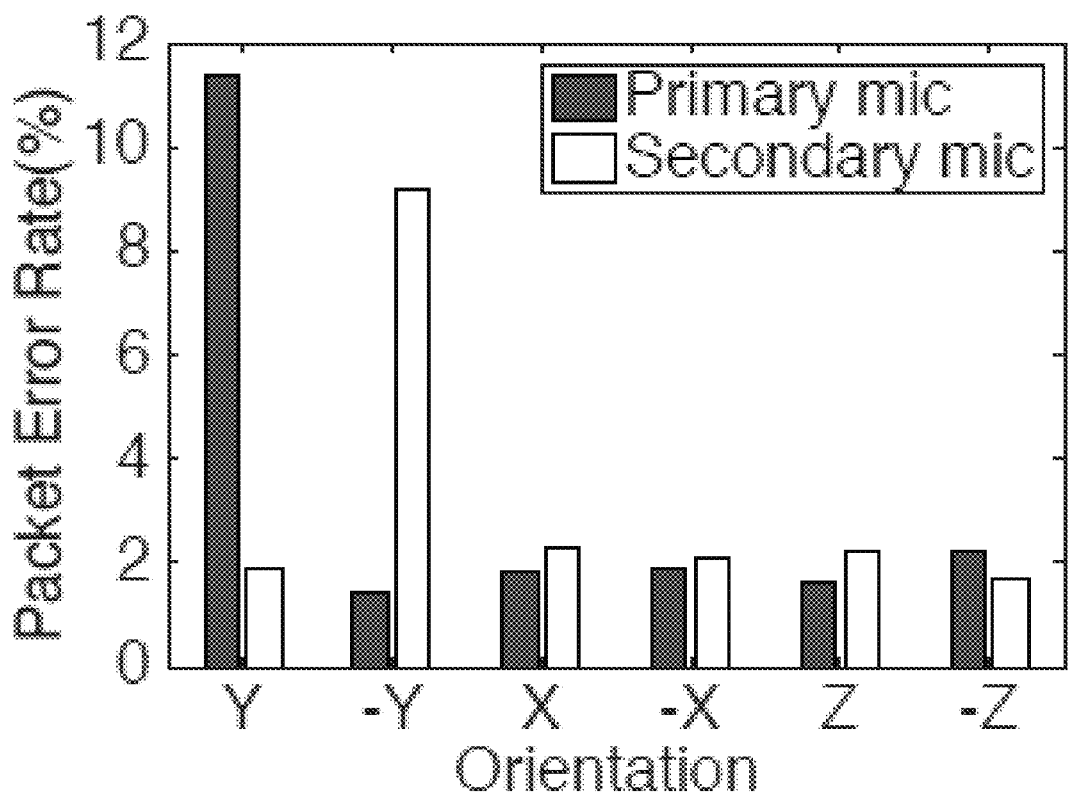
FIG. 17C is a graph illustrating packet error rate versus phone orientations, which are illustrated in FIG. 17D, according to various embodiments.
Figure 17D:
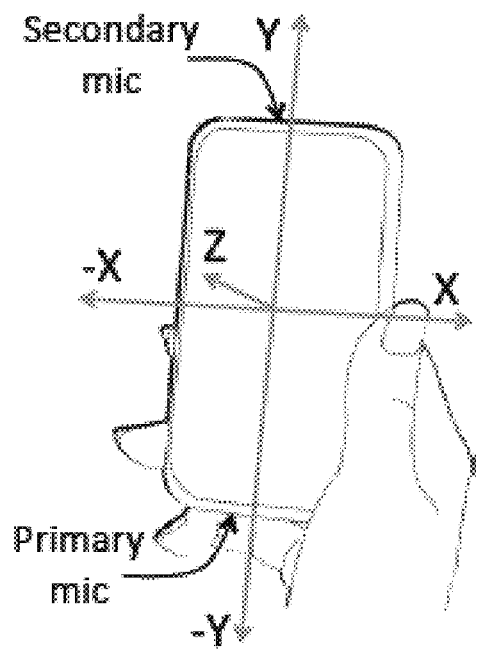
FIG. 17D is an image illustrating tested phone orientations for communication versus ultrasonic tones, according to various embodiments.

FIG. 17C is a graph illustrating packet error rate versus phone orientations, which are illustrated in FIG. 17D, according to various embodiments. FIG. 17D is an image illustrating tested phone orientations for communication versus ultrasonic tones, according to various embodiments. FIG. 17C illustrates the PER when data is decoded by the primary and secondary microphones in the phone, placed in six different orientations, as shown in FIG. 17D. The aim here is to understand how real-world use of the smartphone impacts data delivery. To this end, the smartphone was held at a distance of ne ("1") meter away from the ultrasonic transmitter, and the orientation changed after each transmission session. The plot shows that except +Y and −Y, the other orientations are comparable. This is because the +Y and −Y orientation align the two receivers and transmitters in almost a straight line, resulting in maximal SNR difference. Hand blockage of the further-away microphone makes the SNR gap pronounced. It should be possible to compare the SNR at the microphones and select the better microphone for minimized PER (regardless of the orientation).

Figure 18A:
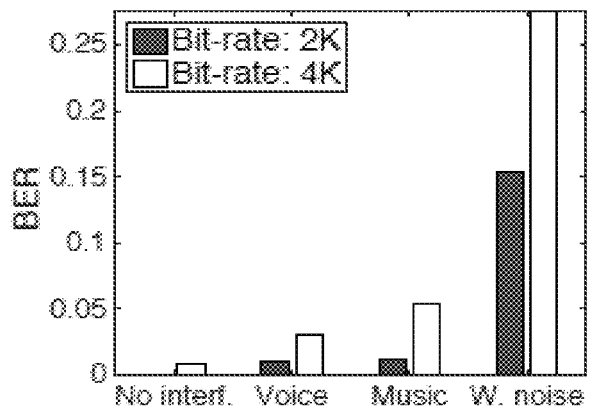
FIG. 18A is a graph illustrating a bit error rate (BER) versus three different audio interference sources, according to various embodiments.

FIG. 18A is a graph illustrating a bit error rate (BER) versus three different audio interference sources, according to various embodiments. To elaborate, we played audible

TABLE 1

| Ref. Mic. SNR- dB | 2 kHz Tone | | 5 kHz Tone | | FM | | AM | | White Noise | |
|---|---|---|---|---|---|---|---|---|---|---|
| | Inaud. | Audible | Inaud. | Audible | Inaud. | Audible | Inaud. | Audible | Inaud. | Aud. |
| 25 | 0 | 0.75 | 0 | 3.33 | 0 | 1.2 | 0 | 0.46 | 0 | 0.1 |
| 30 | 0 | 1.5 | 0 | 4.08 | 0 | 2.3 | 0.1 | 1.36 | 0 | 0.26 |
| 35 | 0 | 2 | 0 | 4.91 | 0 | 3.5 | 0.1 | 1.85 | 0 | 0.5 |
| 40 | 0 | 2.67 | 0 | 5.42 | 0 | 4.2 | 0.16 | 2.4 | 0 | 0.8 |
| 45 | 0 | 3.17 | 0 | 6.17 | 0 | 4.8 | 0.68 | 3.06 | 0 | 1.24 |

The ultrasonic transmitter used for experimentation was the disclosed two-speaker system while the receiver was the Samsung smartphone. The recorded acoustic signal was extracted and processed in MATLAB; we computed bit error rate (BER), packet error rate (PER), and throughput under varying parameters. Overall, 40 hours of acoustic transmission was performed to generate the results. FIGS. 17A-17D and FIGS. 18A-18B report the variation of throughput against increasing distance, different phone orientations, and interference signals—a presidential speech, an orchestral music, and white noise—from a nearby speaker, while the data transmission was in progress. The intensity of the interference at the microphone was at 70 dBSPL, equaling the level of volume one hears on average in face-to-face conversations. This is certainly much louder than average ambient noise, and hence, this serves as a strict test for the system's resilience to interference. Also, the smartphone receiver was placed one ("1") meter away from the speaker, and transmissions were at 2 kbps and 4 kbps. Evident from the graph, voice and music has minimal impact on the communication error. In contrast, white noise can severely degrade performance.

Figure 18B:
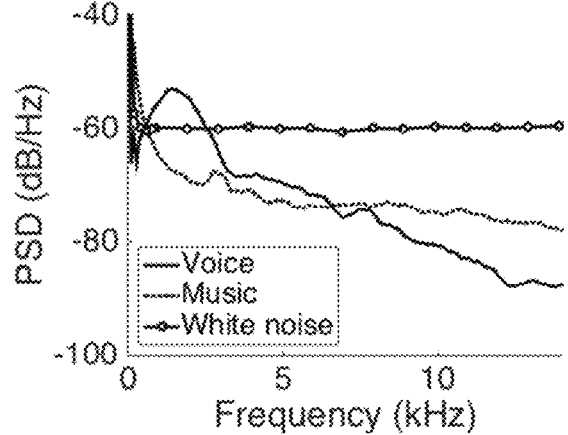
FIG. 18B is a plot illustrating the power spectral density for each interference source graphed in FIG. 18A, according to various embodiments.

FIG. 18B is a plot illustrating the power spectral density for each interference source graphed in FIG. 18A, according to various embodiments. The decay beyond 4 kHz for voice and music explains the performance plots. Put differently, since the disclosed ultrasonic transmission system may operate around 10 kHz frequency, voice and music signals do not affect the band as much as white noise, which remains flat over the entire spectrum.

FIGS. 19A-D compares the jamming radius for disclosed ultrasonic transmission system and audible white noise-based jammers. To achieve the same jamming effect (say, less than 15% words legible by humans), we find that the audible jammer requires a loudness of 97 dBSPL which is similar to a jackhammer and can cause severe damage to humans. The disclosed ultrasonic transmission system remains inaudible. Conversely, when the white noise sound level is made tolerable, the legibility of the words was 76%.

Setup: Consider the case where Bob is saying a secret to Alice and Eve has planted a microphone in the vicinity, attempting to record Bob's voice. In suspicion, Bob places a BackDoor jammer in front of him on the table. We intend to report the efficacy of jamming in such a situation. Specifically, we extract the jammed signal from Eve's microphone and play it to an automatic speech recognizer (ASR), as well as to a group of 7 human users. We define Legibility as the percentage of words correctly recognized by each. We plot Lasr and Lhuman for increasing jamming radius, i.e., for increasing distance between Alice and Eve's microphone. We still need to specify another parameter for this experiment—the loudness with which Bob is speaking. Acoustic literature suggests that at social conversations, say between two people standing at arm's length at a corridor, the average loudness is 65 dBSPL (dB of sound pressure level).

We design our situation accordingly, i.e., when Bob speaks, his voice at Alice's location one ("1") meter away is made to be 70 dBSPL, e.g., Bob is actually speaking louder than general social conversations. In the actual experiment, we pretend that a smartphone is a spy microphone. Another smartphone's speaker is a proxy for Bob, and the words played are derived from Google's Trillion Word Corpus; we pick the 2000 most frequent words, prescribed as a good benchmark. As mentioned earlier, the volume of this playback is set to 70 dBSPL at one meter away. Now, the BackDoor prototype plays an inaudible jamming signal through its ultrasonic speakers to jam these speech signals.

Baseline: Our baseline comparison is essentially against audible white noise-based jammers in today's markets. Assuming BackDoor jams up to a radius of R, we compute the loudness needed by white noise to jam the same radius. All in all, 14 hours of sound was recorded and a total of 25,000 words were tested. The automatic speech recognition (ASR) software is the open-source Sphinx4 library (pre-alpha version) published by Carnegie Mellon University. We present the results next.

Figure 19A:
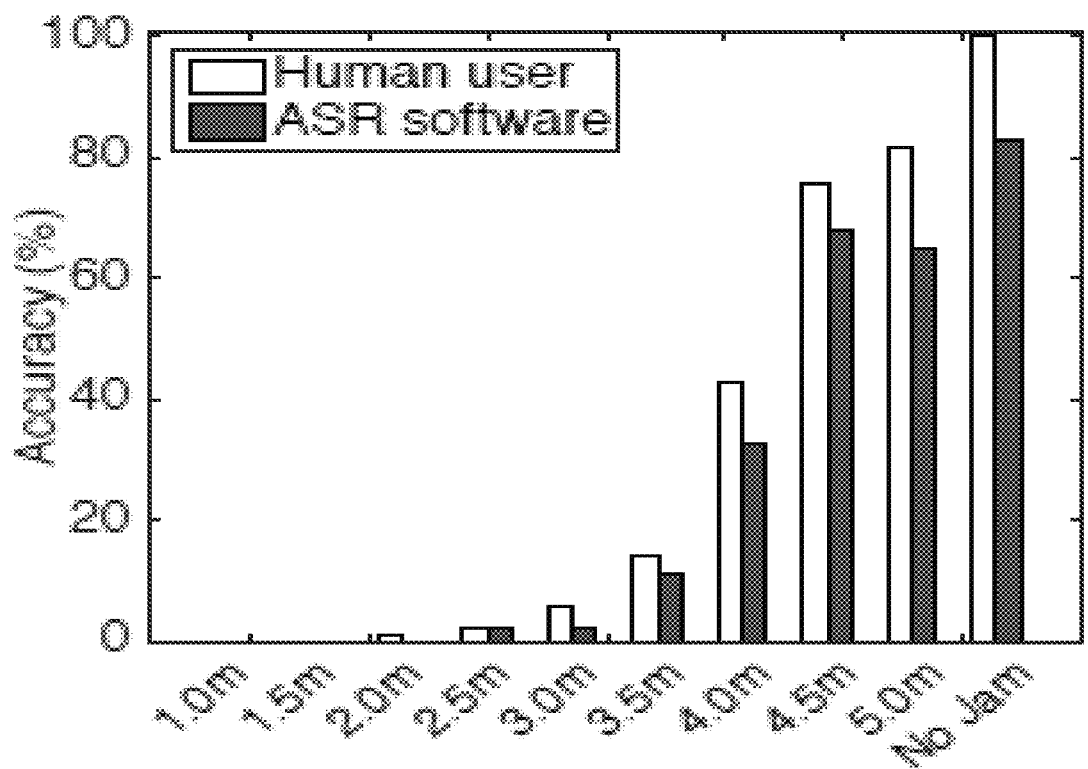
FIG. 19A is a graph illustrating the legibility of an automatic speech recognizer (ASR) versus a human user, according to various embodiments.
Figure 19B:
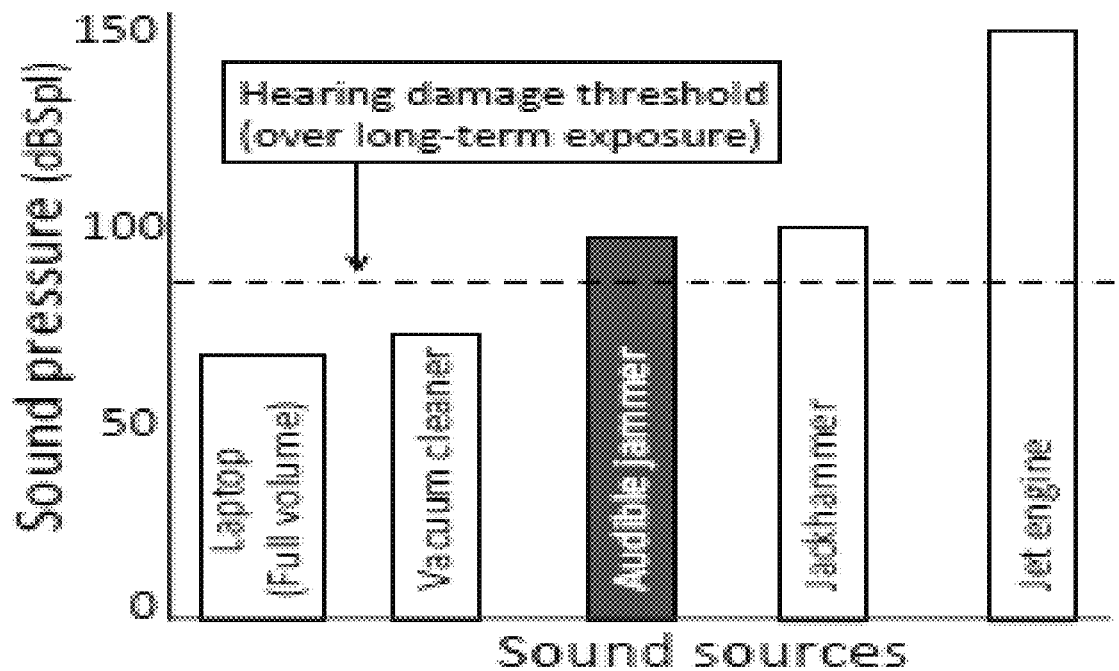
FIG. 19B is a graph illustrating the white noise power that would be needed to match the disclosed system is intolerable.

FIG. 19A is a graph illustrating the legibility of an automatic speech recognizer (ASR) versus a human user, according to various embodiments. FIG. 19A plots Lasr and Lhuman for increasing jamming radius. Even with a one watt power, a radius of 3.5 meters (around 11 feet) can be jammed around Bob. We compare against audible noise jammers presented in FIG. 19B. For jamming at the same radius of 3.5 meters, the loudness necessary for the audible white noise is 97 dBSPL, which is the same as a jackhammer and can cause damage to the human ear. Conversely, we find that when the audible white noise is made tolerable (comparable to a white noise smartphone app playing at full volume), the legibility becomes 76%.

Thus, the disclosed ultrasonic transmission system is a clear improvement over audible jammers. Furthermore, increasing the power of the jammers of the disclosed ultrasonic transmission system can increase the radius proportionally. In fact, current portable Bluetooth™ speakers already transmit 10 times to 20 times higher power than the disclosed ultrasonic transmission system. Audible jammers cannot increase their power to boost the range since they are already intolerable to humans.

Figure 19C:
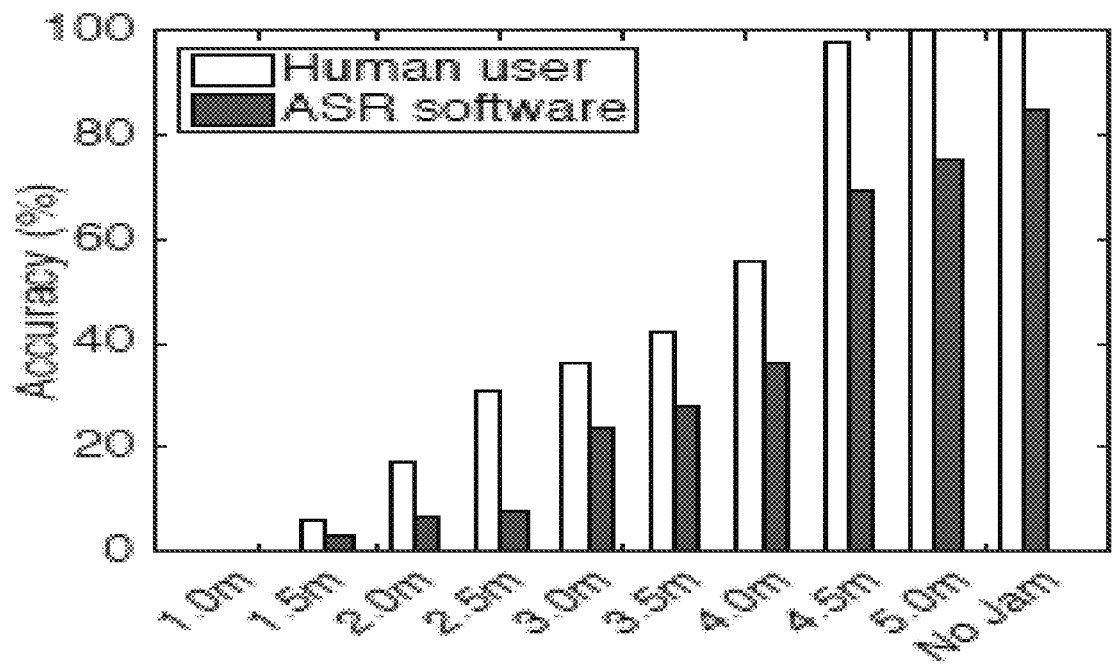
FIG. 19C is a graph illustrating a jamming radius when the disclosed system employs inaudible white noise, according to various embodiments.

FIG. 19C is a graph illustrating a jamming radius when the disclosed system employs inaudible white noise, without the deliberate distortions of voice-centric frequencies (fricatives, phonemes, and harmonics). Here, the performance is substantially weaker, indicating the importance of signal shaping and jamming.

Figure 19D:
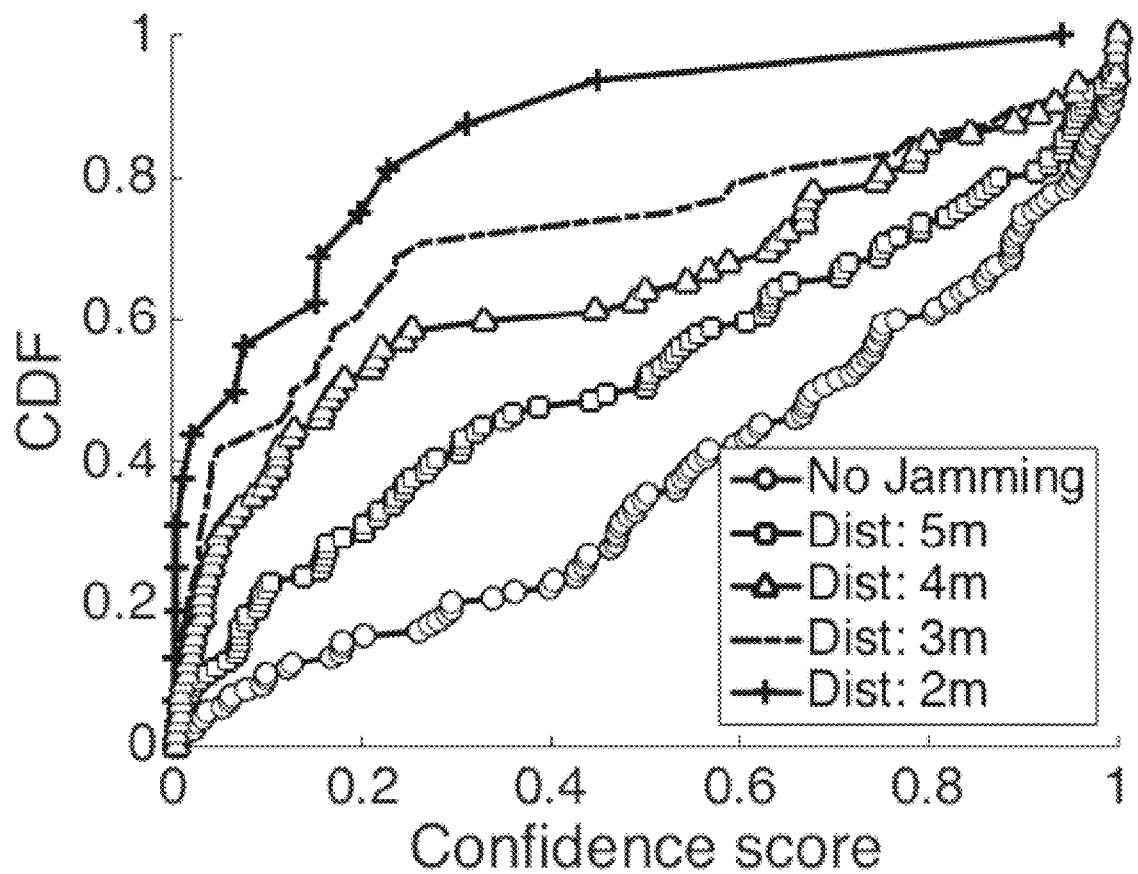
FIG. 19D is a graph illustrating a level of confidence in operation of the automatic speech recognizer according to various embodiments.

FIG. 19D is a graph illustrating a level of confidence in operation of the automatic speech recognizer (ASR) according to various embodiments for all correctly recognized words. Results illustrate quite low confidence on a large fraction of words, implying that voice fingerprinting and other voice-controlled systems would be easy to DoS-attack with a BackDoor-like system.

Figure 20A:
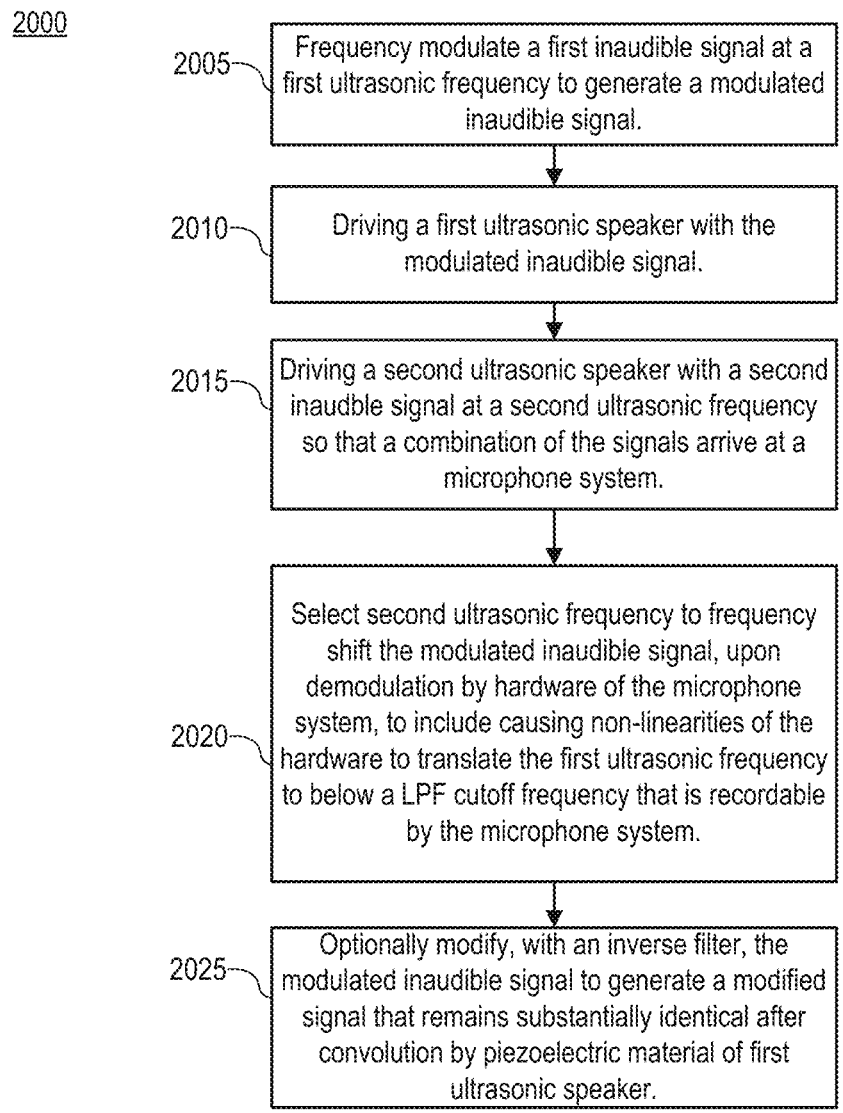
FIG. 20A is a flow chart of a method for causing microphones or sound recording systems to detect and record inaudible sounds according to various embodiments.

FIG. 20A is a flow chart of a method 2000 for causing microphones or sound recording systems to detect and record inaudible sounds according to various embodiments. The method 2000 may be performed by processing logic that may comprise hardware (e.g., circuitry, dedicated logic, programmable logic, microcode, etc.), software (such as instructions running on the processor), firmware or a combination thereof. In various embodiments, a ultrasonic transmission device or system, which may include the waveform generator 1500 (FIG. 15B) and/or the waveform generator 1600 (FIGS. 16B-16C), may perform the ultrasonic signal processing and transmission of the method 2000.

With continued reference to FIG. 20A, the method 2000 may begin with the processing logic frequency modulating a first inaudible signal at a first ultrasonic frequency, to generate a modulated inaudible signal (2005). The method 2000 may continue with the processing logic driving, over the first channel, the first ultrasonic speaker with the modulated inaudible signal (2010). The processing logic may continue with the processing logic driving, over the second channel, the second ultrasonic speaker with a second inaudible signal at a second ultrasonic frequency so that a combination of the signals arrive at a microphone system (2015). The method 2000 may continue with the processing logic selecting the second ultrasonic frequency to frequency shift the modulated inaudible signal, upon demodulation by hardware of a microphone system, comprising to cause non-linearities of the hardware to translate the first ultrasonic frequency of the modulated inaudible signal to below a low-pass filter (LPF) cutoff frequency that is recordable by the microphone system (2020). The method 2000 may continue with the processing logic modifying, with an inverse filter, the modulated inaudible signal to generate a modified signal that remains substantially identical after convolution by piezoelectric material of the first ultrasonic speaker (2025).

Figure 20B:
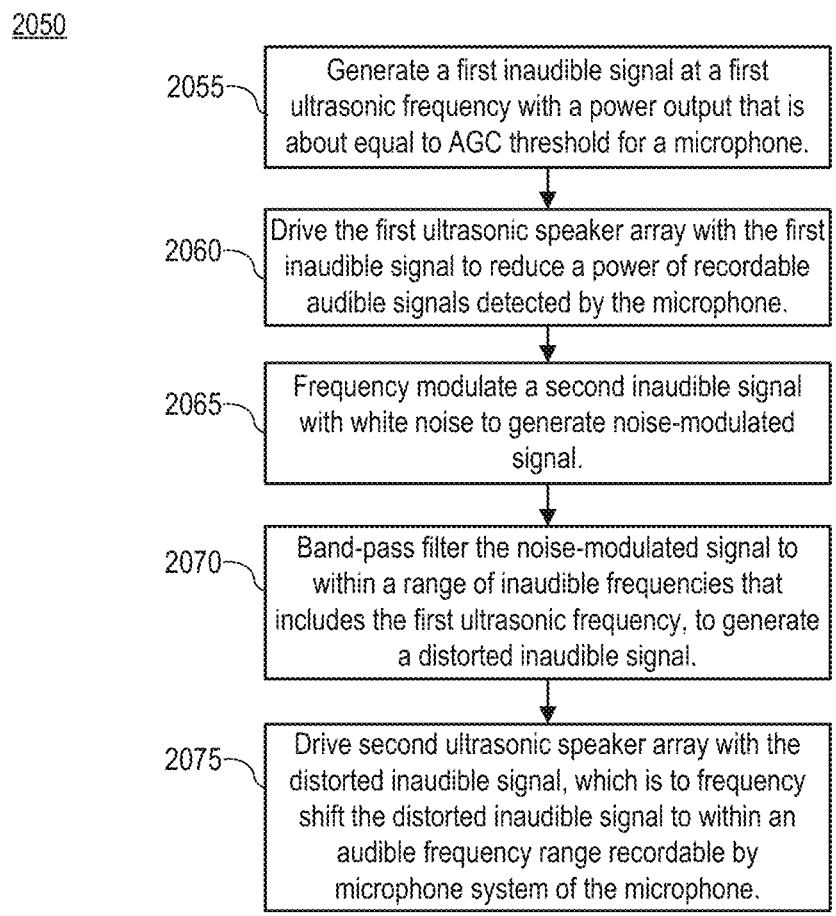
FIG. 20B is a flow chart of a method for suppressing automatic gain control (AGC) and injection of frequency distortion to perform microphone jamming according to various embodiments.

FIG. 20B is a flow chart of a method 2050 for suppressing automatic gain control (AGC) and injection of frequency distortion to perform microphone jamming according to various embodiments. The method 2050 may be performed by processing logic that may comprise hardware (e.g., circuitry, dedicated logic, programmable logic, microcode, etc.), software (such as instructions running on the processor), firmware or a combination thereof. In various embodiments, a ultrasonic transmission device or system, which may include the waveform generator 1500 (FIG. 15B) and/or the waveform generator 1600 (FIGS. 16B-16C), may perform the ultrasonic signal processing and transmission of the method 2050.

With continued reference to FIG. 20B, the method 2050 may begin with the processing logic generating a first inaudible signal at a first ultrasonic frequency with a power output that is approximately equal to an automatic gain control (AGC) threshold for a microphone of a microphone system (2055). The method 2050 may continue with the processing logic driving, over the first channel, the first ultrasonic speaker array with the first inaudible signal to reduce a power of recordable audible signals detected by the microphone (2060). The method 2050 may continue with the processing logic frequency modulating a second inaudible signal with white noise to generate a noise-modulated signal (2065). The method 2050 may continue with band-pass filtering the noise-modulated signal to within a range of inaudible frequencies that includes the first ultrasonic frequency, to generate a distorted inaudible signal (2070). The method 2050 may continue with the processing logic driving, over the second channel, the second ultrasonic speaker array with the distorted inaudible signal, wherein the first inaudible signal is to frequency shift the distorted inaudible signal to within an audible frequency range recordable by the microphone system (2075).

Inaudible Voice Commands: The Long-Range Attack and Defense

As noted above, inaudible signals (at ultrasonic frequencies) may be designed in a way that they become audible to microphones. Designed well, this can empower an adversary to stand on the road and silently control Amazon Echo®, Google® Home, or other similar smart devices in homes and other locations. A voice command like "Alexa, open the garage door," for example, can pose a serious threat to hacking the Amazon Echo®. While recent work has demonstrated feasibility, two issues remain. First, the attacks can only be launched from within 5 feet of the device, and increasingly, this range makes the attack audible. Second, there is no clear solution against these ultrasound attacks, since they exploit the above-discussed loophole in hardware non-linearity.

The remainder of this disclosure provides ways to close both these gaps. We begin by developing an attack that achieves a 25-foot range, limited by the power of our amplifier. We then develop a defense against this class of voice attacks that exploit non-linearity. In various embodiments, careful forensics on voice, e.g., finding indelible traces of non-linearity in recorded voice signals enables the discovery technical solutions. The disclosed inaudible voice command system demonstrates the inaudible attack in various conditions, followed by defenses that employ software changes to the microphone. In one embodiment, detection may be equivalent to defense, as once an attack is detected, the disclosed system may refuse to execute a command from the attack. In addition to that, the system can also raise an alarm to inform the user about the attack.

The above disclosure demonstrates that no software is needed at the microphone to cause recording of inaudible signals, e.g., a voice-enabled device like the Amazon Echo® can be made to respond to inaudible voice commands. Papers by DolphinAttack and archived in arXiv, the latter which includes a video demonstration, illustrate the viable of such attacks. These attacks are becoming increasingly relevant, particularly with the proliferation of voice enabled devices including Amazon Echo®, Google® Home, Apple® Home Pod, Samsung® refrigerators, and the like.

While creative and exciting, these attacks are still deficient in range. DolphinAttack can launch from a distance of 5 feet to the Amazon Echo® while the attack in the arXiv publication achieves a 10-foot range by becoming partially audible. In attempting to enhance range, we realized strong tradeoffs with inaudibility, e.g., the output of the speaker no longer remains silent. This implies that currently known attacks are viable in short ranges, such as Alice's friend visiting Alice's home and silently attacking her Amazon Echo®. However, the general, and perhaps more alarming attack, is the one in which the attacker parks his car on the road and controls voice-enabled devices in the neighborhood, and even a person standing next to him does not hear it. This paper is an attempt to achieve such an attack radius, followed by defenses against them.

Figure 21:
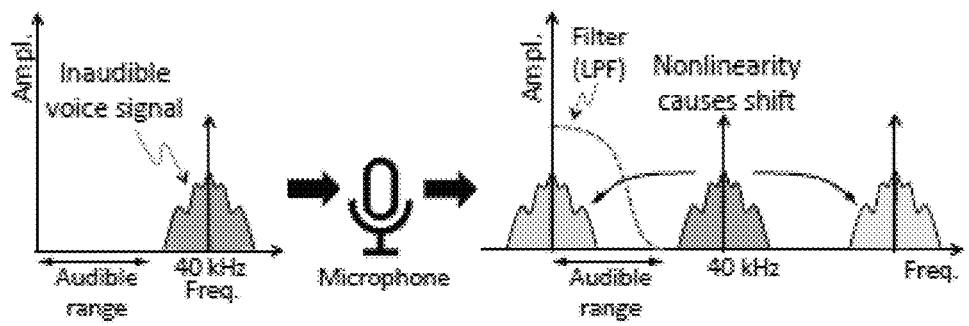
FIG. 21 is a pair of plots illustrative of hardware non-linearity in microphone hardware creating a frequency shift in inaudible ultrasonic frequencies to lower audible bands, according to one embodiment.

FIG. 21 is a pair of plots illustrative of hardware non-linearity in microphone hardware creating a frequency shift in inaudible ultrasonic frequencies to lower audible bands, according to one embodiment. Non-linearity is a hardware property that makes high frequency signals arriving at a microphone, say $s_{hi}$, get shifted to lower frequencies $s_{low}$. If $s_{hi}$ is designed carefully, then $s_{low}$ can be almost identical to $s_{hi}$ but shifted to within the audibility cutoff of 20 kHz inside the microphone. As a result, even though humans do not hear $s_{hi}$, non-linearity in microphones produces $s_{low}$, which then become legitimate voice commands to voice-enable devices like the Amazon Echo®. This is the root opportunity that empowers today's attacks.

As a first point, this non-linearity triggers at high frequencies and at high power: if $s_{hi}$ is a soft signal, then the non-linear effects do not surface. Secondly, non-linearity is fundamental to acoustic hardware and is equally present in speakers as in microphones. Thus, when $s_{hi}$ is played through speakers, it will also undergo the frequency shift, producing an audible $s_{low}$. Dolphin and other attacks sidestep this problem by operating at low power, thereby forcing the output of the speaker to be almost inaudible. This inherently limits the range of the attack to about 5 feet; any attempt to increase this range results in audibility.

This disclosure breaks away from the zero sum game between range and audibility by an alternative transmitter design. In one embodiment, the alternative transmitter design is to employ multiple speakers, and stripe segments of the voice signal across them such that leakage from each speaker is narrow band, and confined to low frequencies. This still produces a garbled, audible sound. To achieve true inaudibility, the transmitter is designed to solve a min-max optimization problem on the length of the voice segments. The optimization picks the segment lengths in a way such that the aggregate leakage function is below the human auditory response curve (e.g., the minimum separation between the leakage and the human audibility curve is maximized). This ensures, by design, that the attack is inaudible.

Defending against this class of non-linearity attacks is not difficult if one were to assume hardware changes to the receiver, e.g., to the voice-activated device itself. An additional ultrasonic microphone may suffice since it can detect the $s_{hi}$ signals in air. However, with software changes alone, the problem becomes a question of forensics, e.g., whether the shifted signal, $s_{low}$, be discriminated from the same legitimate voice command, $s_{leg}$. In other words, does non-linearity leave an indelible trace on $s_{low}$ that would otherwise not be present in $s_{leg}$.

Our defense relies on the observation that voice signals exhibit well-understood structure, composed of fundamental frequencies and harmonics. When this structure passes through non-linearity, part of it remains preserved in the shifted and blended low frequency signals. In contrast, legitimate human voice projects almost no energy in these low frequency bands. An attacker that injects distortion to hide the traces of voice, either pollutes the core voice command, or raises the energy floor in these bands. This forces the attacker into a zero-sum game, disallowing the attacker from erasing the traces of non-linearity without raising suspicion.

Our measurements confirm the possibility to detect voice traces, e.g., even though non-linearity superimposes many harmonics and noise signals on top of each other, and attenuates them significantly, cross-correlation still reveals the latent voice fingerprint. Of course, various intermediate steps of contour tracking, filtering, frequency-selective compensation, and phoneme correlation may be necessary to extract out the evidence. Nonetheless, our final classifier is transparent and does not require any training, but succeeds only for voice signals, as opposed to for the general class of inaudible microphone attacks (such as jamming).

The disclosed inaudible transmission system may be built on multiple platforms. For the inaudible attack at long ranges, we have developed an ultrasonic speaker array powered by our custom-made amplifier (FIGS. 16A-16C). The attacker types a command on the laptop, MATLAB converts the command to a voice signal, and the laptop sends this through our amplifier to the speaker. We demonstrate controlling Amazon Echo®, iPhone Siri®, and Samsung® devices from a distance of 25 feet, limited by the power of our amplifier, e.g., the op-amp-based amplifier in FIG. 16C. For defense, we record signals from Android Samsung® S6 phones, as well as from off-the-shelf microphone chips (popular in today's devices). We attack the system with various ultrasonic commands, both from literature as well as our own. The disclosed system demonstrates defense against all attacks with 97% precision and 98% recall. This performance remains robust across varying parameters, including multipath, power, attack location, and various signal manipulations.

The current experiments included long-range attacks launched from within a large room or from outside a house with open windows. Attacks would not work with doors and windows closes due to attenuation of high-frequency signals through these obstacles, which will be dealt with in a future work.

In various embodiments, our transmitter design breaks away from the tradeoff between attack range and audibility. The system carefully stripes frequency bands across an array of speakers, such that individual speakers are silent but the microphone is activated. Furthermore, disclosed is a defense that identifies human voice traces at low frequencies (where such traces should not be present) and uses them to protect against attacks that attempt to erase or disturb these traces. Additionally, the subsequent sections elaborate on these ideas, beginning with some relevant teaching on non-linearity, followed by threat model, attack design, and defense.

Microphones and speakers are in general designed to be linear systems, meaning that the output signals are linear combinations of the input. In the case of power amplifiers inside microphones and speakers, if the input sound signal is s(t), then the output should ideally be:

$$s_{out}(t) = A_1 s(t)$$

where $A_1$ is the amplifier gain. In practice, however, acoustic components in microphones and speakers (like diaphragms, amplifiers, etc.) are linear only in the audible frequency range and less than 20 kHz. In ultrasound bands (greater than 25 kHz), the responses exhibit non-linearity. Thus, for ultrasound signals, the output of the amplifier becomes:

$$s_{out}(t) = \sum_{i=1}^{\infty} A_i s^i(t) = A_1 s(t) + A_2 s^2(t) + A_3 s^3(t) + \ldots \approx A_1 s(t) + A_2 s^2(t) \quad (1)$$

Higher order terms are typically extremely weak since $A_{4+} \ll A_3 \ll A_2$ and hence can be ignored. The above discussion illustrates ways to exploit this phenomenon, e.g., it is possible to play ultrasound signals that cannot be heard by humans but can be directly recorded by any microphone. Specifically, an ultrasound speaker can play two inaudible tones: $s_1(t)=\cos(2\pi f_1 t)$ at frequency $f_1=38$ kHz and $s_2=\cos(2\pi f_2 t)$ at frequency $f_2=40$ kHz. Once the combined signal $s_{hi}(t)=s_1+s_2(t)$ passes through the microphone's nonlinear hardware, the output becomes:

$$s_{out}(t) = A_1 s_{hi}(t) + A_2 s_{hi}^2(t)$$
$$= A_1(s_1(t) + s_2(t)) + A_2(s_1(t) + s_2(t))^2$$
$$= A_1 \cos(2\pi f_1 t) + A_1 \cos(2\pi f_2 t) + A_2 \cos^2(2\pi f_1 t) +$$
$$A_2 \cos^2(2\pi f_2 t) + 2A_2 \cos(2\pi f_1 t)\cos(2\pi f_2 t)$$

The above signal has frequency components at $f_1$, $f_2$, $2f_1$, $2f_2$, $f_2+f_1$, and $f_2-f_1$. This can be seen by expanding the equation:

$$s_{out}(t) = A_1 \cos(2\pi f_1 t) + A_1 \cos(2\pi f_2 t) + A_2 + 0.5A_2 \cos(2\pi 2f_1 t) + 0.5A_2 \cos(2\pi 2f_2 t) + A_2 \cos(2\pi(f_1+f_2)t) + A_2 \cos(2\pi(f_2-f_1)t)$$

Before digitizing and recording the signal, the microphone applies a low pass filter to remove frequency components above the microphone's cutoff of 24 KHz. Observe that $f_1$, $f_2$, $2f_1$, $2f_2$, and $f_1+f_2$ are all 24 kHz. Hence, what remains (as acceptable signal) is $$s_{low}(t) = A_2 + A_2 \cos(2\pi(f_2-f_1)t) \quad (2)$$

This is essentially a $f_2-f_1=2$ kHz tone, which will be recorded by the microphone. However, this demonstrates that by sending an inaudible signal, we are able to generate an audible "copy" of it inside any unmodified off-the-shelf microphone.

We begin by explaining how the above non-linearity can be exploited to send inaudible commands to voice enabled devices (VEDs) at a short range by way of an inaudible voice attack. We identify deficiencies in such an attack and then design the longer range, truly inaudible attack.

Let v(t) be a baseband voice signal that, once decoded, translates to the command: "Alexa, mute yourself." An attacker moves this baseband signal to a high frequency, $f_{hi}=40$ kHz, by modulating a carrier signal and plays it through an ultrasonic speaker. The attacker also plays a tone at $f_{hi}=40$ kHz. The played signal is:

$$s_{hi}(t) = \cos(2\pi f_{hi} t) + v(t)\cos(2\pi f_{hi} t). \quad (3)$$

After this signal passes through the non-linear hardware and low-pass filter of the microphone, the microphone records this signal:

$$s_{low}(t) = \frac{A_2}{2}(1 + v^2(t) + 2v(t)) \quad (4)$$

This shifted signal contains a strong component of v(t) (due to more power in the speech components), and hence, gets decoded correctly by almost all microphones.

Figure 22:
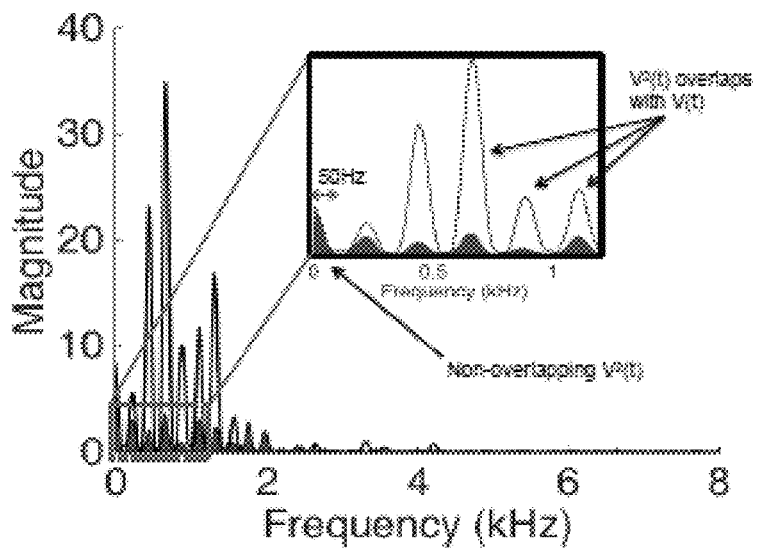
FIG. 22 is a plot and corresponding exploded plot of a power spectrum within a voice command "Alexa, Mute Yourself," according to one embodiment.
Figure 23:
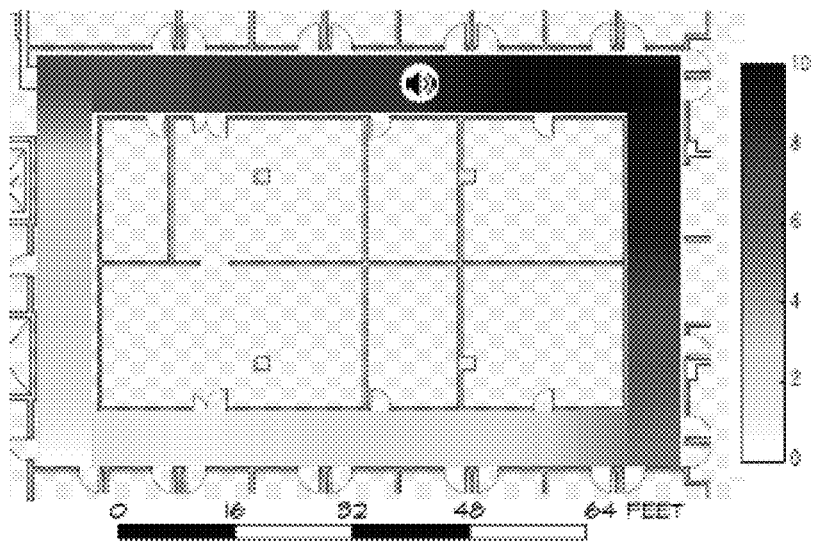
FIG. 23 is a heat map of experiments within a building illustrating locations at which the power spectrum of FIG. 22 includes leakage from the speaker that is audible, according to an embodiment.

FIG. 22 is a plot and corresponding exploded plot of a power spectrum, V(f), within a voice command "Alexa, Mute Yourself," according to one embodiment. FIG. 23 is a heat map of experiments within a building illustrating locations at which the power spectrum of FIG. 22 includes leakage from the speaker that is audible, according an embodiment. Five volunteers visited marked locations and recorded their perceived loudness of the speaker's leakage. Clearly, speaker non-linearity produces audibility, a key problem for long range attacks.

Here the power spectrum corresponding to v2(t) which is equal to V(f)*V(f) where (*) is the convolution operation. Observe that the spectrum of the human voice is between 50 Hz and 8,000 Hz and the relatively weak components of v2(t) line up underneath the voice frequencies after convolution. A component of v2(t) also falls at DC, however, degrades sharply. The overall weak presence of v²(t) leaves the v(t) signal mostly unharmed, allowing VEDs to decode the command correctly.

However, to help v(t) enter the microphone through the non-linear-responsive hardware, $s_{hi}(t)$ is to be transmitted at sufficiently high power. Otherwise, $s_{low}(t)$ will be buried in noise (due to small $A_2$). Increasing the transmit power at the speaker triggers non-linearities at the speaker's own diaphragm and amplifier, resulting in an audible $s_{low}(t)$ at the output of the speaker. Since $s_{low}(t)$ contains the voice command, v(t), the attack becomes audible. Some attacks sidestep this problem by operating at low power, thereby forcing the output of the speaker to be almost inaudible. This inherently limits the radius of attack to a short range of 5 feet. Attempts to increase this range results in audibility, defeating the purpose of the attack.

Before developing the long range attack, we concisely present a few assumptions and constraints on the attacker. For the disclosed threat model, we assume that the attacker cannot enter the home to launch the attack; otherwise, the above short range attack suffices. The attacker, furthermore, cannot leak any audible signals (even in a beam-formed manner); otherwise, such inaudible attacks are not needed in the first place. Additionally, the attacker is resourceful in terms of hardware and energy (perhaps the attacking speaker can be carried in a car or placed in a balcony, pointed at VEDs in surrounding apartments or pedestrians). In case the receiver device (e.g., Google® Home) is voice fingerprinted, we assume the attacker can synthesize the legitimate user's voice signal using known techniques to launch the attack. Finally, the attacker cannot estimate the precise channel impulse response (CIR) from its speaker to the voice enabled device (VED) that it intends to attack.

The disclosed inaudible transmission system employs a new speaker design that facilitates considerably longer attack range, while eliminating the audible leakage at the speaker. Instead of using one ultrasonic speaker, the inaudible transmission system uses multiple ultrasonic speakers physically separated in space. Then, the inaudible transmission system splices the spectrum of the voice command V(f) into carefully selected segments and plays each segment on a different speaker, thereby limiting the leakage from each speaker.

To better understand the motivation for use of multiple ultrasonic speakers, let us first consider using two ultrasonic speakers. Instead of playing $s_{hi}(t)=\cos(2\pi f_{hi}t)+\cos(2\pi f_{hi}t)$ on one speaker, the system now plays $s_1(t)=\cos(2\pi_{hi}t)$ on the first speaker and $s_2(t)=v(t)\cos(2\pi f_{hi}t)$ on the second speaker where $f_{hi}=40$ kHz. In this case, the two speakers will output:

$$s_{out1}=\cos(2\pi f_{hi}t)+\cos^2(2\pi f_{hi}t)$$

$$s_{out2}=v(t)\cos(2\pi f_{hi}t)+v^2(t)\cos^2(2\pi f_{hi}t) \quad (5)$$

For simplicity, we can ignore the terms $A_1$ and $A_2$ in Equation (1), as they do not affect our understanding of frequency components. Thus, when $s_{out1}$ and $s_{out2}$ emerge from the two speakers, human ears filter out all frequencies greater than 20 kHz. What remains audible is:

$$s_{low1}=\frac{1}{2}$$

$$s_{low2}=v^2(t)/2$$

Observe that neither $s_{low1}$ nor $s_{low2}$ contains the voice signal v(t), hence the actual attack command is no longer audible with two speakers. However, the microphone under attack will still receive the aggregate ultrasonic signal from the two speakers, $s_{hi}(t)=s_1(t)+s_2(t)$, and its own non-linearity will cause a "copy" of v(t) to get shifted into the audible range (recall Equation 4). Thus, this two-speaker attack activates VEDs from greater distances, while the actual voice command remains inaudible to bystanders. Although the voice signal v(t) is inaudible, signal $v^2(t)$ still leaks and becomes audible (especially at higher power). This undermines the attack.

Figure 24:
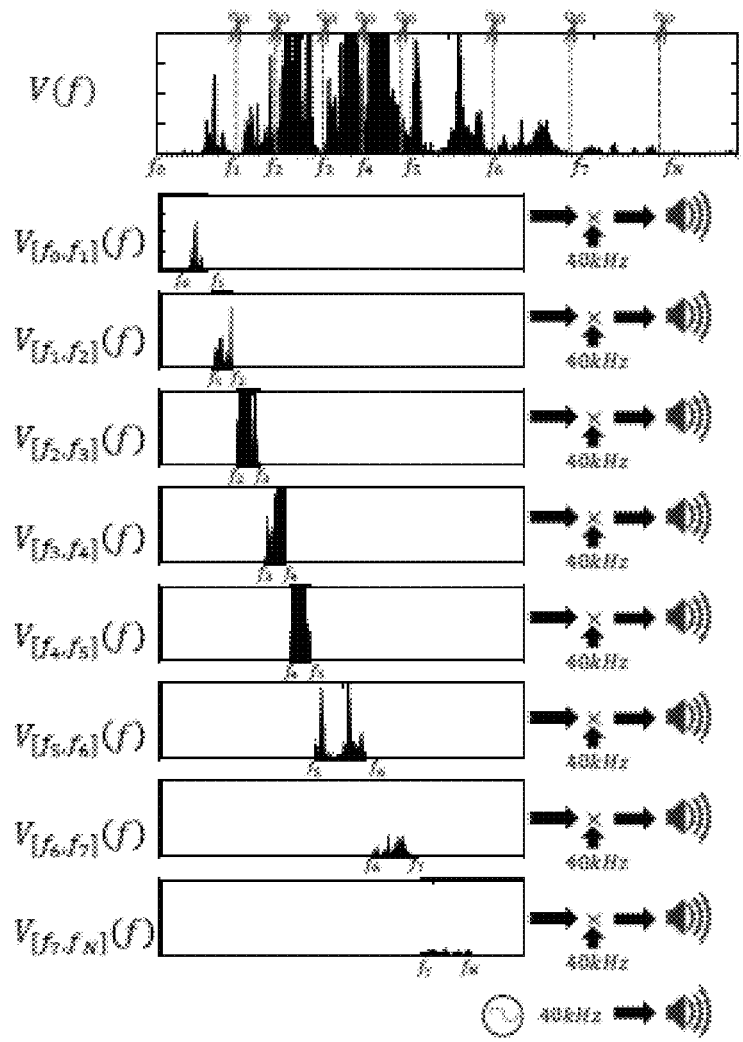
FIG. 24 is a set of plots illustrating power spectrum slicing that optimally segments the voice command frequencies and play them through separate speakers to that the net speaker output is inaudible, according to various embodiments.
Figure 25:
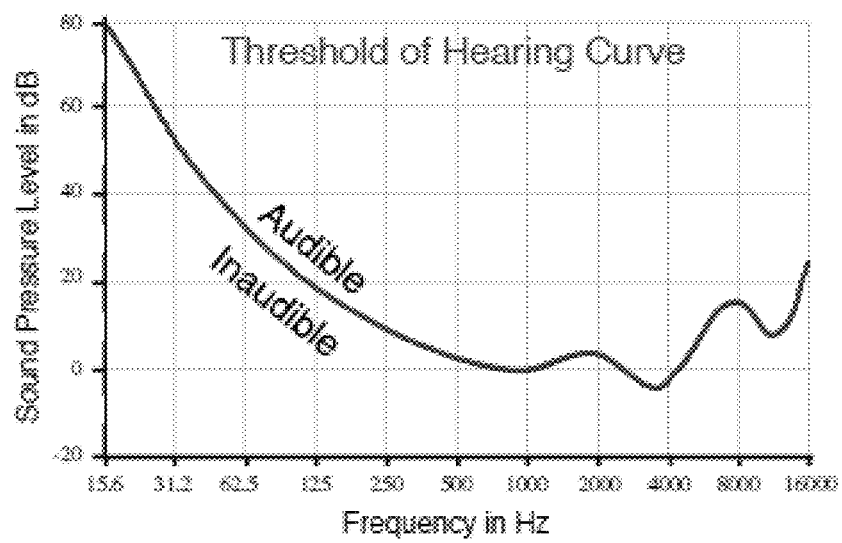
FIG. 25 is a plot illustrating a threshold of hearing curve for humans, below which humans do not hear sound, according to an embodiment.

To suppress the audibility of $v^2(t)$, the system expands to N ultrasonic speakers. The system first partitions the audio spectrum V(f) of the command signal v(t), ranging from $f_0$ to $f_N$, into N frequency bins: $[f_0, f_1]$, $[f_1, f_2]$, $[f_{N-1}, f_N]$ as shown in FIG. 24. This can be achieved by computing an FFT of the signal v(t) to obtain V(f). V(f) is then multiplied with a rectangle function $\text{rect}(f_i, f_{i+1})$ which gives a filtered $V_{[f_i,f_{i+1}]}(f)$. An IFFT is then used to generate $v_{[f_i,f_{i+1}]}(t)$ which is multiplied by an ultrasound tone $\cos(2\pi f_{hi}t)$ and outputted on the $i^{th}$ ultrasound speaker as shown in FIG. 24.

FIG. 24 is a set of plots illustrating power spectrum slicing that optimally segments the voice command frequencies and play them through separate speakers to that the net speaker output is inaudible, according to various embodiments. In this case, the audible leakage from $i^{th}$ ultrasound speaker will be $s_{low,i}(t)=v_{[f_i,f_{i+1}]}'(t)$. In the frequency domain, one can write this leakage as:

$$S_{low,i}(f)=V_{[f_i,f_{i+1}]}(f)*V_{[f_i,f_{i+1}]}(f)$$

This leakage has two properties of interest:

$$E[|S_{low,i}(f)|^2]\leq E[|V(f)*V(f)|^2] \quad (1)$$

$$BW(S_{low,i}(f))\leq BW(V(f)*V(f)) \quad (2)$$

where $E[|\cdot|^2]$ is the power of audible leakage and $BW(\cdot)$ is the bandwidth of the audible leakage due to nonlinearities at each speaker. The above properties imply that splicing the spectrum into multiple speakers reduces the audible leakage from any given speaker. It also reduces the bandwidth and hence concentrates the audible leakage in a smaller band below 50 Hz.

While per-speaker leakage is smaller, they can still add up to become audible. The total leakage power can be written as:

$$L(f) = \left| \sum_{i=1}^{N} V_{[f_i, f_{i+1}]}(f) * V_{[f_i, f_{i+1}]}(f) \right|^2$$

To achieve true inaudibility, one is to ensure that the total leakage is not audible. To address this challenge, one may leverage the fact that humans cannot hear the sound if the sound intensity falls below certain threshold, which is frequency dependent. This is known as the "Threshold of Hearing Curve," T(f). FIG. 5 illustrates T(f) in dB as function of frequency. Any sound with intensity below the threshold of hearing will be inaudible.

The disclosed inaudible transmission system aims to push the total leakage spectrum, L(f), below the "Threshold of Hearing Curve" T(f). To this end, the system finds the best partitioning of the spectrum, such that the leakage is below the threshold of hearing. If multiple partitions satisfy this constraint, the system picks the one that has the largest gap from the threshold of hearing curve. Formally, we solve the below optimization problem:

$$\text{maximize } \min[T(f) - L(f)] \quad (6)$$

$$f_1, f_2, \ldots f_{N-1}, f$$

subject to $f_0 \leq f_1 \leq f_2 \leq \ldots \leq f_N$

The solution partitions the frequency spectrum to ensure that the leakage energy is below the hearing threshold for every frequency bin. This ensures inaudibility at any human ear.

It should be possible to increase attack range with more speakers, while also limiting audible leakage below the hearing threshold. This holds in principle due to the following reason. For a desired attack range, say r, we can compute the minimum power density (i.e., power per frequency) necessary to invoke the VED. This power $P_r$ needs to be high since the non-linear channel will strongly attenuate it by the factor, $A_2$. Now consider the worst case where a voice command has equal magnitude in all frequencies. Given each frequency needs power $P_r$ and each speaker's output needs to be below a threshold of hearing for all frequencies, we can run our min-max optimization for increasing values of N, where N is the number of speakers. The minimum N that gives a feasible solution is the answer. Of course, this is the upper bound; for a specific voice signal, N will be lower.

Increasing speakers can be viewed as beamforming the energy towards the VED. In the extreme case for example, every speaker will play one frequency tone, resulting in a strong DC component at the speaker's output which would still be inaudible. In practice, our experiments are bottlenecked by ADCs, amplifiers, speakers, etc., hence we will report results with an array of 61 small ultrasound speakers.

Recognizing inaudible voice attacks is essentially a problem of acoustic forensics, i.e., detecting evidence of non-linearity in the signal received at the microphone. Of course, we assume the attacker knows our defense techniques and hence will try to remove any such evidence. Thus, the remaining question is whether there is any trace of non-linearity that just cannot be removed or masked.

To quantify this, let v(t) denote a human voice command signal, say "Alexa, mute yourself". When a human issues this command, the recorded signal $s_{leg} = v(t) + n(t)$, where n(t) is noise from the microphone. When an attacker plays this signal over ultrasound (to launch the non-linear attack), the recorded signal $s_{nl}$ is:

$$s_{nl} = \frac{A_2}{2}(1 + 2v(t) + v^2(t)) + n(t) \quad (7)$$

FIG. 26A is a plot of a spectrogram of a legitimate human voice command stating "Alex, Mute Yourself," according to an embodiment. FIG. 26B is a plot of a spectrogram of an attacker playing the command issued in FIG. 26A over an ultrasonic audio system, according to an embodiment. FIG. 26A thus illustrates an example of $s_{leg}$ and $s_{nl}$. Both are very similar and both invoke the same response in VEDs, e.g., the text-to-speech converter outputs the same text for both $s_{leg}$ and $s_{nl}$). A defense mechanism would need to examine any incoming signal, s, and decipher whether the signal is low-frequency legitimate or a shifted copy of the high-frequency attack.

Systems, devices, and related methods that provide defense to inaudible attack may be employed via a number of embodiments, at least one of which may perform better than others. In one embodiment, the system may decompose an incoming signal, s(t). One solution is to solve for $$s(t) = \frac{A_2}{2}\left(1 + 2\hat{v}(t) + \hat{v}^2(t)\right),$$

and test if the resulting $\hat{v}(t)$ produces the same text-to-speech (T2S) output as s(t). However, this proved to be a fallacious argument because, if such a $\hat{v}(t)$ exists, it will always produce the same T2S output as s(t). This is because such a $\hat{v}(t)$ would be a cleaner version of the voice command (without the non-linear component); if the polluted version s passes the T2S test, the cleaner version will also pass.

Energy at low frequencies from $v^2(t)$ may also be considered. For example, another solution is to extract portions of s(t) from the lower frequencies, as regular voice signals do not contain sub-50 Hz components, energy detection should offer evidence. Unfortunately, environmental noise (e.g., fans, A/C machines, wind) leaves non-marginal residue in these low bands. Moreover, an attacker could deliberately reduce the power of its signal so that its leakage into sub-50 Hz is small. Our experiments showed nonmarginal false positives in the presence of environmental sound and soft attack signals.

The air absorbs ultrasonic frequencies far more than voice, which translates to sharper reduction in amplitude as the ultrasound signal propagates. Measured across different microphones separated by ≈7.3 cm in an Amazon Echo® and Google® Home, the amplitude difference should be far greater for ultrasound. We designed a defense that utilized the maximum amplitude slope between microphone pairs, which design proved to be a robust discriminator between $s_{leg}$ and $s_{nl}$. However, we were also able to point two (reasonably synchronized) ultrasonic beams from opposite directions. This reduced the amplitude gradient, making it comparable to legitimate voice signals (Alexa treated the signals as multipath). In the real world, we envisioned two attackers launching this attack by standing at two opposite sides of a house. Finally, this solution would require an array of microphones on the voice enabled device. Hence, it is inapplicable to one or two microphone systems (like phones, wearables, refrigerators).

Given that long range attacks call for the use of at least two speakers (to bypass speaker non-linearity), we designed an angle-of-arrival (AoA)-based technique to estimate the physical separation of speakers, e.g., a phase-based speaker separation design. In comparison to human voice, the source separation consistently showed success, so long as the speakers are more than 2 cm apart. While practical attacks would certainly require multiple speakers, easily making them 2 cm apart, we aimed at solving the short range attack as well (e.g., where the attack is launched from a single speaker). Put differently, the right evidence of non-linearity should be one that is present regardless of the number of speakers used.

Another defense is to search for traces of $v^2(t)$ in sub-50 Hz. However, we now focus on exploiting the structure of human voice. Observe that voice signals exhibit well-understood patterns of fundamental frequencies, added to multiple higher order harmonics, as illustrated in FIGS. 26A and 26B. This structure is expected to be partly reflected in the sub-50 Hz band of s(t) that contains $v^2(t)$), and hence correlate with a carefully extracted spectrum above-50 Hz, which contains the dominant v(t). With appropriate signal scrubbing, we expect the correlation to emerge reliably; however, if the attacker attempts to disrupt correlation by injecting sub-50 Hz noise, the stronger energy in this low band should give away the attack. One may force the attacker into this zero sum game.

FIG. 27A is a plot illustrating a simplified abstraction of a legitimate voice spectrum, with a narrow fundamental frequency band around $f_j$ and harmonics at integer multiples $nf_j$, according to an embodiment. The lower bound on $f_j$ is greater than 50 Hz. Now recall that when this voice spectrum undergoes non-linearity, each of $f_j$ and $nf_j$ will self-convolve to produce "copies" of themselves around DC. FIG. 27B is a plot illustrating the appearance of the copies of the inaudible tones within the voice spectrum due to non-linearity of microphone hardware according to an embodiment. Of course, the $A_2$ term from non-linearity strongly attenuates this "copy." However, given the fundamental band around $f_j$ and the harmonics around $nf_j$ are very similar in structure, each of about 20 Hz bandwidth, the energy between 0 Hz and 20 kHz is superimposed, and can be expressed as:

$$E_{[0,20]} \approx E\left[A_2 \sum_{n=1}^{N} |V_{[nf_j-20,nf_j+20]} * V_{[nf_j-20,nf_j+20]}|^2\right] \quad (8)$$

The net result is distinct traces of energy in sub-20 Hz bands, and this energy variation (over time) mimics that of fj. For a legitimate attack, the sub-20 Hz is dominantly uncorrelated hardware and environmental noise.

Figure 28A:
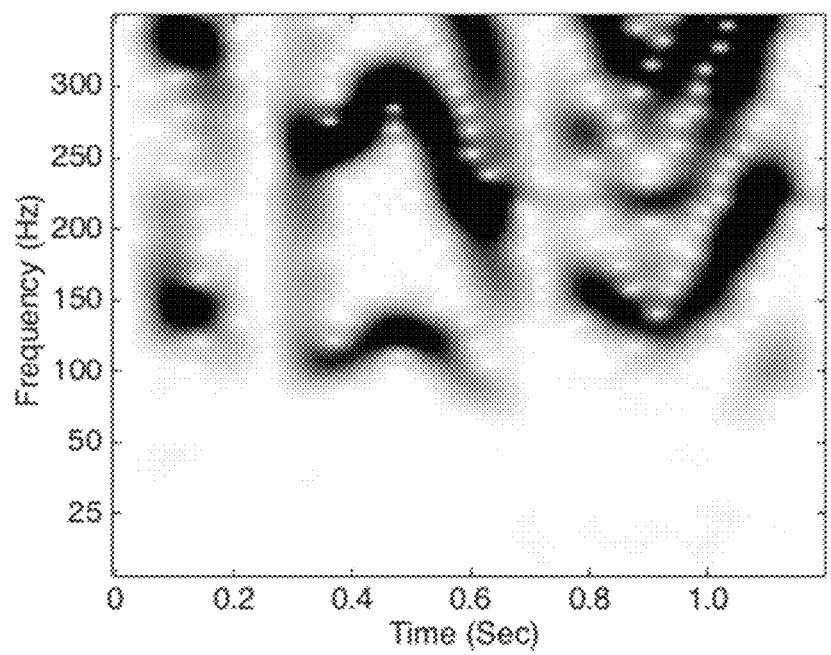
FIG. 28A is a plot illustrating a spectrogram of the audible voice of FIG. 27A.
Figure 28B:
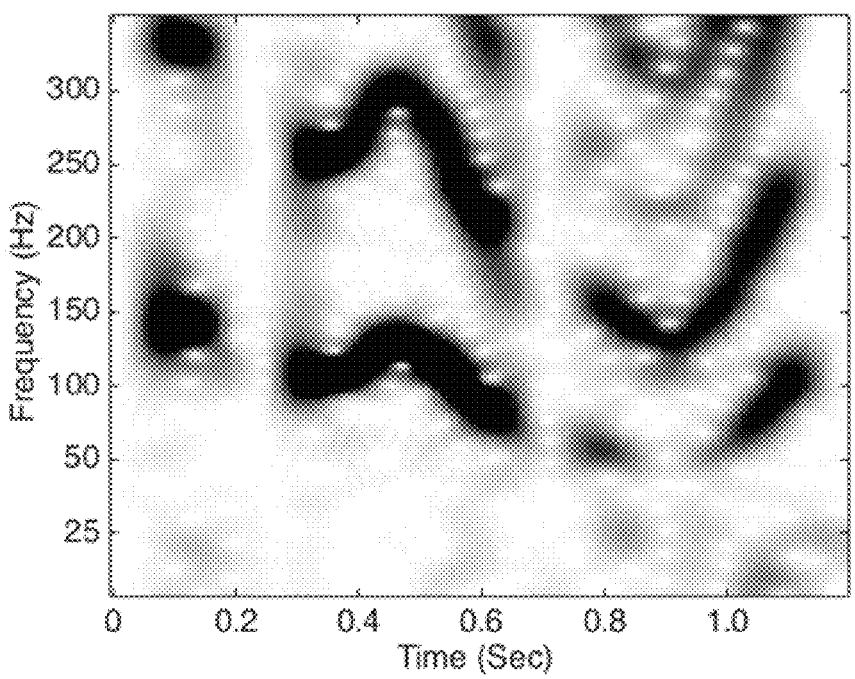
FIG. 28B is a plot illustrating a spectrogram of the inaudible attacker voice of FIG. 27B.

FIG. 28A is a plot illustrating a spectrogram of the audible voice ($s_{leg}$) of FIG. 27A. FIG. 28B is a plot illustrating a spectrogram of the inaudible attacker voice ($s_{nl}$) of FIG. 27B. FIGS. 28A and 28B zoom into sub-50 Hz frequencies and compare the traces of energy for $s_{leg}$ and $s_{nl}$, respectively. The $s_{nl}$ signal clearly shows more energy concentration, particularly when the actual voice signal is strong.

Figure 29:
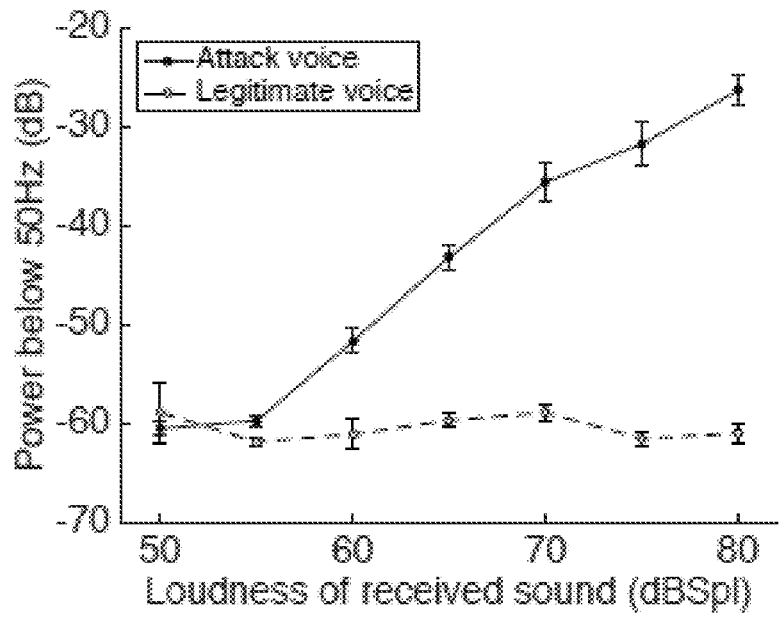
FIG. 29 is a plot illustrating the loudness of received sound versus power below 50 Hz in decibels (dB) for both the legitimate voice and the attacker voice according to an embodiment.

FIG. 29 is a plot illustrating the loudness of received sound versus power below 50 Hz in decibels (dB) for both the legitimate voice ($s_{leg}$) and the attacker voice ($s_{nl}$) according to an embodiment. Note that loudness level is expressed in dBSpl, where Spl denotes "sound pressure level," the standard metric for measuring sound. Non-linearity illustrates increasing power due to the self-convolved spectrum overlapping in the lower band. Legitimate voice signals generate significantly less energy in these bands, thereby remaining flat for higher loudness.

The width of the fundamental frequencies and harmonics are time-varying (e.g., a time-varying frequency band, B); however, at any given time, if a width of the harmonic frequency is B Hz, then the self-convolved signal gets shifted into [0, B]Hz as well. Note that this is independent of the actual values of center frequencies, $f_j$ and $nf_j$. Now, let $s_{<B(t)}$ denote the sub-B Hz signal received by the microphone and $s_{>B(t)}$ be the signal above B Hz that contains the voice command. The system may seek to correlate the energy variation over time in $s_{<B(t)}$ with the energy variation at the fundamental frequency, $f_j$ in $s_{>B(t)}$. We track the fundamental frequency in $s_{>B(t)}$ using standard acoustic libraries, but then average the power around B Hz of this frequency. This produces a power profile over time, $P_{f_j}$. For $s_{<B(t)}$, we also track the average power over time. However, to avoid weak signals and disruption from noise, the system removes time windows in which the fundamental power is below its average. The system combines the remaining windows from both $P_{f_j}$ and $s_{>B(t)}$ and compute their correlation co-efficient. We use an average value of B=20 Hz.

Figure 30:
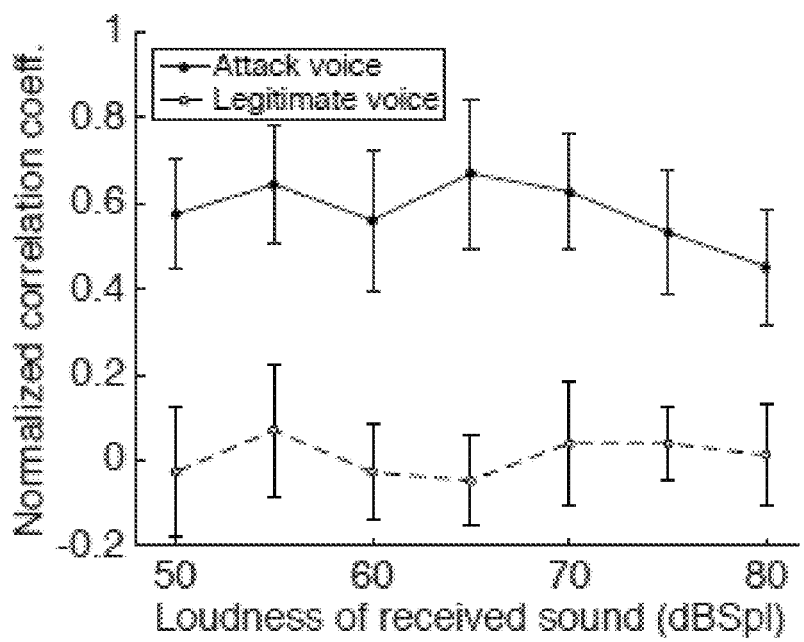
FIG. 30 is a plot illustrating a correlation for increasing loudness levels of the recorded signal for both the legitimate voice and the attacker signal according to an embodiment.

FIG. 30 is a plot illustrating a correlation for increasing loudness levels of the recorded signal for both the legitimate voice and the attacker signal according to an embodiment. The loudness vs correlation between $P_{f_j}$ and $s_{<B(t)}$ denotes the power variation of the fundamental frequency and the sub-20 Hz band, respectively, where loudness below 60 dBS pl is not audible. The comparison is against a legitimate voice command. A consistent correlation gap was recorded, implying that non-linearity is leaving some trace in the low-frequency bands, and this trace preserves some structure of the actual voice signal. We have not yet accounted for the possibility that the attacker can inject noise to disrupt correlation.

The natural question for the attacker is how to modify/add signals such that this correlation gap gets narrowed. Several possibilities arise:

(1) Signal −v2(t) can be added to the speaker in the low frequency band and transmitted with the high frequency ultrasound, v(t). Given that ultrasound will produce −v2(t) after non-linearity, and −v2(t) will remain as is, the two should interact at the microphone and cancel. Channels for low frequencies and ultrasound are different and unknown, hence it is almost impossible to design the precise −v2(t) signal. Of course, one may still attempt to attack with such a deliberately-shaped signal.

(2) Assuming the ultrasound v(t) has been up-converted to between 40 kHz and 44 kHz, the attacker could potentially concatenate spurious frequencies from say 44 kHz and 46 kHz. These frequencies would also self-convolve and get copied around DC. This certainly affects correlation since these spurious frequencies would not correlate well (in fact, they can be designed to not correlate). The attacker's hope should be to lower correlation while maintaining a low energy footprint below 20 Hz.

The attacker can use the above approaches to try to defeat the zero-sum game. FIG. 31 is a plot illustrating the zero sum game between correlation and power at sub-50 Hz bands, for both the legitimate voice and the attacker signal, according to an embodiment. The data in this plot is derived from 4000 attempts to achieve low correlation and low energy. Of these, 3,500 are random noises injected in legitimate voice commands, while the remaining 500 are more carefully designed distortions (such as frequency concatenation, phase distortions, low frequency injection, etc.). Of course, in all these cases, the distorted signal was still correct, e.g., the VED device responded as it should.

In contrast, 450 different legitimate words were spoken by different humans (shown as hollow dots), at various loudness levels, and accents, and styles. Clusters emerge suggesting promise of separation. However, some commands were still too close, implying the need for greater margin of separation.

In order to increase the separation margin, the system may leverage the amplitude skew resulting from $v^2(t)$. Specifically, two observations emerge: (1) When the harmonics in voice signals self-convolve to form $v^2(t)$, they fall at the same frequencies of the harmonics (since the gaps between the harmonics are quite homogeneous). (2) The signal $v^2(t)$ is a time domain signal with only positive amplitude. Combining these together, we postulated that amplitudes of the harmonics would be positively biased, especially for those that are strong (since $v^2(t)$ will be relatively stronger at that location). In contrast, amplitudes of legitimate voice signals should be well balanced on the positive and negative.

FIG. 32A is a plot illustrating a sound signal in the time domain from the legitimate audible voice according to an embodiment. FIG. 32B is a plot illustrating the recorded attacker signal and is demonstrative of amplitude skew according to an embodiment. FIGS. 32A-32B illustrate one contrast between a legitimate voice and the recorded attack signal. In pursuit of this opportunity, the system extracts the ratio of the maximum and minimum amplitude (average over the top 10% for robustness against outliers). FIG. 32C is a plot illustrating amplitude skew for various attack and legitimate voice commands, according to embodiments. Using this as the third dimension for separation, FIG. 32C re-plots the legitimate audible voice and attack signal clusters. While the separation margin is close, combining it with correlation and power, the separation becomes satisfactory.

The disclosed inaudible transmission system may leverage three features to detect an attack: power in sub-50 Hz, correlation coefficient, and amplitude skew. An elliptical classifier may then be formed through use of these features. Analyzing the False Acceptance Rate (FAR) and False Rejection Rate (FRR), as a function of these 3 parameters, the system may converge on an ellipsoidal-based separation technique. To determine the optimal decision boundary, the system (or a coupled device) computes FAR and FRR for each candidate ellipsoid. Our aim is to pick the parameters of an ellipse that minimizes both FAR and FRR, to generate an elliptical classifier algorithm. FIG. 33 is a plot of a FAR plane (dark shading) and a FRR plane (light shading) for different sub-50 Hz power and correlation values, according to an embodiment.

The FAR and FRR are intersecting planes in a logarithmic scale, and note that the plot shows only two features since it is not possible to visualize the 4D graph. The coordinate with minimum value along the canyon—indicating the equal error rates—gives the optimal selection of ellipsoid. Since it targets speech commands, this classifier may be designed offline, one-time, and need not be trained for each device or individual.

The disclosed inaudible transmission system is evaluated on three main metrics: (1) attack range, (2) inaudibility of the attack, and the recorded sound quality (e.g., whether the attacker's command sounds human-like), and (3) accuracy of the defense under various environments. For evaluation purposes, we tested our attack prototype with 984 commands to Amazon Echo® and 200 commands to smartphones. The attacks were launched from various distances with 130 different background noises. Details of the results will be discussed after a brief summary of the results.

Figure 35B:
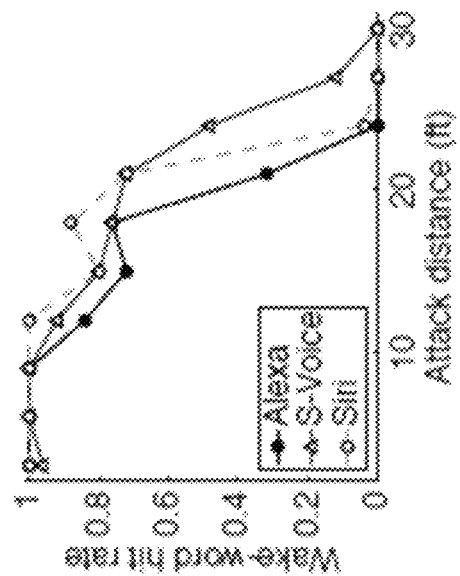
FIG. 35B is a plot illustrating command detection accuracy against increasing distances for the listening devices of FIG. 35A.
Figure 35A:
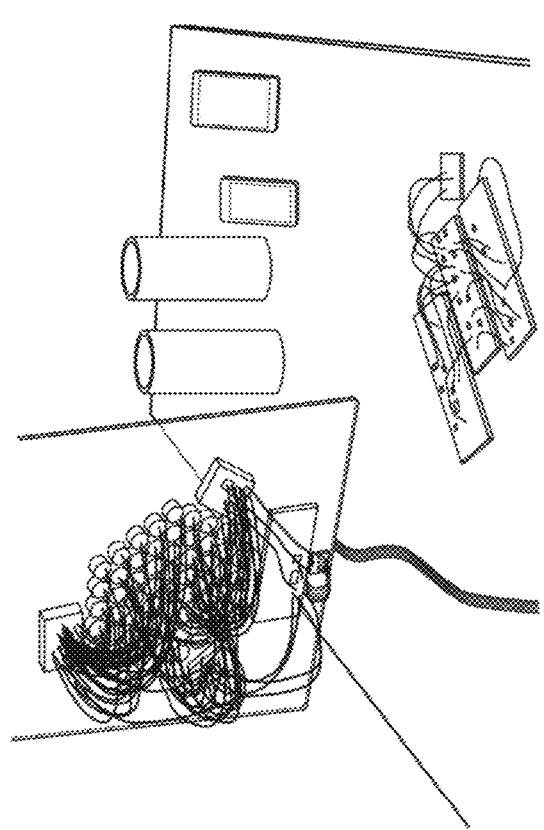
FIG. 35A is a plot illustrating a wake-word hit rate for various listening devices according to an embodiment.

FIG. 35A is a plot illustrating a wake-word hit rate for various listening devices according to an embodiment. The plot shows attack success at 24 feet for Amazon Echo® and 30 feet for smartphones at a power of 6 watt. FIG. 35B is a plot illustrating command detection accuracy against increasing distances for the listening devices of FIG. 35A. We record 12 hours of microphone data, 5 hours of human voice commands, and 7 hours of attack commands through ultrasound speakers.

FIG. 36A is a graph illustrating a maximum activation distance for different input power levels according to various embodiments. FIG. 36B is a plot illustrating a worst case audibility of the leakage sound after optimal spectrum partitioning according to various embodiments, which confirms that all attacks are inaudible, e.g., the leakage from our speaker array is 5-10 dB below human hearing threshold. FIG. 36C is a graph illustrating word recognition accuracy by VEDs (using automatic speech recognition software) with equal accuracy as legitimate words according to an embodiment.

FIG. 37A is a plot illustrating precision and recall (98% and 99%, respectively) of defense performance according to basic performance without external interference, e.g., without the attacker manipulating the attack command, according to an embodiment. As illustrated, precision and recall remain steady even under signal manipulation.

Before elaborating on these results, we first describe our evaluation platforms and methodology.

Figure 34B:
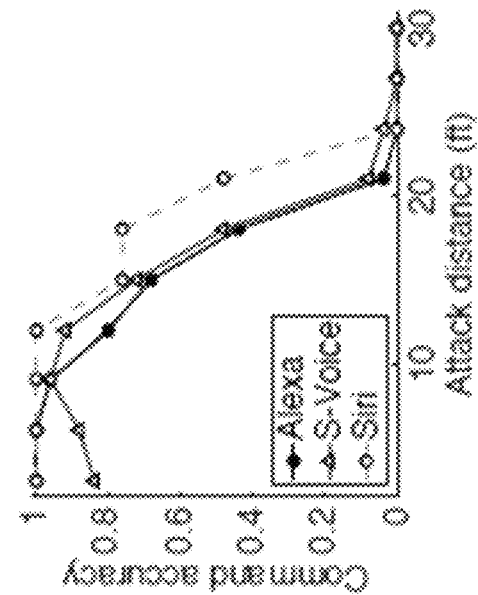
FIG. 34B is an image of an ultrasonic speaker array useable to commit an attack according to an embodiment.
Figure 34A:
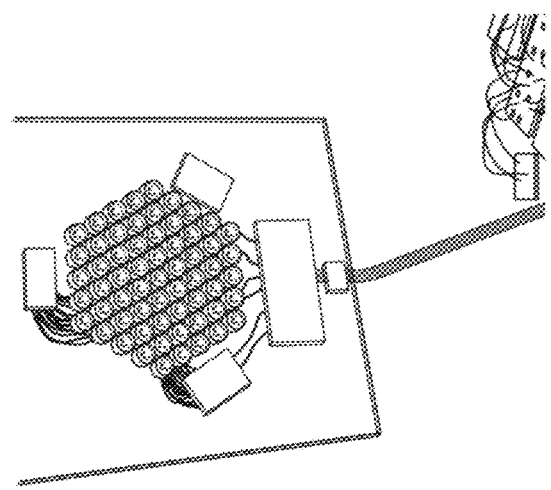
FIG. 34A is an image of an experimental setup to evaluate the disclosed system according to various embodiments.

(1) Attack speakers: FIG. 34A is an image of an experimental setup to evaluate the disclosed system according to various embodiments. The experimental setup includes a custom designed speaker system including 61 ultrasonic piezoelectric speakers arranged as a hexagonal planar array. The elements of the array are internally connected in two separate clusters. A dual-channel waveform generator (Keysight 33500b series) drives the first cluster with the voice signal, modulated at the center frequency of 40 kHz. This cluster forms smaller sub-clusters to transmit separate segments of the spliced spectrum. The second cluster transmits the pure 40 kHz tone through each speaker. The signals are amplified to 30 volts using a custom-made NE5534AP op-amp based amplifier circuit. This prototype is limited to a maximum power of 6 watts because of the power ratings of the operational amplifiers. More powerful amplifiers are certainly available to a resourceful attacker.

(2) Target VEDs: We tested our attack on 3 different VEDs: Amazon Echo®, Samsung S6 smartphone running Android v7.0, and Siri on an iPhone 5S running iOS v10.3. Unlike the Echo®, Samsung® S-voice and Siri® require personalization of the wake-word with a user's voice, which adds a layer of security through voice authentication. However, voice synthesis is known to be possible, and we assume that the synthesized wake-word is already available to the attacker.

Experiment setup: We ran our experiments in a lab space occupied by five members and also in an open corridor. We placed the VEDs and the ultrasonic speaker at various distances ranging up to 30 feet. During each attack, we played varying degrees of interfering signals from six speakers scattered across the area, emulating natural home/office noises. The attack signals were designed by first collecting real human voice commands from 10 different individuals; MATLAB is used to modulate the real human voice commands to ultrasonic frequencies. For speech quality of the attack signals, we used the open-source Sphinx4 speech processing tool.

FIG. 34A is an image of an experimental setup to evaluate the disclosed system according to various embodiments. FIG. 34B is an image of an ultrasonic speaker array useable to commit an attack according to an embodiment. This experiment attempts to activate the VEDs from various distances. We repeatedly played the inaudible wake-word from the ultrasonic speaker system at regular intervals and count the fraction of successful activations.

FIG. 35A illustrates the activation hit rate against increasing distance: higher hit-rates indicate success with less number of attempts. The average distance achieved for 50% hit rate is 24 feet for all devices, while the maximum for Siri® and Samsung® S-voice are measured to be 27 feet and 30 feet respectively. FIG. 35B plots the attack range again, but plots command detection accuracy for the entire voice command against increasing distances. We declare "success" if the text to speech translation produces every single word in the command. The range degrades slightly due to the stronger need to decode every word correctly.

FIG. 36B reports the attack range to Echo® for increasing input power to the speaker system. As expected, the range continues to increase, limited by the power of the system's 6-watt amplifiers. More powerful amplifiers would certainly enhance the attack range; however, for the purposes of prototyping, we designed our hardware in the lower power regime.

Leakage audibility: FIG. 16B plots the efficacy of the disclosed spectrum splicing optimization, e.g., how effectively does the system achieve speaker-side inaudibility for different ultrasonic commands. Observe that without splicing (i.e., "no partition"), the ultrasonic voice signal is almost 5 dB above the human hearing threshold. As the number of segments increase, audibility falls below the hearing curve. With 60 speakers in the ultrasonic speaker array, we used six segments, each played through five speakers; the remaining 31 were used for the second $\cos(2\pi f_c t)$ signal. Note that the graph plots the minimum gap between the hearing threshold and the audio playback, implying that this is a conservative worst case analysis. Finally, we show results from 20 example attack commands—the other commands are below the threshold.

Received speech quality: Given six speakers were transmitting each spliced segment of the voice command, we intend to understand if this distorts speech quality. FIG. 36C plots the word recognition accuracy via Sphinx, automatic speech recognition software. The system's attack quality is comparable to human quality, implying that our multi-speaker beamforming preserves the speech's structure. In other words, speech quality is not the bottleneck for attack range.

Metrics: Our defense technique essentially attempts to classify the attack scenarios distinctly from the legitimate voice commands. We report the "Recall" and "Precision" of this classifier for various sound pressure levels (measured in dBSPL), varying degrees of ambient sounds as interference, and deliberate signal manipulation. Recall that our metrics refer to: (1) precision, or the fraction of our detected attacks that are correct; and (2) recall, or the fraction of the attacks that were detected. The below-discussed graphs, beginning with the basic classification performance, discuss the results.

FIG. 37A illustrates the attack detection performance in normal home environment without significant interference. The average precision and recall of the system is 99% across various loudness of the received voice. This result indicates best case performance of our system with minimum false alarms.

For the impact of ambient noise, we tested our defense system for common household sounds that can potentially mix with the received voice signal and change its features leading to misclassification. To this end, we played 130 noise sounds through multiple speakers while recording attack and legitimate voice signals with a smartphone. We replayed the noises at four different sound pressure levels starting from a value of 50 dBSPL to extremely loud 80 dBSPL, while the voice loudness is kept constant at 65 dBSPL. FIG. 37B reports the precision and recall for this experiment. The recall remains close to one ("1") for all these noise levels, indicating that we do not miss attacks. However, at higher interference levels, the precision slightly degrades since the false detection rate increases a bit when noise levels are extremely high, which is not common in practice.

Next, we test the defense performance against deliberate attempts to eliminate nonlinearity features from the attack signal. Here an attacker's strategy is to eliminate the $v^2(t)$ correlation by injecting noise in the attack signal. We considered four different categories of noise: white Gaussian noise to raise the noise floor, band-limited noise on the sub-50 Hz region, water-filling noise power at low frequencies to mask the correlated power variations, and intermittent frequencies below 50 Hz. As illustrated in FIG. 37C, the process does not significantly impact the performance because of the power-correlation tradeoff exploited by the defense classifier. FIG. 37D illustrates that the overall accuracy of the system is also above 99% across all experiments.

Figure 38A:
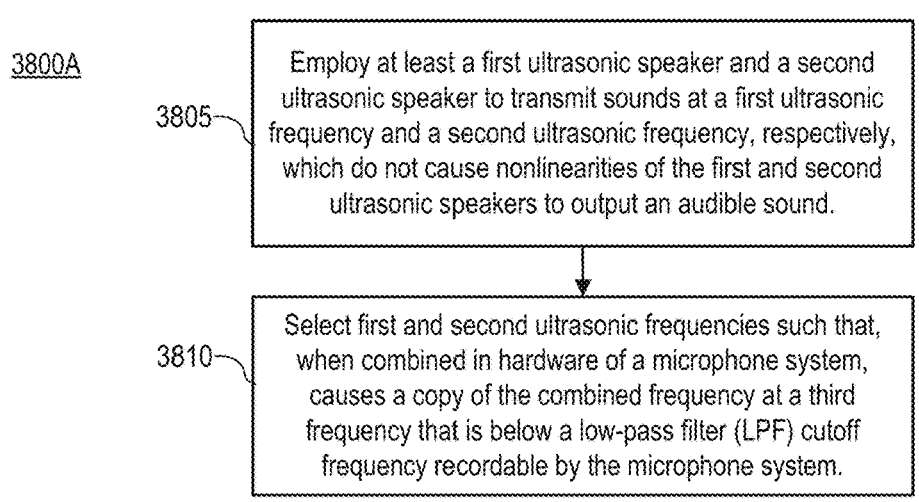
FIG. 38A is a flow chart of a method for employing a set of ultrasonic speakers to perform an attack on a voice enabled device according to an embodiment.

FIG. 38A is a flow chart of a method 3800A for employing a set of ultrasonic speakers to perform an attack on a voice enabled device according to an embodiment. The method 3800A may be performed by processing logic that may comprise hardware (e.g., circuitry, dedicated logic, programmable logic, microcode, etc.), software (such as instructions running on the processor), firmware or a combination thereof. In various embodiments, a ultrasonic transmission device or system, which may include the waveform generator 1500 (FIG. 15B) and/or the waveform generator 1600 (FIGS. 16B-16C), may perform the ultrasonic signal processing and transmission of the method 3800A.

In embodiments, the method 3800A may begin with the processing logic employing at least a first ultrasonic speaker and a second ultrasonic speaker to transmit sounds at a first ultrasonic frequency and a second ultrasonic frequency, respectively, which do not cause nonlinearities of the first and second ultrasonic speakers to output an audible sound (3805). The method 3800A may continue with the processing logic selecting first and second ultrasonic frequencies such that, when combined in hardware of a microphone system, causes a copy of the combined frequency at a third frequency that is below a low-pass filter (LPF) cutoff frequency recordable by the microphone system. (3810).

Figure 38B:
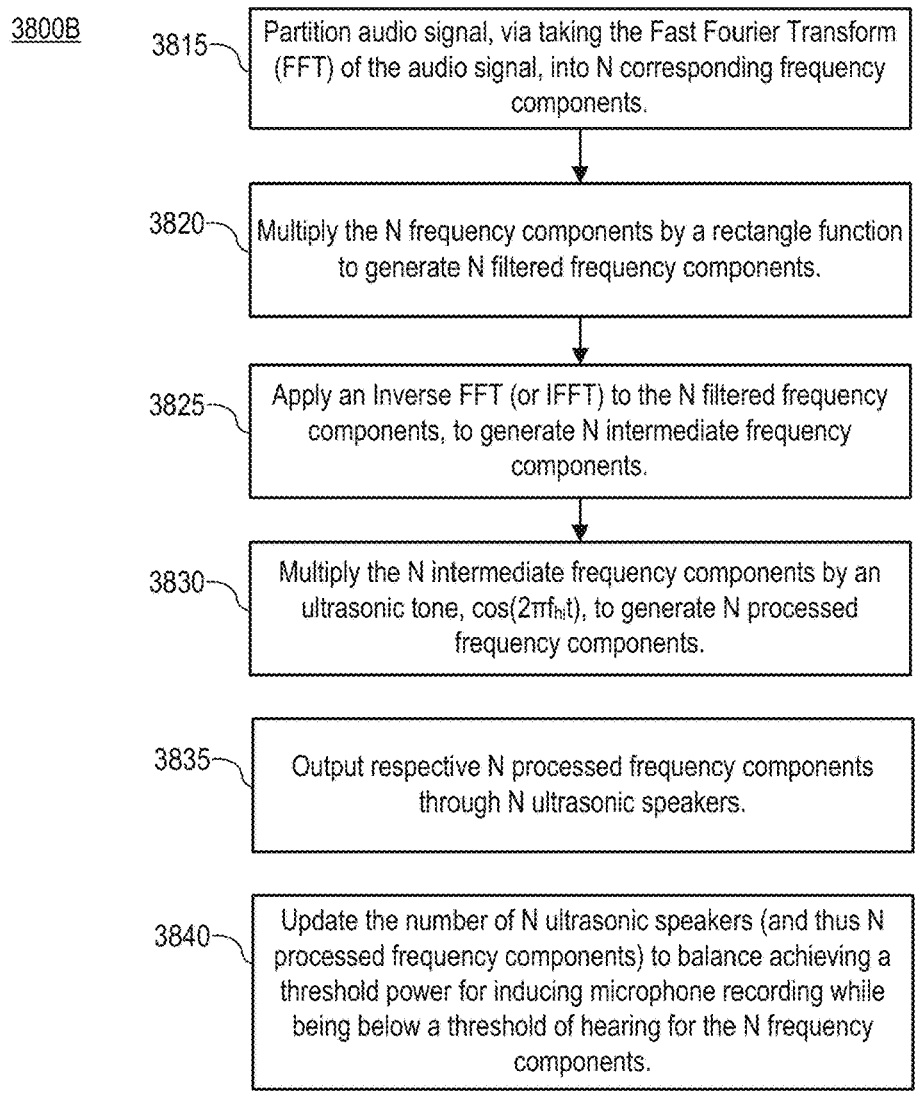
FIG. 38B is a flow chart of a method for employing an array of ultrasonic speakers to perform an attack on a voice enabled device according to an embodiment.

FIG. 38B is a flow chart of a method 3800B for employing an array of ultrasonic speakers to perform an attack on a voice enabled device according to an embodiment. The method 3800B may be performed by processing logic that may comprise hardware (e.g., circuitry, dedicated logic, programmable logic, microcode, etc.), software (such as instructions running on the processor), firmware or a combination thereof. In various embodiments, a ultrasonic transmission device or system, which may include the waveform generator 1500 (FIG. 15B) and/or the waveform generator 1600 (FIGS. 16B-16C), may perform the ultrasonic signal processing and transmission of the method 3800B.

In embodiments, the method 3800B may begin with the processing logic partitioning an audio signal, via taking the Fast Fourier Transform (FFT) of the audio signal, into N corresponding frequency components (3815). The method 3800B may continue with multiplying the N frequency components by a rectangle function to generate N filtered frequency components (3820). The method 3800B may continue with the processing logic applying an Inverse FFT (or IFFT) to the N filtered frequency components, to generate N intermediate frequency components (3825). The method 3800B may continue with the processing logic multiplying the N intermediate frequency components by an ultrasonic tone, $\cos(2\pi f_{hi} t)$, to generate N processed frequency components (3830). The method 3800B may continue with the processing logic outputting respective N processed frequency components through N ultrasonic speakers in an ultrasonic speaker array (3835). The method 3800B may continue with the processing logic updating the number of N ultrasonic speakers (and thus N processed frequency components) to balance achieving a threshold power for inducing microphone recording while being below a threshold of hearing for the N frequency components (3840).

FIG. 39 illustrates a computer system 3900, which that may be used for or in conjunction with any of the disclosed audio transmitters according to the embodiments disclosed herein, such as may interact with and track the effects of ultrasonic audio transmission on the microphone system 100. The computer system 3900 may include an ordered listing of a set of instructions 3902 that may be executed to cause the computer system 3900 to perform any one or more of the methods or computer-based functions disclosed herein. The computer system 3900 may operate as a stand-alone device or may be connected to other computer systems or peripheral devices, including the microphone system 100, e.g., by using a network 3910.

In a networked deployment, the computer system 3900 may operate in the capacity of a server or as a client-user computer in a server-client user network environment, or as a peer computer system in a peer-to-peer (or distributed) network environment. The computer system 3900 may also be implemented as or incorporated into various devices, such as a personal computer or a mobile computing device capable of executing a set of instructions 3902 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 3900 may include a memory 3904 on a bus 3920 for communicating information. Code operable to cause the computer system to perform any of the acts or operations described herein may be stored in the memory 3904. The memory 3904 may be a random-access memory, read-only memory, programmable memory, hard disk drive or any other type of volatile or non-volatile memory or storage device.

The computer system 3900 may include a processor 3908 (e.g., a processing device), such as a central processing unit (CPU) and/or a graphics processing unit (GPU). The processor 3908 may include one or more general processors, digital signal processors, application specific integrated circuits, field programmable gate arrays, digital circuits, optical circuits, analog circuits, combinations thereof, or other now known or later-developed devices for analyzing and processing data. The processor 3908 may implement the set of instructions 3902 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The processor 3908 may include a transform modeler 3906 or contain instructions for execution by a transform modeler 3906 provided a part from the processor 3908. The transform modeler 3906 may include logic for executing the instructions to perform the transform modeling and image reconstruction as discussed in the present disclosure.

The computer system 3900 may also include a disk (or optical) drive unit 3915. The disk drive unit 3915 may include a non-transitory computer-readable medium 3940 in which one or more sets of instructions 3902, e.g., software, can be embedded. Further, the instructions 3902 may perform one or more of the operations as described herein. The instructions 3902 may reside completely, or at least partially, within the memory 3904 and/or within the processor 3908 during execution by the computer system 3900.

The memory 3904 and the processor 3908 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 3900 may include an input device 3925, such as a keyboard or mouse, configured for a user to interact with any of the components of the computer system 3900. It may further include a display 3930, such as a liquid crystal display (LCD), a cathode ray tube (CRT), or any other display suitable for conveying information. The display 3930 may act as an interface for the user to see the functioning of the processor 3908, or specifically as an interface with the software stored in the memory 3904 or the drive unit 3915.

The computer system 3900 may include a communication interface 3936 that enables communications via the communications network 3910. The network 3910 may include wired networks, wireless networks, or combinations thereof. The communication interface 3936 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

What is claimed is:

1. A voice enabled device comprising:
   a transducer to capture multiple inaudible signals received from multiple ultrasonic speakers;
   audio recording electronics coupled to the transducer, the audio recording electronics to process the multiple inaudible signals to generate digital output samples, which are recorded sound data comprising non-linearities from frequency-shifted versions of the multiple inaudible signals to within an audible frequency range; and
   a processing device coupled to the audio recording electronics, wherein the processing device is to detect, within the recorded sound data, at least a portion of the non-linearities, wherein to detect the at least a portion of the non-linearities, the processing device is to:
      compare the recorded sound data with expected patterns from an audible audio signal generated by human voice; and
      detect non-linear variations within the recorded sound data as compared to the expected patterns, wherein the non-linear variations are detected as a result of the at least a portion of the non-linearities located within the recorded sound data corresponding to a strongest portion of the expected patterns and being in a sub-50 hertz (Hz) band; and
   wherein, in response to the detection, the processing device is further to suppress an action programmed for response to a voice command corresponding to the recorded sound data.

2. The voice enabled device of claim 1, wherein a width of a fundamental frequency combined with widths of corresponding harmonics of the fundamental frequency within the audible audio signal is a time-varying frequency, and to detect the at least a portion of the non-linearities, the processing device is further to:
   determine a first energy variation over time within a frequency band that is between zero and the time-varying frequency; and
   correlate the first energy variation with a second energy variation at a fundamental frequency in the recorded sound data that is greater than the frequency band.

3. The voice enabled device of claim 2, wherein to determine the first energy variation, the processing device is to use standard acoustic libraries, the processing device further to:
   determine a first average power of the fundamental frequency around the width of the time-varying frequency;
   determine a second average power, over time, of the recorded sound data that is within the frequency band;
   remove, from the first average power and the second average power, windows of time during which the fundamental frequency falls below the first average power; and
   compute a correlation coefficient between the first average power and the second average power.

4. The voice enabled device of claim 2, wherein the processing device is further to employ an average width of the frequency band that is approximately 20 hertz (Hz).

5. The voice enabled device of claim 1, wherein, to detect the non-linear variations, the processing device is further to detect that the at least a portion of the non-linearities are at positively-biased harmonics comprising an amplitude skew.

6. The voice enabled device of claim 5, wherein to detect that the at least a portion of the non-linearities are at positively-biased harmonics comprising the amplitude skew, the processing device is further to:
   determine a first ratio of maximum and minimum amplitude of the audible audio signal;
   determine a second ratio of maximum and minimum amplitude of the recorded sound data; and
   compare the second ratio to the first ratio.

7. The voice enabled device of claim 1, wherein the processing device is further to:
   compare the recorded sound data to pre-recorded voice commands; and
   determine that the recorded sound data corresponds to the voice command listed among the pre-recorded voice commands.

8. A method comprising:
   capturing, using a transducer, multiple inaudible signals received from multiple ultrasonic speakers;
   generating, using audio recording electronics coupled to the transducer, digital output samples of the multiple inaudible signals, wherein the digital output samples are recorded sound data comprising non-linearities from frequency-shifted versions of the multiple inaudible signals to within an audible frequency range;
   detecting, within the recorded sound data using a processing device, at least a portion of the non-linearities, wherein the detecting comprises:
      comparing the recorded sound data with expected patterns from an audible audio signal generated by human voice; and
      detecting non-linear variations within the recorded sound data as compared to the expected patterns, wherein the non-linear variations are detected as a result of the at least a portion of the non-linearities located within the recorded sound data corresponding to a strongest portion of the expected patterns and being in a sub-50 hertz (Hz) band; and in response to the detecting, suppressing, using the processing device, an action programmed for response to a voice command corresponding to the recorded sound data.

9. The method of claim 8, wherein a width of a fundamental frequency combined with widths of corresponding harmonics of the fundamental frequency within the audible audio signal is a time-varying frequency, and detecting the at least a portion of the non-linearities further comprises:

determining a first energy variation over time within a frequency band that is between zero and the time-varying frequency; and correlating the first energy variation with a second energy variation at a fundamental frequency in the recorded sound data that is greater than the frequency band.

10. The method of claim 9, further comprising:

employing standard acoustic libraries to determine the first energy variation, the fundamental frequency, and the corresponding harmonics;

determining a first average power of the fundamental frequency around the width of the time-varying frequency;

determining a second average power, over time, of the recorded sound data that is within the frequency band;

removing, from the first average power and the second average power, windows of time during which the fundamental frequency falls below the first average power; and compute a correlation coefficient between the first average power and the second average power.

11. The method of claim 9, further comprising employing an average width of the frequency band that is approximately 20 hertz (Hz).

12. The method of claim 8, wherein detecting the non-linear variations further comprises detecting that the at least a portion of the non-linearities are at positively-biased harmonics comprising an amplitude skew.

13. The method of claim 12, wherein detecting that the at least a portion of the non-linearities are at positively-biased harmonics comprising the amplitude skew further comprises:

determining a first ratio of maximum and minimum amplitude of the audible audio signal;

determining a second ratio of maximum and minimum amplitude of the recorded sound data; and comparing the second ratio to the first ratio.

14. The method of claim 8, further comprising:

comparing the recorded sound data to pre-recorded voice commands; and determining that the recorded sound data corresponds to the voice command listed among the pre-recorded voice commands.

15. A system comprising:
a microphone comprising:

a transducer to capture a combination of multiple inaudible signals received from multiple ultrasonic speakers; and audio recording electronics coupled to the transducer, the audio recording electronics to process the combination of the multiple inaudible signals to generate digital output samples comprising recorded sound data, the recorded sound data including non-linearities from a frequency-shifted version of the combination of the multiple inaudible signals to within an audible frequency range; and a processing device coupled to the microphone, wherein the processing device is to detect, within the recorded sound data, at least a portion of the non-linearities, wherein to detect the at least a portion of the non-linearities, the processing device is to:

compare the recorded sound data with expected patterns from an audible audio signal generated by human voice; and detect non-linear variations within the recorded sound data as compared to the expected patterns, wherein the non-linear variations are detected as a result of the at least a portion of the non-linearities located within the recorded sound data corresponding to a strongest portion of the expected patterns and being in a sub-50 hertz (Hz) band; and wherein, in response to the detection, the processing device is further to:

determine that the recorded sound data correspond to a voice command; and suppress an action programmed for response to the voice command.

16. The system of claim 15, wherein a width of a fundamental frequency combined with widths of corresponding harmonics of the fundamental frequency within the audible audio signal is a time-varying frequency, and to detect the at least a portion of the non-linearities, the processing device is further to:

determine a first energy variation over time within a frequency band that is between zero and the time-varying frequency; and correlate the first energy variation with a second energy variation at a fundamental frequency in the recorded sound data that is greater than the frequency band.

17. The system of claim 15, wherein, to detect the non-linear variations, the processing device is further to:

determine a first ratio of maximum and minimum amplitude of the audible audio signal;

determine a second ratio of maximum and minimum amplitude of the recorded sound data; and detect, via comparison of the first ratio to the second ratio, that the at least a portion of the non-linearities are at positively-biased harmonics comprising an amplitude skew.

* * * * *